(12) United States Patent
Somogyi et al.

(10) Patent No.: US 8,382,857 B2
(45) Date of Patent: *Feb. 26, 2013

(54) METHOD FOR THE REACTIVE COLORATION OF LEATHER

(75) Inventors: Laszlo Somogyi, Limburgerhof (DE); Andrea Zamponi, Mannheim (DE); Harald Kiesow, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1250 days.

This patent is subject to a terminal disclaimer.

(21) Appl. No.: 11/628,659

(22) PCT Filed: Jun. 7, 2005

(86) PCT No.: PCT/EP2005/006107
§ 371 (c)(1),
(2), (4) Date: Dec. 6, 2006

(87) PCT Pub. No.: WO2005/121439
PCT Pub. Date: Dec. 22, 2005

(65) Prior Publication Data
US 2007/0234488 A1  Oct. 11, 2007

(30) Foreign Application Priority Data
Jun. 8, 2004 (DE) .......... 10 2004 027 812

(51) Int. Cl.
*D06P 3/30* (2006.01)
(52) U.S. Cl. .......... 8/437; 8/436; 8/669; 8/94.1 R
(58) Field of Classification Search .......... 8/669, 436, 8/437, 94.1 R
See application file for complete search history.

(56) References Cited

U.S. PATENT DOCUMENTS

| 4,248,776 | A | * | 2/1981 | Papa et al. ................ 534/810 |
| 5,964,900 | A | * | 10/1999 | Ruhlmann et al. ............. 8/549 |
| RE38,531 | E | | 6/2004 | Berenguer |
| 2004/0025260 | A1 | * | 2/2004 | Fennen et al. ............... 8/94.15 |
| 2007/0033746 | A1 | | 2/2007 | Somogyi et al. |

FOREIGN PATENT DOCUMENTS

| DE | 2638236 A | * | 3/1978 |
| DE | 3529294 | | 2/1986 |
| DE | 198 25 202 | | 12/1999 |
| DE | 19825202 A1 | * | 12/1999 |
| DE | 10 044 642 | | 3/2002 |
| EP | 0 518 266 | | 12/1992 |
| EP | 0 572 353 A1 | | 12/1993 |
| EP | 0 887 386 | | 12/1998 |
| JP | 05 246 977 | | 3/1992 |
| WO | WO 9964520 A1 | * | 12/1999 |
| WO | WO 03031520 A1 | * | 4/2003 |
| WO | 2005 040490 | | 5/2005 |

OTHER PUBLICATIONS

EIC Structure Search, completed by STIC on Apr. 17, 2009.*
Copending U.S. Appl. No. 10/577,776.*
English abstract of DE 19825202 A1, available from Derwent Acc. No. 2000-054407.*
English Abstract for Patsch WO 99/64520, accessed in Derwent Acc. No. 2000-054407.*
English Abstract for Rosenbusch, accessed in Derwent Acc. No. 1978-19783A.*
T.C. Mullen, "Practical Aspects of the Use of Reactive Dyes on Garment Leathers", The Leather Manufacturer, pp. 18-37, 1964.
T. C. Mullen, "Recent Work on the Application of Procion Dyestuffs to Leather", J. Soc. Leather, Trades, pp. 162-175, 1992.
M. L. Fein et al., "Colorfast Dyes for Washable and Drycleanable Leather", J. Am. Leather Chem. Assoc., pp. 584-591, 1970.
Von K. Rosenbusch et al., "Das Färben Wasch-Und Reinigungsbeständiger Sämischleder Mit Vinylsulfonfarbstoffen", Das Leder 19, pp. 294-296, 1962.

* cited by examiner

*Primary Examiner* — Harold Pyon
*Assistant Examiner* — Katie L Hammer
(74) *Attorney, Agent, or Firm* — Oblon, Spivak, McClelland, Maier & Neustadt, L.L.P.

(57) ABSTRACT

The present invention relates to a process for dyeing leather with at least one dye F which has at least one alkaline-activable group of the formula A;

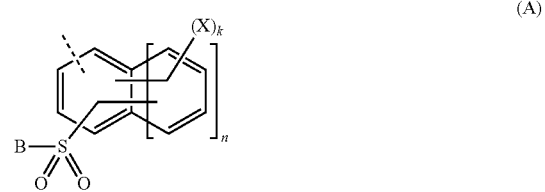

where
- - - - denotes the bond to the rest of the dye molecule;
X is halogen, $C_1$-$C_4$-alkyl or $C_1$-$C_4$-alkoxy,
k is 0, 1, 2 or 3,
n is 0 or 1 and
B is a CH=$CH_2$ group or a $CH_2$—$CH_2$-Q group, where Q is an alkaline-detachable group,
which comprises treating the leather with an aqueous float comprising at least one dye F at a pH of not less than 8, generally in the region of 8 to 11.

23 Claims, No Drawings

METHOD FOR THE REACTIVE COLORATION OF LEATHER

The present invention relates to a process for dyeing leather and to novel dyes which are particularly useful for reactive dyeing of leather.

Tanned leather is currently dyed with acidic dyes, direct dyes, sulfur dyes or basic dyes. It is difficult to achieve high color intensities and high color stabilities, especially wet- and perspirationfastnesses, with these dyes, in fact impossible to this day to a satisfactory standard for medium to high depths of shade.

To improve wet- and perspirationfastness, the leather is frequently treated with cationic complexing agents which complex the dye and thus reduce its solubility on contact with water. However, the wet-, perspiration- and rubfastnesses which are achievable are still inadequate for intensive shades. Furthermore, leather articles fabricated therefrom tend to mark off in use. The achievement of high fastnesses at medium to high depths of shade also requires a very careful dye selection and that the dye used be coordinated with the leather assistants used, and also suitable fatliquoring agents and choice of retanning material. Moreover, achievement of desired fastnesses generally requires that the dye and the fatliquor and also, in some cases, the retanning agent be applied in separate floats; the requisite float changes prolong the overall process and entail more wastewater.

The dyeing operation with a conventional leather dye in an aqueous acidic medium is consequently complex, long-winded and costly owing to the different process steps and the chemicals used. Furthermore, these measures do not constitute a fundamental solution to the fastness problems described above. The reason for this is that the conventional dyes used are bound to the leather via ionic interactions. The action of aqueous alkaline solutions, such as for example wash liquors or in perspirationfastness tests, destroys the ionic bond between leather and dye, so that the dye becomes detached from the leather and stains surrounding materials, for example adjacent fabrics.

Various attempts have been made to improve the color- and wetfastness of dyed leather by reactive dyeing. Reactive dyeing refers to the use of dyes which have functional groups capable of forming a covalent chemical bond with the functional groups of leather.

For instance, T. C. Mullen in the Leather Manufacturer 1964, 18, and in J. Soc. Leather, Trades, Chem. 46, 1962, 162, and also M. L. Fein et al. in J. Am. Leather Chem. Assoc. 65, 1970, 584-591, describe the use of reactive dyes having a dichlorotriazine group as reactive moiety. However, the reported yields of fixation, i.e. the fraction of a chemically bound dye, are only moderate at about 70 to 75% and do not solve the problems described above. Moreover, the technique is limited to chrome-tanned leather.

To overcome these disadvantages, DE-A 3529294 proposes using dyes for leather dyeing which have at least one 1,3,5-triazinyl group to which a substituent having a quaternary nitrogen atom is attached. However, assignee studies on N-acetyllysine as a model system have shown that, under the dyeing conditions described there, there is no significant formation of covalent bonds between the dye and the amino group of N-acetyllysine.

K. Rosenbusch et al. Das Leder 19, 1962, 284, describes the use of disazo dyes which have a vinyl sulfone group, or a group from which a vinyl sulfone group is released under the action of alkalis, for dyeing chamois leather. Adequate fixation, however, requires long dyeing times at pH 10. Owing to the dyeing conditions employed, i.e., high pH in conjunction with long dyeing times of 7 h or more, this process can only be used for dyeing chamois leather, which is known to be stable to alkaline. With other leather varieties, the dyeing conditions described cause damage to the leather. Assignee studies have shown, moreover, that satisfactory fixation is not achieved with dyes of this type.

Anionic polyazo dyes (having 3 or more azo groups) which have a vinyl sulfone group, or a group from which a vinyl sulfone group is released under the action of alkalis, have variously been described. These anionic azo dyes are primarily used for dyeing paper or textile fibers. EP-A 518226 and JP 05246977 propose such dyes for the dyeing of leather as well, but without describing any leather dyeing in concrete terms.

DE-A 19825202 describes the dyeing of leather with anionic polyazo dyes at neutral to acidic pH values. The color- and migrationfastnesses of the leather thus dyed are not satisfactory, however.

In summary, existing processes for dyeing leather with reactive dyes do not provide good fixation yields of 85% or higher at medium to high depths of shade. The fixation yields of 70 to 75% achieved in the prior art are not sufficient for high wet- and perspirationfastnesses and good migration stability since the unattached dye has to be laboriously washed off to solve the problems described here. The disadvantages which are described here of dyeing leather with reactive dyes are also pointed out in The Leather Manufacturer 1964, 18-23. No surprise therefore that dyeing leather with reactive dyes has not become established. On the contrary, the search is on today for different ways of bonding dyes covalently in leather, for example by pretreating the leather with polyfunctional aldehydes which have at least one reactive group capable of reacting with a reactive group of the dye by forming a bond (see DE 100 44 642 A1)

It is an object of the present invention to provide a process for dyeing leather to high fastnesses, especially wet-, perspiration- and rubfastnesses and also a high migrationfastness, even at medium and high depths of shade (color intensities). The process shall be able to be conducted under conditions leading to little if any leather damage.

We have found that this object is achieved, surprisingly, on using anionic polyazo dyes F, which have at least 3 azo groups (N=N groups) and at least one functional group in the hereinbelow defined formula A, in an aqueous float at pH 8 or higher. In fact, dyeing and fixation proceeds so rapidly under these conditions that a short dyeing time of 4 h or less is sufficient to achieve adequate color intensity and a high fixation of 85% or more.

The present invention accordingly provides a process for dyeing leather with at least one dye F which has at least one alkaline-activable group of the formula A;

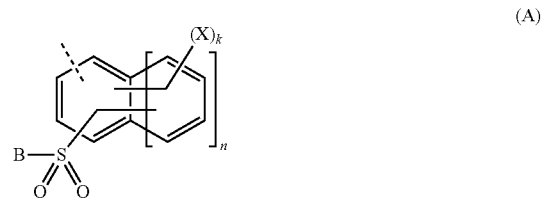

(A)

where
- - - - denotes the bond to the rest of the dye molecule;
X is halogen, $C_1$-$C_4$-alkyl or $C_1$-$C_4$-alkoxy,
k iso, 1, 2 or 3,
n is 0 or 1 and B is a CH=CH$_2$ group or a CH$_2$—CH$_2$-Q group, where Q is an alkaline-detachable group, which comprises treating the leather with an aqueous float comprising at least one dye F at a pH of not less than 8, generally in the range from 8 to 11, preferably in the range from 8.5 to 10.5 and specifically in the range from 8.5 to 10.

Here and hereinbelow, alkyl generally denotes a linear or branched hydrocarbyl radical having 1 to 6 and preferably having 1 to 4 carbon atoms ($C_1$-$C_6$-alkyl and $C_1$-$C_4$-alkyl respectively) such as methyl, ethyl, propyl, isopropyl and the like. Haloalkyl denotes alkyl as defined above wherein the hydrogen atoms are wholly or partly replaced by halogen atoms, especially by fluorine atoms, as in trifluoromethyl, trichloromethyl, pentafluoroethyl and the like. Alkoxy denotes an alkyl radical as defined above that is attached via an oxygen atom. Optionally substituted phenyl signifies that the phenyl radical may comprise one or more, for example 1, 2, 3 or 4, substituents which are selected for example from halogen, alkyl, alkoxy, nitro, cyano, COOH, SO$_3$H and the like. Halogen represents in particular fluorine, chlorine or bromine.

The variable k is preferably 0, 1 or 2; that is, the A radical comprises 0, 1 or 2 radicals X. Preferably n in the formula A is 0; that is, the radical A derives from benzene. When n is 1, the radical A derives from naphthalene. In these cases, the SO$_2$—B group can be situated on the same benzene nucleus as the at least one X group or on the other benzene nucleus.

An alkaline-detachable group Q is to be understood as meaning radicals which are detached under alkaline conditions, i.e., at pH 7.5 or higher, through elimination to form a vinyl sulfone group. Examples of such groups are halogen, for example chlorine, bromine or iodine, —O—SO$_3$H, —S—SO$_3$H, quaternary ammonium radicals such as tri-$C_1$-$C_4$-alkylammonium, benzyldi-$C_1$-$C_4$-alkylammonium or N-attached pyridinium and also radicals of the formulae $R^a$S(O)$_2$—, $R^b$S(O)$_2$—O—, $R^c$C(O)—O—. In these formulae $R^a$, $R^b$ and $R^c$ are independently alkyl, haloalkyl or optionally substituted phenyl, although $R^c$ may also be hydrogen. Q is preferably an —O—(CO)CH$_3$ group and especially an —O—SO$_3$H group.

According to the invention, B in formula A is preferably CH=CH$_2$, a CH$_2$—CH$_2$—O—C(O)CH$_3$ group or a CH$_2$—CH$_2$—O—SO$_3$H group. More particularly, the radical A is selected from the following radicals A1 to A6:

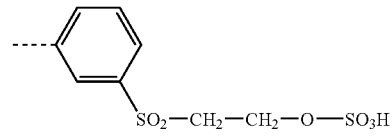
(A2)

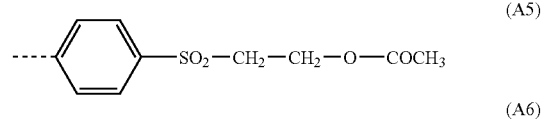
(A1)

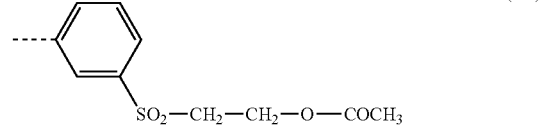
(A3)

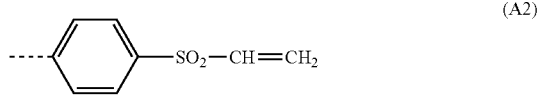
(A4)

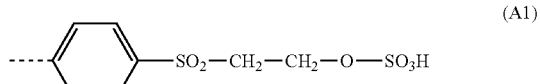
(A5)

(A6)

Particular preference among these is given to dyes wherein at least one A radical has the formula A1, A2, A3 or A4 and in particular the formula A1 or A2.

Advantageously, the dye used in the process of the invention comprises 1, 2 or 3, and preferably 1 or 2 of the aforementioned A radicals. This radical A can but need not be part of the dye chromophore and is preferably attached to the dye molecule via an —NH— or —N=N— group.

According to the present invention, the dye F is anionic, i.e., it has at least one, for example 1 to 10 and especially 2 to 8, anionic or acidic functional groups per dye molecule. These groups endow the dye F with solubility in water under weakly acidic, neutral or alkaline conditions. These groups are in particular anionic or acidic functional groups which dissociate in an aqueous medium at above pH 4, to form anionic groups. Examples of such groups are hydroxysulfonyl groups (—SO$_3$H), carboxyl groups (COOH) and hydroxysulfonyloxy groups (—O—SO$_3$H) and also the anions of these groups, at least one and in particular at least two of these groups preferably being hydroxysulfonyl groups. When these groups are present as anionic groups in the dye F, it will be appreciated that the dye also comprises the counterions necessary for neutralization. Suitable counterions are in particular alkali metal ions, specifically sodium, potassium and lithium ions and also ammonium ions, for example ammonium ions derived from mono-, di- or triethanolamine.

The process of the invention may also be carried out using metal complexes, preferably transition metal complexes, of the aforementioned dyes F, especially complexes of transition metals of the groups 6 to 10 of the periodic table and of these especially Cu, Cr, Fe, Ni, Co, Mn, Zn and Cd. The molar ratio of transition metal to dye molecule in these metal complexes is customarily in the range from 2:1 to 1:2. In general, in these dyes, the metal ions are complexed not via the aforementioned anionic groups but via deprotonated hydroxyl groups, via amino groups, imino groups, nitrogen atoms incorporated in an aromatic π-electron system, or via azo groups.

Such dyes F are known from the prior art cited in the introduction and from DE-A 196 48 939 or can be prepared analogously to known methods of making structurally similar dyes, as known in the prior art cited herein and also from EP 602 562, EP-A 597 411, EP-A 592 105 or DE 43 196 74.

Dyes F are generally prepared by initially diazotizing an amino compound of the formula B

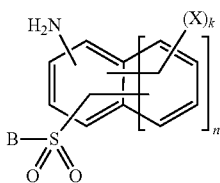

and then coupling it onto an appropriate dye intermediate. The reaction product obtained when reacting the amino compound B or its diazonium salt with the dye intermediate can already be the dye F or in turn constitute a dye F intermediate which is further processed to the dye F analogously to known processes. Alternatively, a compound B may be reacted with a dye intermediate which comprises a nucleophilically displaceable group, in a conventional manner. Examples of nucleophilically displaceable groups are halogen, especially chlorine or bromine, that is attached to an aromatic as in halotriazine radicals, or is present in the form of a halosulfonyl group or of a halocarbonyl group. Processes for this purpose are known from the prior art cited herein or can be applied analogously to the preparation of dyes F.

In a preferred embodiment of the invention, the dye F is an azo dye and preferably an azo dye selected from the dyes of the general formulae I to VII and their metal complexes:

 (I)

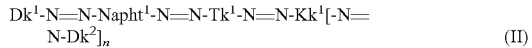 (II)

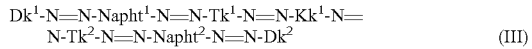 (III)

 (IV)

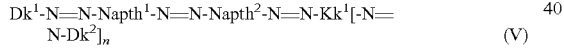 (V)

 (VI)

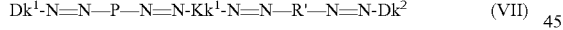 (VII)

where:
n and p are independently 0 or 1;
m is 0, 1 or 2 subject to the condition that m+p=2 or 3 in the formula I;
$Dk^1$, $Dk^2$ independently represent a radical derived from an aromatic amine or denotes a group of the formula A subject to the condition that in each of the formulae I-V and VII at least one of $Dk^1$ and $Dk^2$ represents a radical of the formula A
$Kk^1$, $Kk^2$ independently represent a mono-, di- or trivalent aromatic radical which derives from benzene, naphthalene, pyrazole, quinoline, diphenylamine, diphenylmethane, pyridine, pyrimidine or diphenyl ether and which may optionally comprise one or more of the following radicals as substituents: $SO_3H$, COOH, OH, $NH_2$, $NO_2$, CN, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;
$Kk^3$ is a monovalent radical which derives from benzene, pyridine, pyrimidine or naphthalene and which optionally comprises 1 or 2 hydroxysulfonyl groups and optionally 1, 2 or 3 further substituents selected from $SO_3H$, COOH, OH, $NH_2$, $NO_2$, CN, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;
$Tk^1$, $Tk^2$ independently represent a divalent aromatic radical which derives from benzene, diphenylamine, biphenyl, diphenylmethane, 2-phenylbenzimidazole, phenylsulfonylbenzene, phenylaminosulfonylbenzene, stilbene or phenylaminocarbonylbenzene which may each optionally comprise one or more of the following radicals as substituents: $SO_3H$, COOH, OH, $NH_2$, $NO_2$, halogen, $C_1$-$C_4$-alkyl;
P and R' independently represent a divalent aromatic radical which derives from benzene or naphthalene which may each optionally comprise one or more, for example 1, 2, 3, 4 or 5, of the following radicals as substituents: $SO_3H$, COOH, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;
$Napht^1$, $Napht^2$ independently represent a divalent radical which derives from naphthalene and which comprises 1 or 2 hydroxysulfonyl groups and may optionally comprise 1, 2 or 3 further substituents selected from OH, $NH_2$, $C_1$-$C_4$-alkylamino, $C_1$-$C_4$-dialkylamino, $C_1$-$C_4$-alkylsulfonylamino, phenylsulfonylamino, 4-methylphenylsulfonylamino, $C_1$-$C_4$-alkylaminosulfonyl, di-$C_1$-$C_4$-alkylaminosulfonyl, phenylaminosulfonyl, 4-methylphenylaminosulfonyl and NHC(O)$R^x$ radicals, where Rx hydrogen, $C_1$-$C_4$-alkyl, maleinyl or phenyl.

Here and hereinbelow $C_1$-$C_4$-alkyl (as well as the alkyl moieties in $C_1$-$C_4$-alkoxy, $C_1$-$C_4$-alkylamino, di-$C_1$-$C_4$-alkylamino, $C_1$-$C_4$-alkylsulfonyl, $C_1$-$C_4$-alkylaminosulfonyl, $C_1$-$C_4$-alkylaminocarbonyl, di-$C_1$-$C_4$-alkylaminosulfonyl, di-$C_1$-$C_4$-alkylaminocarbonyl and $C_1$-$C_4$-alkylcarbonylamino) denotes a linear or branched aliphatic hydrocarbyl radical such as methyl, ethyl, n-propyl, isopropyl, n-butyl and the like.

$C_1$-$C_4$-Hydroxyalkyl denotes $C_1$-$C_4$-alkyl which bears an OH group such as 2-hydroxyethyl. Correspondingly, $C_1$-$C_4$-hydroxyalkylamino denotes $C_1$-$C_4$-alkylamino, which bears an OH group in the alkyl radical such as 2-hydroxyethylamino. $C_1$-$C_4$-Carboxyalkyl denotes $C_1$-$C_4$-alkyl which bears a carboxyl group (COOH group) such as carboxymethyl ($CH_2COOH$) and 2-carboxyethyl ($CH_2CH_2COOH$). Correspondingly, $C_1$-$C_4$-carboxyalkylamino denotes $C_1$-$C_4$-alkylamino which bears a carboxyl group (COOH group) in the alkyl moiety such as carboxymethylamino (NH—$CH_2COOH$) and 2-carboxyethylamino (NH—$CH_2CH_2COOH$).

5- or 6-membered heterocyclyl generally comprises 1, 2 or 3 heteroatoms selected from nitrogen, oxygen and sulfur, especially 1 or 2 nitrogen atoms and optionally an oxygen or sulfur atom as ring members and can be saturated, unsaturated or aromatic. Examples of saturated heterocyclyl are morpholinyl, piperidinyl, piperazinyl and pyrrolidinyl. Examples of aromatic heterocyclyl are pyridinyl, pyrazolyl, oxazolyl, thiazolyl, etc.

The dyes of the formulae I to VII can be used in free form, in the form of their salts and—when two radicals joined together by a diazo group —N=N— each comprise an OH, COOH or $NH_2$ radical disposed ortho to the diazo group—as metal complexes.

The radicals $DK^1$ and $DK^2$ in the dyes of the formulae I to V and VII generally derive from aromatic amines $DK^1$-$NH_2$ and $DK^2$—$NH_2$ respectively, hereinafter also referred to as diazonium components. The amines $DK^1$-$NH_2$ and $DK^2$—$NH_2$ are generally optionally substituted aniline, optionally substituted α- or β-naphthylamine or optionally substituted aminoquinolines. Correspondingly, the radicals $DK^1$ and $DK^2$ are generally independently benzene-, naphthalene- or quinoline-derived radicals wherein naphthalene, quinoline and benzene optionally comprise one or more, for example 1, 2 or 3, substituents. Examples of substituents are the following radicals: $SO_3H$, COOH, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$-alkylcarbonylamino, N—($C_1$-$C_4$-alkylcarbonyl)-N—($C_1$-$C_4$-alkylcarbonyl)amino, $C_1$-$C_4$-hydroxy-$C_1$-$C_4$-alkylamino, carboxy-$C_1$-$C_4$-alkylamino, phenylcarbonylamino, $C_1$-$C_4$-alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1, 2 or 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

Useful monoamines $Dk^1$-$NH_2$ and $Dk^2$-$NH_2$ further include 4-amino-1-phenylpyrazoles wherein the pyrazole ring as well as the phenyl ring comprise one or more, for example 1 or 2, substituents of the aforementioned kind or a B—$SO_2$— group wherein B is as defined above. In these cases, $Dk^1$ or $Dk^2$ represents in particular pyrazol-4-yl which has a phenyl radical or a group of the formula A in position 1 and optionally bears 1 or 2 substituents selected from halogen, $C_1$-$C_4$-alkyl, hydroxyl, COOH, hydroxysulfonyl or $C_1$-$C_4$-alkoxy.

Preferably, $Dk^1$ and $Dk^2$ are independently radicals derived from an optionally substituted aniline, an optionally substituted α- or β-naphthylamine or are independently an A group.

Examples of suitable monoamines $Dk^1$-$NH_2$ and $Dk^2$-$NH_2$ are the hereinbelow indicated compounds DK1 to DK39:

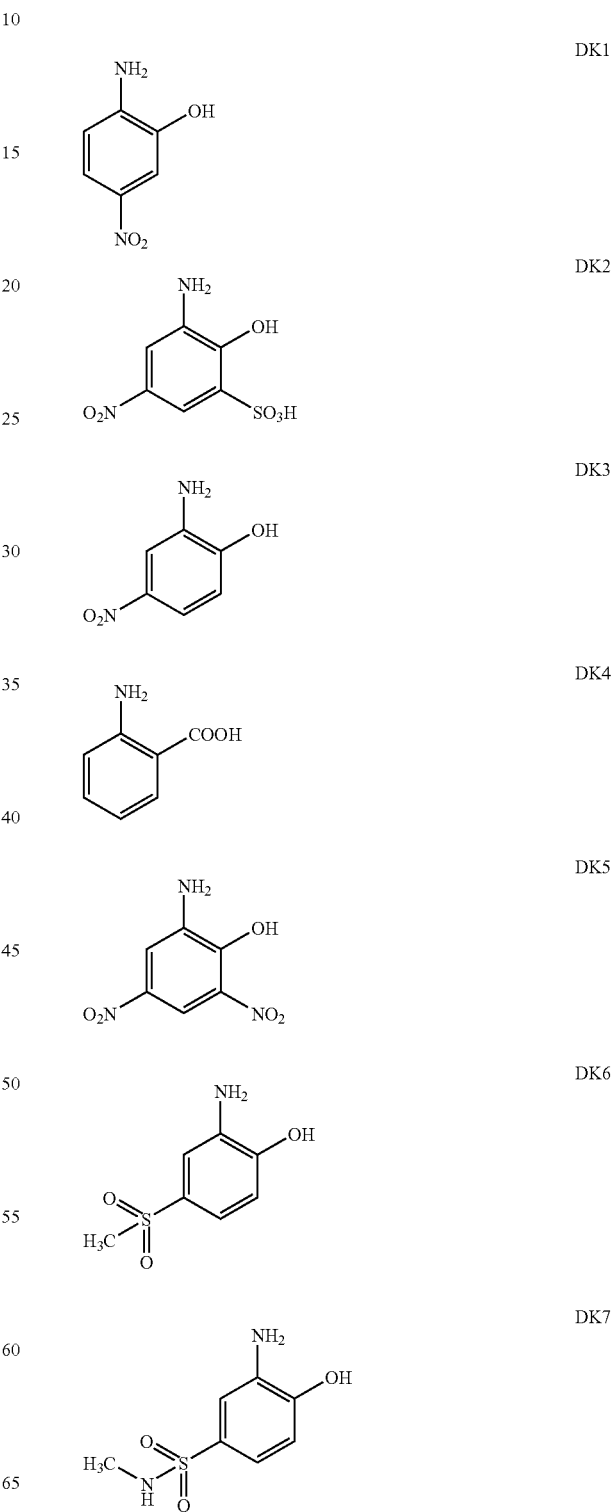

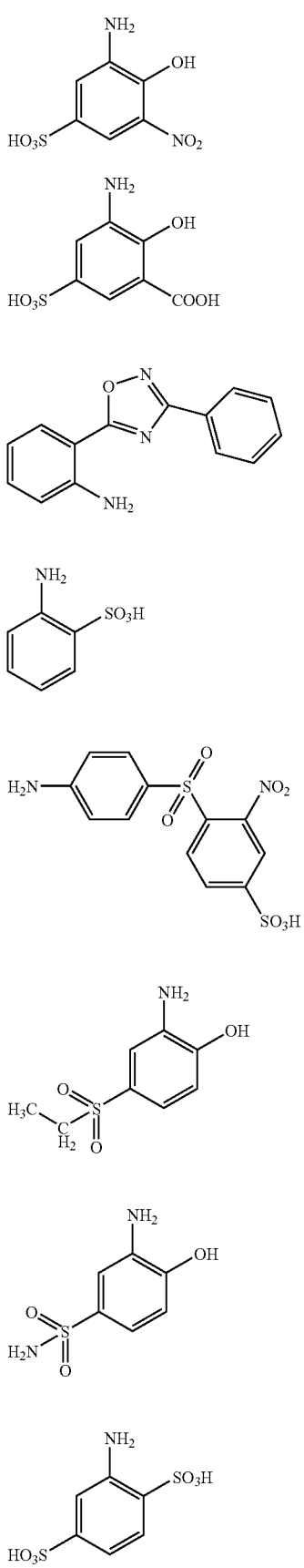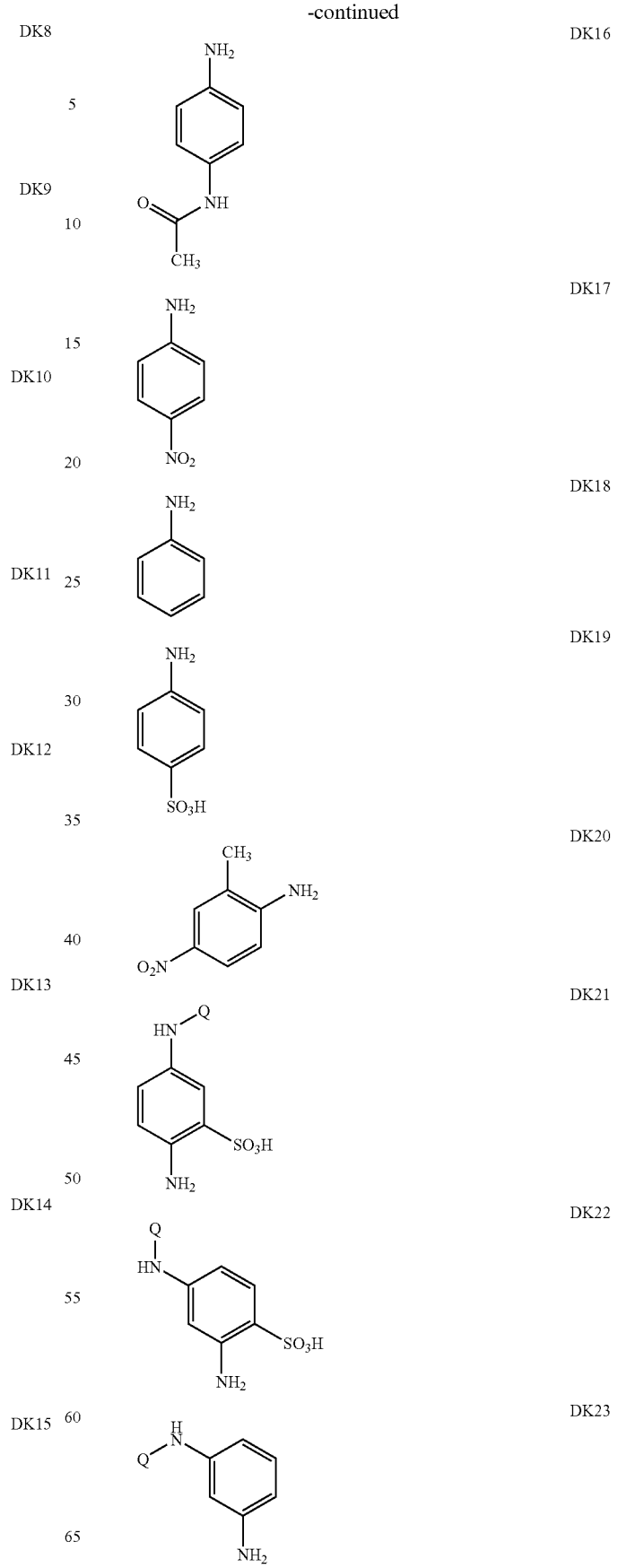

-continued
DK24
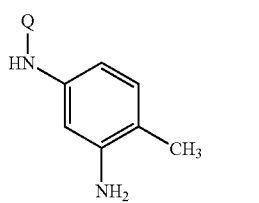
DK25
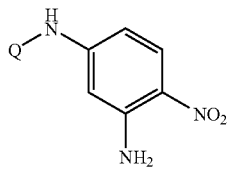
DK26
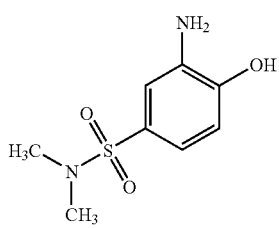
DK27
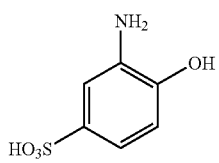
DK28
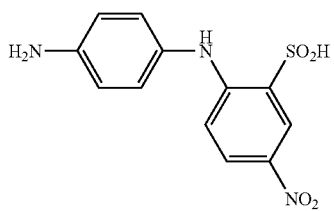
DK29
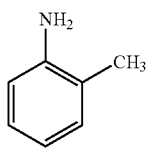
DK30
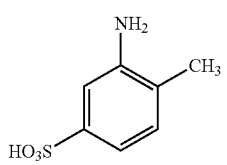
DK31
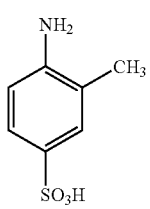
DK32
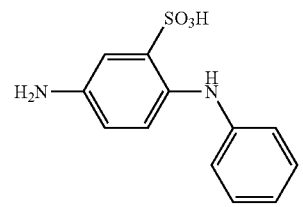
DK33
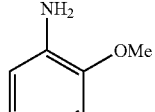
DK34
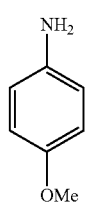
DK35
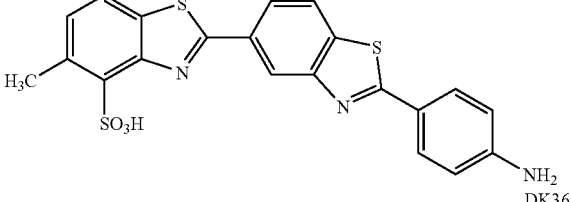
DK36
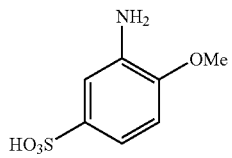
DK37
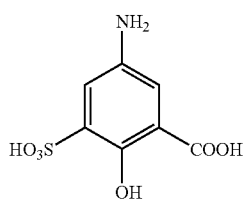
DK38
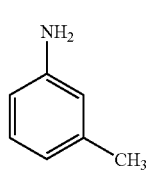
DK39
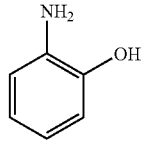
The Q radicals in the formulae DK21 to DK25 denote hydrogen, $C_1$-$C_4$-alkyl, carboxy-$C_1$-$C_4$-alkyl, $C_1$-$C_4$-hydroxyalkyl, $C_1$-$C_4$-alkoxy or phenylcarbonyl.
Suitable diazo components further include the hereinbelow indicated naphthylamines DK40 to 59: 4-amino-3-hydroxynaphthalene-1-sulfonic acid (DK40), 4-amino-3-hydroxy- 6-nitronaphthalene-1-sulfonic acid (DK41), 6-amino-4-hydroxynaphthalene-2-sulfonic acid (gamma acid, DK42), 4-amino-5-hydroxynaphthalene-1-sulfonic acid (Chicago S acid, DK43), 4-amino-5-hydroxynaphthalene-2,7-disulfonic acid (H acid DK44), 4-amino-5-hydroxynaphthalene-1,7-disulfonic acid (K acid, DK45), 8-aminonaphthalene-2-sulfonic acid (Cleve's acid 7, DK46), 6-aminonaphthalene-1-sulfonic acid (D acid, DK47), 4-aminonaphthalene-2,7-sulfonic acid (DK48), 5-aminonaphthalene-2-sulfonic acid (DK49), 7-amino-4,8-dihydroxynaphthalene-2-sulfonic acid (DK50), 2-amino-5-hydroxynaphthalene-1,7-disulfonic acid (DK51), 3-amino-5-hydroxynaphthalene-2,7-disulfonic acid (DK52), 3-amino-1,5-disulfonic acid (DK53), 7-aminonaphthalene-1-sulfonic acid (DK54), 4-aminonaphthalene-1-sulfonic acid (DK55), 5-aminonaphthalene-1-sulfonic acid (DK56), 7-aminonaphthalene-1,3,5-trisulfonic acid (DK57), 4-amino-3-hydroxy-7-[(4-methylphenyl)sulfonylamino]-naphthalene-1-sulfonic acid (DK58) and 7-amino-4-hydroxynaphthalene-2-sulfonic acid (J acid, DK59).

Examples of suitable monoamines $Dk^1$-$NH_2$ and $Dk^2$-$NH_2$ also include the hereinbelow indicated compounds DK60 to DK83:

DK60
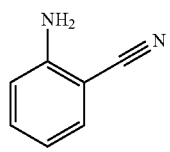

DK61
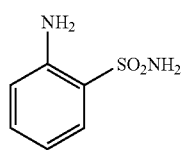

DK62
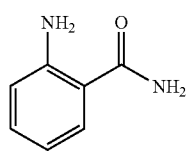

DK63
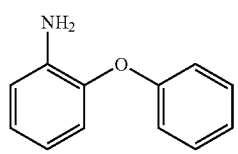

DK64
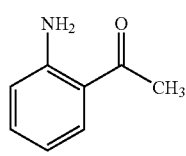

DK65
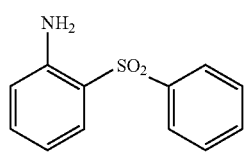

-continued

DK66
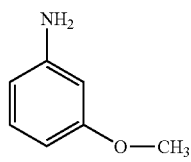

DK67
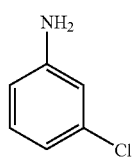

DK68
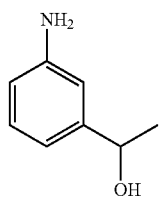

DK69
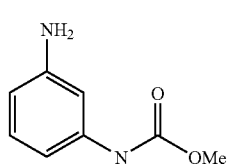

DK70
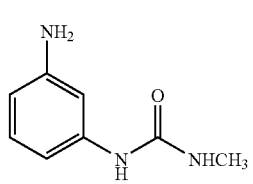

DK71
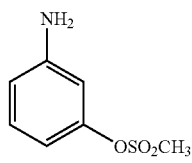

DK72
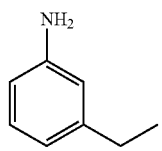

DK73
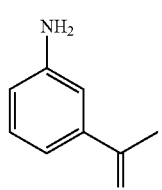

DK74
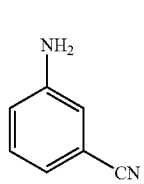

-continued

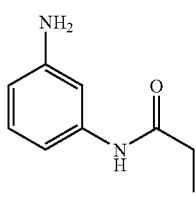
DK75

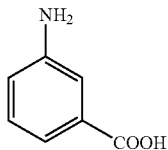
DK76

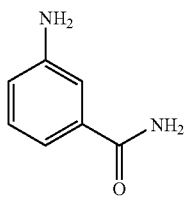
DK77

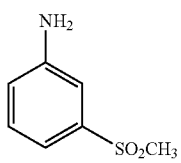
DK78

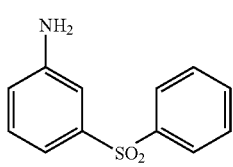
DK79

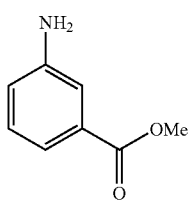
DK80

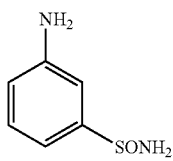
DK81

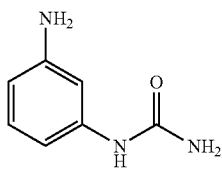
DK82

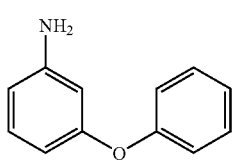
DK83

As $Kk^1$ and $Kk^2$ radicals there may in principle be used all mono-, di- or trivalent, as $Kk^3$ radicals all monovalent aromatic radicals which derive from an optionally substituted benzene, naphthalene, pyrazole, diphenylamine, diphenylmethane, pyridine, pyrimidine or diphenyl ether which each have 1, 2 or 3 free positions left over onto which a diazonium compound can be coupled successively one, two or three times. The compounds underlying the $Kk^1$, $Kk^2$ and $Kk^3$ radicals are hereinafter also referred to as a coupling component.

Suitable coupling components are for example benzene-derived compounds of the general formula Kk-A, naphthalene-derived compounds of the formula Kk-B, quinoline-derived compounds of the formula Kk-C, pyrazole-derived compounds of the formula Kk-D, diphenylmethane-derived compounds of the formula Kk-E, diphenylamine-derived compounds of the formula Kk-F, pyridine-derived compounds of the formula Kk-G and pyridone-derived compounds of the formula Kk-H:

-continued

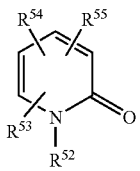
(Kk-H)

In the formula Kk-A, $R^{11}$ represents $NH_2$, OH, $C_1$-$C_4$-alkoxy, $C_1$-$C_4$-alkylamino, di-$C_1$-$C_4$-alkylamino, hydroxy-$C_1$-$C_4$-alkylamino, carboxy-$C_1$-$C_4$-alkylamino, $C_1$-$C_4$-alkylcarbonylamino or phenylamino, $R^{12}$ represents hydrogen, $NH_2$, OH, $C_1$-$C_4$-alkoxy, hydroxy-$C_1$-$C_4$-alkylamino, carboxy-$C_1$-$C_4$-alkylamino, $C_1$-$C_4$-alkylamino, di-$C_1$-$C_4$-alkylamino and $R^{13}$ represents hydrogen, CN, $C_1$-$C_4$-alkyl, $C_1$-$C_4$-alkoxy, $CONH_2$, $C_1$-$C_4$-alkylsulfonyl, $C_1$-$C_4$-alkylsulfonyloxy, $SO_2$-phenyl, $SO_3H$, $C_1$-$C_4$-alkylcarbonyl, $C_1$-$C_4$-alkoxycarbonyl, 1-hydroxyethyl, COOH, Cl, Br, F, $SO_2NR^{56}R^{57}$, $NO_2$ or $NH_2$, where $R^{56}$ and $R^{57}$ independently represent hydrogen, $C_1$-$C_4$-alkyl, formyl, $C_1$-$C_4$-alkylcarbonyl, $C_1$-$C_4$-alkyloxycarbonyl, $NH_2$—CO, $C_1$-$C_4$-alkylaminocarbonyl.

In the formula Kk-B, $R^{14}$ and $R^{15}$ independently represent hydrogen or have one of the meanings mentioned as $R^{11}$, although $R^{15}$ can represent $SO_3H$ as well. $R^{16}$ represents hydrogen, OH, $SO_3H$, $C_1$-$C_4$-alkylsulfonylamino, $C_1$-$C_4$-alkylaminosulfonyl, $C_1$-$C_4$-alkylaminosulfonylamino, di-$C_1$-$C_4$-alkylaminosulfonylamino, $C_1$-$C_4$-alkoxycarbonylamino, phenylsulfonylamino which may comprise one or two substituents selected from $C_1$-$C_4$-alkyl, $C_1$-$C_4$-alkoxy or halogen on the phenyl ring. $R^{17}$ represents hydrogen, OH or an $SO_3H$ group.

In the formula Kk-C, $R^{18}$ to $R^{20}$ independently represent hydrogen, OH or $C_1$-$C_4$-alkyl.

In the formula Kk-D, $R^{21}$ represents hydrogen, phenyl or naphthyl, wherein the 2 latter groups may comprise 1, 2 or 3 substituents selected from hydrogen, OH, halogen, $C_1$-$C_4$-alkyl, $SO_3H$, $NO_2$ and the above-defined group B—$SO_2$—. In one embodiment of the invention, $R^{21}$ represents one of the above-defined groups A and especially one of the groups A1 to A6. $R^{22}$ is hydrogen, COOH or $C_1$-$C_4$-alkyl.

In the formula Kk-E, $R^{23}$ and $R^{25}$ are independently hydrogen, COOH, hydroxyl or $C_1$-$C_4$-alkyl. $R^{24}$ and $R^{26}$ are independently hydrogen, hydroxyl or $C_1$-$C_4$-alkyl, In the formula Kk-F, $R^{27}$ and $R^{29}$ are independently hydrogen, $SO_3H$, COOH, hydroxyl or $C_1$-$C_4$-alkyl. $R^{28}$ and $R^{30}$ are independently hydrogen, hydroxyl or $C_1$-$C_4$-alkyl, In the formula Kk-G, $R^{48}$, $R^{49}$, $R^{50}$ and $R^{51}$ are independently hydrogen, $SO_3H$, COOH, $NH_2$, CN, hydroxyl or $C_1$-$C_4$-alkyl.

In the formula Kk-H, $R^{52}$, $R^{53}$, $R^{54}$ and $R^{55}$ are independently hydrogen, $SO_3H$, COOH, $NH_2$, CN, hydroxyl or $C_1$-$C_4$-alkyl.

Examples of coupling components of the formula Kk-A are the aforementioned aniline compounds DK3, DK4, DK6, DK7, DK11, DK13, DK14, DK15, DK18, DK21 to DK27, DK29, DK30, DK33, DK36, DK38, DK39, DK60 to DK83 also salicylic acid (Kk1), 3-aminophenol (Kk2), resorcinol (Kk3), 3-phenylaminophenol (Kk4), 1,3-diaminobenzene (Kk5), 3-acetylaminoaniline (Kk6), 2-nitroaniline (Kk7), 3-(diethylamino)phenol (Kk8), 3-(morpholin-1-yl)phenol (Kk9), 3-(diethylamino)aniline (Kk10), N-acetyl-3-(diethylamino)aniline (Kk11), N-(3-hydroxyphenyl)glycine (Kk12), 3-(2-hydroxyethyl)aminophenol (Kk13), 2,4-diaminotoluene (Kk14), 2,4-diaminobenzenesulfonic acid (Kk15), 2,4-diamino-1-nitrobenzene (Kk16), N-(3-amino-6-methylphenyl)glycine (Kk17), 2,4-diamino-5-methylbenzenesulfonic acid (Kk18), 2,4-diamino-1-hydroxybenzene (Kk54), 2,4-diamino-1-methoxybenzene (Kk55), 2,4-diamino-1-chlorobenzene (Kk56), 1,2,4-triaminobenzene (Kk57), 3-(dimethylamino)aniline (Kk58), 3-(dimethylamino)-1-nitrobenzene (Kk59), 2-(N,N-diethylamino)-4-acetylamino-1-methoxybenzene (Kk60), 2-(N,N-diethylamino)-4-amino-1-methoxybenzene (Kk61), 2,4-diamino-1-benzenesulfonamide (Kk62), 2-amino-4-acetylamino-1-methoxybenzene (Kk63) and 2-amino-4-acetylamino-1-chlorobenzene (Kk64).

Examples of coupling components of the formula Kk-B are 2-naphthol (Kk19), 2-phenylaminonaphthalene (Kk20), 4-methyl-1-naphthol (Kk21), 8-methoxycarbonylamino-2-naphthol (Kk22), 8-acetylamino-2-naphthol (Kk23), 8-methylaminosulfonyl-2-naphthol (Kk24), 8-dimethylaminosulfonylamino-2-naphthol (Kk25), 6-[(4-methylphenyl)sulfonyl]amino-4-hydroxynaphthalene-2-sulfonic acid (Kk26), 8-phenylaminonaphthalene-1-sulfonic acid (Kk27), 6-amino-4-hydroxynaphthalene-2-sulfonic acid (DK42), 4-amino-5-hydroxynaphthalene-1-sulfonic acid (DK43), 4-amino-5-hydroxynaphthalene-2,7-disulfonic acid (DK44), 4-amino-5-hydroxynaphthalene-1,7-disulfonic acid (DK45), 8-aminonaphthalene-2-sulfonic acid (DK46), 6-aminonaphthalene-1-sulfonic acid (DK47), 4-aminonaphthalene-2,7-disulfonic acid (DK48), 5-aminonaphthalene-2-sulfonic acid (DK49), 7-amino-4,8-dihydroxynaphthalene-2-sulfonic acid (DK50), 2-amino-5-hydroxynaphthalene-1,7-disulfonic acid (DK51), 3-amino-5-hydroxynaphthalene-2,7-disulfonic acid (DK52), 3-amino-1,5-disulfonic acid (DK53), 7-aminonaphthalene-1-sulfonic acid (DK54), 4-aminonaphthalene-1-sulfonic acid (DK55), 5-aminonaphthalene-1-sulfonic acid (DK56), 7-aminonaphthalene-1,3,5-trifsulfonic acid (DK57), 7-amino-4-hydroxynaphthalene-2-sulfonic acid (DK59), 4-hydroxynaphthalene-2,7-disulfonic acid (Kk28), 3-hydroxynaphthalene-2,7-disulfonic acid (Kk29), 4-(phenylcarbonyl)amino-5-hydroxynaphthalene-2,7-disulfonic acid (Kk30), 4,6-dihydroxynaphthalene-2-sulfonic acid (Kk31), 4,5-dihydroxynaphthalene-2,7-disulfonic acid (Kk32), 4-(phenylcarbonyl)-amino-5-hydroxynaphthalene-1-sulfonic acid (Kk33), 4-hydroxynaphthalene-1-sulfonic acid (Kk34), 4,5-dihydroxynaphthalene-1-sulfonic acid (Kk35), 7-hydroxynaphthalene-1,3-disulfonic acid (Kk36), 8-hydroxynaphthalene-1-sulfonic acid (Kk37), 4,6-dihydroxy-7-hydroxycarbonylnaphthalene-2-sulfonic acid (Kk38) and 4-acetylamino-5-hydroxynaphthalene-2,7-disulfonic acid (Kk39).

Examples of coupling components Kk-C are 2,4-dihydroxyquinoline (Kk40) and 8-hydroxyquinoline (Kk41).

Examples of coupling components Kk-D are 3-methyl-5-hydroxypyrazole (Kk42), 1-phenyl-3-methyl-5-hydroxypyrazole (Kk43), 1-[4-(2-hydroxysulfonyloxyethyl)-2-hydroxysulfonylphenyl]-3-methyl-5-hydroxypyrazole (Kk44), 1-[4-(2-hydroxysulfonyloxyethyl)-2-hydroxysulfonylphenyl]-5-hydroxypyrazole-3-carboxylic acid (Kk45), 1-[4-hydroxysulfonylphenyl]-5-hydroxypyrazole-3-carboxylic acid (Kk46) and 1-[6-hydroxysulfonylnaphthalen-2-yl]-5-hydroxy-3-methylpyrazole (Kk47), 1-[4-hydroxysulfonylphenyl]-3-methyl-5-hydroxypyrazole (Kk48).

An example of a Kk-E coupling component is 4,4'-dihydroxydiphenylmethane-3,3'-dicarboxylic acid (Kk49).

An example of a Kk-F coupling component is 4,4'-dihydroxydiphenylamine (Kk50).

An example of a Kk-G coupling component is 2,6-diaminopyridine (Kk51).

Examples of Kk-H coupling components are 1-methyl-2-pyridon (Kk52) and 3-cyano-4-methyl-6-hydroxy-1-ethylpyridon (Kk53).

Suitable $Kk^3$ radicals are in particular monovalent radicals derived from optionally substituted benzene or naphthalene, for example the monovalent radicals derived from the coupling components Kk-A and Kk-B such as the radicals derived from the aniline compounds DK3, DK4, DK6, DK7, DK11, DK13, DK14, DK15, DK18, DK21 to DK27, DK29, DK30, DK33, DK36, DK38, DK39, DK42 to DK83, Kk1 to Kk48 and Kk51 to Kk64.

The radicals $Tk^1$ and $Tk^2$ are divalent aromatic radicals derived from aromatic diamines of the formula $Tk^1(NH_2)_2$ and $Tk^2(NH_2)_2$ respectively. These diamines are hereinafter also referred to as a tetraazo component.

Suitable tetraazo components are for example benzene-derived compounds of the general formula Tk-A, biphenyl-derived compounds of the formula Tk-B, phenylbenzimidazole-derived compounds of the formula Tk-C, diphenylmethane-derived compounds of the formula Tk-D, diphenylamine-derived compounds of the formula Tk-E, phenylsulfonylbenzene-derived compounds of the formula Tk-F, phenylaminosulfonylbenzene-derived compounds of the formula Tk-G, stilbene-derived compounds of the formula Tk-H and phenylaminocarbonylbenzene-derived compounds of the formula Tk-J:

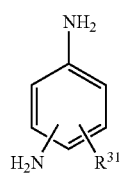
(Tk-A)

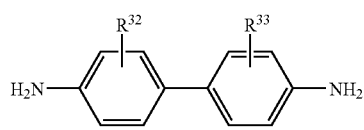
(Tk-B)

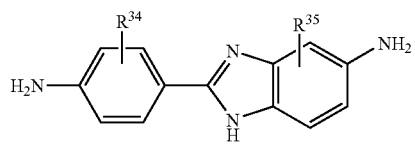
(Tk-C)

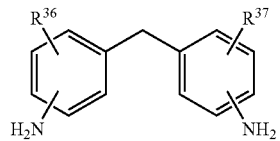
(Tk-D)

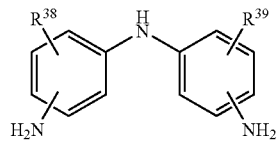
(Tk-E)

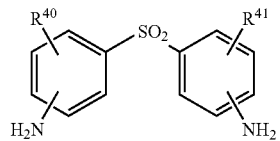
(Tk-F)

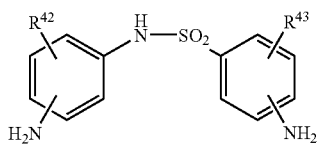
(Tk-G)

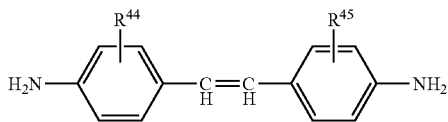
(Tk-H)

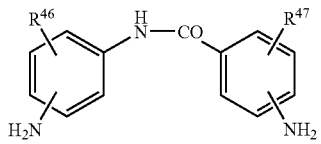
(Tk-J)

In the formula Tk-A, $R^{31}$ represents for example hydrogen, $C_1$-$C_4$-alkyl, $C_1$-$C_4$-alkoxy, COOH or $SO_3H$. Preferably, the two $NH_2$ groups are disposed para to each other.

Examples of compounds of the formula Tk-A are 1,4-diaminobenzene (Tk1), 1,4-diamino-2-methoxybenzene (Tk2), 2,5-diaminobenzoic acid (Tk3) and 2,5-diaminobenzenesulfonic acid (Tk4).

In the formula Tk-B, $R^{32}$ and $R^{33}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. Examples of compounds of the formula Tk-B are 4,4'-diaminobiphenyl (Tk5), 4,4'-diamino-3,3'-dimethylbiphenyl (Tk6), 4,4'-diamino-3,3'-dimethoxybiphenyl (Tk7), 4,4'-diamino-3,3'-dihydroxybiphenyl (Tk8), 4,4'-diamino-3-hydroxysulfonylbiphenyl (Tk9), 4,4'-diamino-3,3'-bis(hydroxysulfonyl)biphenyl (Tk10) and 4,4'-diamino-3,3'-dicarboxybiphenyl (Tk11).

In the formula Tk-C, $R^{34}$ and $R^{35}$ independently represent for example hydrogen, OH, $C_1$-$C_4$-alkyl or $C_1$-$C_4$-alkoxy. An example of a compound of the formula Tk-C is 6-amino-2-[4-aminophenyl]benzimidazole (Tk12).

In the formula Tk-D, $R^{36}$ and $R^{37}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. Examples of Tk-D compounds are bis(4-aminophenyl)methane (Tk13), bis(4-amino-3-carboxyphenyl)methane (Tk14) and bis(4-amino-3-methylphenyl)methane (Tk15).

In the formula Tk-E, $R^{38}$ and $R^{39}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-E compound is (4-aminophenyl)(4'-amino-2'-hydroxysulfonylphenyl)amine or 4,4'-diaminodiphenylamine-2-sulfonic acid (Tk16).

In the formula Tk-F, $R^{40}$ and $R^{41}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-F compound is bis-(4-aminophenyl) sulfone (Tk17).

In the formula Tk-G, $R^{42}$ and $R^{43}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-G compound is N-(4'-aminophenyl)-4-aminobenzenesulfonamide (Tk18).

In the formula Tk-H, $R^{44}$ and $R^{45}$ independently represent for example hydrogen, $C_1$-$C_4$-alkyl, COOH or $SO_3H$. Preferably, the two $NH_2$ groups are disposed in positions 4 and 4'.

An example of a Tk-H compound is 1,2-bis(4-amino-2-hydroxysulfonylphenyl)ethene (flavonic acid, Tk19).

In the formula Tk-J, $R^{46}$ and $R^{47}$ independently represent for example hydrogen, OH, $C_1$-$C_4$-alkyl, $C_1$-$C_4$-alkoxy, COOH or $SO_3H$. Preferably, the two $NH_2$ groups are disposed in positions 4 and 4'. An example of a Tk-J compound is N-(4'-aminophenyl)-4-aminobenzamide (Tk20).

Preferred $Napht^1$ and $Napht^2$ radicals obey the general formula II:

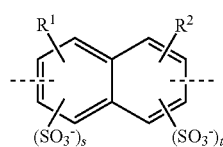

where $R^1$ and $R^2$ are independently hydrogen, OH, $NH_2$ or $NHC(O)R^3$, where $R^3$ is hydrogen, $C_1$-$C_4$-alkyl, maleyl or phenyl, and at least one of $R^1$ and $R^2$ is other than hydrogen, - - - - represents the bonds to the azo groups, s and t represent 0 or 1. The s+t sum is preferably 1 or 2.

Examples of suitable $Napht^1$ and $Napht^2$ radicals include the hereinbelow recited radicals II-1 to II-14:
2-hydroxysulfonyl-4-hydroxynaphthalene-3,6-diyl (II-1),
6-amino-2-hydroxysulfonyl-4-hydroxynaphthalene-3,5-diyl (II-2),
1-hydroxysulfonyl-5-hydroxynaphthalene-4,6-diyl (II-3),
4-amino-1-hydroxysulfonyl-5-hydroxynaphthalene-3,6-diyl (II-4),
2-hydroxysulfonyl-4-hydroxynaphthalene-3,7-diyl (II-5),
7-amino-2-hydroxysulfonyl-4-hydroxynaphthalene-3,8-diyl (II-6),
5-hydroxy-2,7-bishydroxysulfonylnaphthalene-4,6-diyl (II-7),
4-amino-5-hydroxy-2,7-bishydroxysulfonylnaphthalene-3,6-diyl (II-8),
5-hydroxy-1,7-bishydroxysulfonylnaphthalene-4,6-diyl (II-9),
4-amino-5-hydroxy-1,7-bishydroxysulfonylnaphthalene-3,6-diyl (II-10),
2-hydroxysulfonylnaphthalene-5,8-diyl (II-11),
2-amino-5-hydroxy-1,7-bishydroxysulfonylnaphthalene-3,6-diyl (II-12),
5-hydroxy-2,7-bishydroxysulfonylnaphthalene-3,6-diyl (II-13),
3-amino-5-hydroxy-2,7-bishydroxysulfonylnaphthalene-4,6-diyl (II-14),
2-hydroxysulfonylnaphthalene-5,8-diyl (II-15) and
1-hydroxysulfonylnaphthalene-5,8-diyl (II-16).

The radicals P and R' are divalent radicals derived from benzene or naphthalene, for example radicals derived from the coupling components of the formulae Kk-A and Kk-B and also radicals which are derived from the aforementioned diazo components and still have a free position onto which a diazonium compound can be coupled. Examples thereof are the aniline compounds DK3, DK4, DK6, DK7, DK11, DK13, DK14, DK15, DK18, DK21 to DK27, DK29, DK30, DK33, DK36, DK38, DK39 and DK60 to DK83 and also the naphthylamines DK42 to DK59.

Preference among the dyes F used according to the invention is given to dyes of the formulae II, III, IV and VI wherein at least one of the $Tk^1$ and/or $Tk^2$ groups represents a radical of the formula VIII

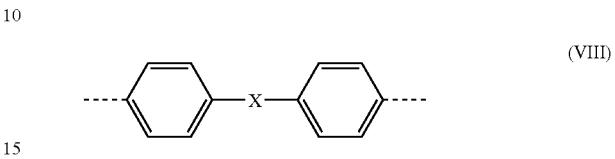

where - - - - represent the bonds to the azo groups and X represents a chemical bond or a bivalent radical selected from —CH=CH—, —$SO_2$—NR—, —$SO_2$—O—, —NR—, —$SO_2$—, —SO—NR— and —CO—NR—, wherein R represents hydrogen or $C_1$-$C_4$-alkyl. Preference here is given to those groups VIII wherein X represents —$SO_2$—NR— and more preferably represents —$SO_2$—NR—.

Particular preference among the dyes of the formulae I, II, III and IV is given to those dyes wherein $Napht^1$ and/or $Napht^2$ represent a bivalent radical of the above-defined general formula II and in particular have the concrete meanings recited there.

Particular preference among the dyes of the general formulae I to VII is given to those dyes wherein either or both of the $Dk^1$ and $Dk^2$ radicals or A represent one of the above-defined A1 to A6 radicals.

Preference among the dyes F is given especially to the dyes of the general formula II and particularly to the dyes of the general formula IIa:

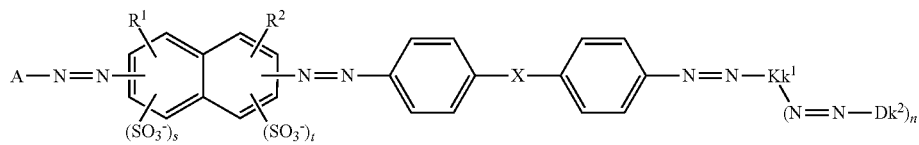

where n, A, $Dk^2$ and $Kk^1$ have the previously indicated meanings and especially the meanings indicated as preferred,
$R^1$ and $R^2$ independently represent hydrogen, OH, $NH_2$ or $NHC(O)R^3$, where $R^3$ represents hydrogen, $C_1$-$C_4$-alkyl, maleinyl or phenyl, and at least one of $R^1$ and $R^2$ is other than hydrogen,
s and t represent 0 or 1 and the sum total s+t has the value 1 or 2, and
X represents a chemical bond or a bivalent radical selected from —CH=CH—, —$SO_2$—NR—, —$SO_2$—O—, —NR—, —$SO_2$—, —SO—NR— and —CO—NR—, wherein R represents hydrogen or $C_1$-$C_4$-alkyl. Preference among these is given to those dyes IIa wherein at least one of $R^1$ and $R^2$ and especially both the radicals $R^1$ and $R^2$ is other than hydrogen. More particularly, s=t=1. X represents in particular —$SO_2$—NR— and more preferably —$SO_2$—NH—.

The azo dyes of the general formulae I to VII which are used according to the invention and their metal complexes are prepared in a conventional manner involving a multistep diazotization/coupling sequence which constructs the dye through successive diazotizing/coupling; that is, the linking of the individual diazo or NH group building blocks takes place successively, or through a convergent synthesis, i.e., moieties of the dye which already comprise azo groups or NH groups are generated and subsequently linked via a further diazotization/coupling to a further moiety of the dye that likewise already comprises one or more azo groups, optionally by means of a coupling or tetraazo component.

In the course of successive diazotizing/coupling, for example, first the diazonium components $Dk^1$ and $Dk^2$ is diazotized and coupled onto respectively $Napht^1$ and $Napht^2$, $Kk^1$ or $Kk^2$ or onto a P or R' group, then the reaction product is again diazotized and coupled onto a further coupling partner and this operation is optionally repeated until the dye has been constructed. Alternatively, in the successive synthesis, the reaction product of the first coupling can also be reacted in succession with one or more diazonium compounds.

Successive coupling may involve a tetrazo component $Tk^1(NH_2)_2$ or $Tk^2(NH_2)_2$ being initially converted into the corresponding tetrazonium salt and then reacted in succession with $Kk^1$, P, $Napht^1$, $Napht^2$, etc. coupling partners and then further diazotization/coupling reactions being carried out.

Such processes are known from the prior art for anionic azo dyes and can be applied analogously to the synthesis of the dyes I to VII.

The diazotization and coupling of the resulting diazonium or tetrazonium compound customarily takes place in an aqueous reaction medium under pH control in a conventional manner.

When the reacted moieties already comprise an A group which bears a B radical of the formula $CH_2CH_2$-Q, then the pH of the reaction mixture will preferably not exceed a value of pH 8, since otherwise the Q group will detach with vinyl group formation.

In couplings of a diazonium component or of a tetrazonium component onto a naphthalene compound of the formulae II and Kk-B respectively, which bears not only an OH group but also an amino group and comprises at least two possible coupling sites, it must be borne in mind that the first coupling takes place regioselectively ortho to the amino group at pH values of not more than 3, whereas at pH values of pH≧6 and preferably pH≧8 the regioselective coupling takes place in the ortho position of the OH group.

The reaction temperatures required for the diazotization/coupling or the reaction with triazines are generally in the range from 0° C. to 50° C. and especially in the range from 0 to 30° C. The required reaction times are customarily in the range from 5 min to 2 h and especially in the range from 20 min to 1 h.

The reactions are customarily carried out stoichiometrically; that is, the reaction partners are reacted with each other in the desired stoichiometry. However, individual reactants can also be used in excess or in deficiency, based on the desired stoichiometry. The deviation from the desired stoichiometry will be in general not more than 20 mol % and especially not more than 10 mol %. In other words, for the reaction of a diazonium component with a coupling partner the molar ratio of the two components will be in the range from 1:1.2 to 1.2:1 and especially in the range from 1.1:1 to 1:1.1. To react a tetrazonium compound with 2 mol equivalents of a coupling partner, this coupling partner will accordingly be used in an amount from 1.6 to 2.4 mol and especially in an amount from 1.8 to 2.2 mol per mole of tetrazonium compound.

Following the diazotization/coupling sequence, the transition metal complexes may be prepared by adding the desired transition metal salt in the form of a suitable, preferably water-soluble salt in the stoichiometrically desired amount and if necessary heating to the temperature required for complexing, for example to temperatures in the range from 40 to 100° C.

The dye is isolated from the aqueous reaction mixture in a conventional manner, for example by evaporating and especially by spray-drying the aqueous reaction mixture, by salting out the dye and drying the presscake. To prepare a liquid brand or liquid formulation of the dye, the dye presscake, or the powder obtained by evaporation or spray drying, can be dissolved. It is also possible to prepare a liquid formulation of the dye directly from the reaction solution. It may then be necessary for a sufficiently high dye concentration and for the stability of the liquid brand to carry out a dia-and/or ultrafiltration operation in order that the inorganic salts formed in the course of the synthesis may be depleted and the solution concentrated.

The process of the invention comprises a dyeing step at a pH of at least 8. To this end, the leather to be dyed is treated in an aqueous float which has a pH of at least 8.0 and which includes at least one dye F of the above-identified kind. The float pH customarily does not exceed pH 11 and preferably pH 10.5. More particularly, the float pH will be in the range from 8.5 to 10. The alkaline pH ensures that the dye is fixed on the leather, since, under these conditions, the group A will react with the amino groups of the leather to form a covalent bond.

To obtain the pH which is alkaline for the fixation, any desired alkalis and buffer systems can be used. Examples are alkali metal carbonates and bicarbonates such as sodium carbonate, potassium carbonate and sodium bicarbonate, also alkali metal hydroxides such as aqueous sodium hydroxide solution, sodium metasillicate, pyrophosphates such as sodium pyrophosphate or potassium pyrophosphate, tripotassium phosphate, trisodium phosphate, borax/aqueous sodium hydroxide solution buffer and phosphate buffer.

The temperatures required for fixing the dye are advantageously not more than 60° C., especially not more than 50° C., and more preferably not more than 40° C., enabling leather to be dyed benignly. Dyeing temperatures are generally at least 10° C., preferably at least 20° C., and especially at least 30° C. in order that a sufficient rate of reaction may be ensured and thus the dyeing process may be speeded. In principle, however, lower temperatures are possible as well. The temperature range for organically tanned leather is preferably 15 to 50° C. and particularly 30 to 40° C. The preferred temperature range for metal oxide tanned leather is 15 to 60° C. and particularly 30 to 50° C.

Adequate fixation generally requires treatment times from 0.5 h to 4 h, depending on pH and temperature. A person skilled in the art will be able to determine required treatment times for the particular dye used by performing simple routine experiments. Especially at strongly alkaline pH values in the range from 9.5 to 11 and especially from 9.5 to 10.5 the dyeing time is preferably not more than 2 h, for example in the range from 0.5 to 2 h.

Dyeing may be carried out in the presence of added salts, for example Glauber salt. There is no measurable effect on the dyeing outcome as a result.

As well as the dyes F which are used according to the invention, the float may also include conventional acid or direct dyes. However, their fraction is preferably not more than 10% by weight and especially not more than 5% by weight, based on the total amount of dyes in the float.

The amount of dye used depends on the desired depth of shade and is customarily at least 0.2% by weight, frequently at least 0.5% by weight and especially 1% by weight, based on the shaved weight of the leather or intermediate article used. The dye will generally be used in an amount of up to 20% by weight, based on the shaved weight, although larger amounts of dye can be used as well. To achieve medium to high depths of shade, the dye F will be used in an amount which depends on the molar extinction coefficient of the dye and of the molecular weight of the dye and will be generally in the range from 2% to 20% by weight, frequently 4% to 20% by weight and especially in the range from 6% to 20% by weight, based on the shaved weight of the leather or intermediate article.

The aqueous float may include customary anionic dyeing assistants, nonionic surface-active substances and also tanning materials customarily used for retanning, for example polymeric retanning materials, synthetic retanning materials, vegetable tanning materials and fatliquors.

Dyeing can be carried out not only in one stage but also in 2 stages. In the case of a two-stage dyeing, the leather will initially be treated, in a first stage, with the dye-containing float at below pH 7, for example pH 3 to 6.5 and preferably at pH values in the range from 4 to 6.5. This step serves to distribute the dye uniformly in the leather cross-section. Subsequently, in the second stage, the dye will be fixed in the above-described manner at pH values of at least 8, for example 8 to 11, especially 8.5 to 10.5 and specifically 8.5 to 10. It is also possible to carry out the dyeing in a one-stage process without the fixation stage being preceded by a distribution stage.

Although not absolutely necessary, a wash may be carried out after the dyeing operation in order that chemically unbound dye and also impurities in the dye, for example dyes without an A group, may be removed. The reason this wash is not absolutely necessary is that dye fixation will already be quantitative or almost quantitative in many cases. If a subsequent wash is carried out, the as-dyed leather will be washed with water one or more times, for example 1 to 6 times and especially 1 to 4 times. The amount of water will generally be not more than 300% by weight, based on the shaved weight of the intermediate article, for example in the range from 100% to 300% by weight. The duration of a single wash step will be typically in the range from 5 to 60 min and especially in the range from 10 to 30 min.

Leather dyeing including retanning, fatliquoring and aftertreatment is effected in a conventional manner, for example by dyeing in a drum, or in a paddle. Such processes are extensively described in the prior art, for example in: "Bibliothek des Leders", volume 3 (tanning agents, tanning and retanning) [1985], volume 4 (defatting, fatliquoring and hydrophobicization in leather manufacture) [1987] & volume 5 (the dyeing of leather) [1987] Umschau Verlag; "Leather Technicians Handbook", 1983, by J. H. Sharphouse, published by Leather Producers Association; and "Fundamentals of Leather Manufacturing", 1993, by E. Heidenmann, published by Eduard Roether KG.

Dyeing is customarily carried out after pretanning, i.e., before, during or after retanning. The dyeing operation can be carried out not only in the same bath as the retanning operation but also in a separate bath. The dyeing operation is preferably carried out before retanning. It is preferable for one or more of the washing steps described above to be carried out after tanning and before retanning and fatliquoring.

The dyeing and retanning operation is generally followed by a fatliquoring operation in order that the leather be adjusted to desired haptic properties. However, retanning and fatliquoring can also be carried out in one process step. The fatliquoring step can be carried out at any stage of the wet end operation and is preferably carried out at the end of the wet end operation.

In general, not only the fatliquoring but also the retanning is fixed at the end of the operation by acidification, i.e., a final acidification takes place after dyeing and any retanning and fatliquoring. Typically, for acidification, the pH of the aqueous treatment bath is adjusted to a value below 3.7 by addition of an acid, especially formic acid.

The process of the invention can in principle be used to dye all types of leather, i.e., intermediate articles which have not been retanned, such as metal oxide tanned leather (wet blue with chromium oxide tanning and wet white with aluminum oxide tanning) and organically tanned, for example aldehyde-tanned, leather (wet white), or vegetable-tanned leather, and also intermediate articles which have been retanned, such as bark or crust leather.

The leather dyed according to the process of the invention is notable for an excellent fastness level even at very high depth of shade. Rubfastnesses and especially wash-, perspiration- and migrationfastnesses are particularly good, which is very difficult if not impossible to achieve in the case of conventionally dyed leathers. The leathers dyed according to the process of the invention exhibit no staining or almost no staining of the contact material in migrationfastness tests even at high humidity and high temperatures, i.e., above 50° C., for example 60 to 100° C.

Qualitative and quantitative determination via UV/VIS spectroscopy and HPLC show that the dyes of the invention give degrees of fixation between 85 and 100% and frequently above 90%.

The examples which follow illustrate the invention.

PREPARATION EXAMPLES

Example 1a

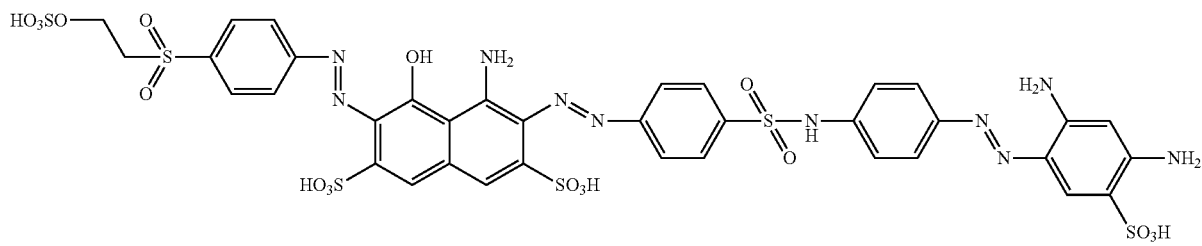

Method A 1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the solution of the tetrazotized 4,4-diaminodiphenylsulfamide. In the process, the pH was maintained below 3 by addition of hydrochloric acid.

2) 1 mol of parabase (4-(2-hydroxysulfonylethyl)sulfonylaniline) was suspended in ice-water and diazotized at pH<1 and 0-5° C. with excess sodium nitrite and hydrochloric acid. Subsequently, the reaction mixture was added to the reaction mixture obtained in step 1). The pH was maintained between 3 and 8 by addition of 10% by weight aqueous sodium hydroxide solution.

3) 1 mol of metamine acid was added to the reaction mixture obtained in step 2) and the pH was maintained between 3 and 8 by addition of 10% by weight aqueous sodium hydroxide solution. After the reaction had ended, the dye was precipitated by addition of NaCl and filtered off with suction.

Method B:

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH was maintained below 3.

2) 1 mol of metamine acid was added to the reaction mixture obtained in step 1) and the pH was maintained between 3 and 8 by addition of 10% by weight aqueous sodium hydroxide solution.

3) 1 mol of parabase was suspended in ice-water and diazotized at pH<1 and 0-5° C. with excess sodium nitrite and hydrochloric acid. Subsequently, the reaction mixture was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 1a it is possible to obtain the dyes of the general formula A-N=N-Napht$^1$-N=N-Tk$^1$-N=N-Kk$^1$ (=dyes of the general formula II where Dk$^1$=A and n=0) wherein Kk$^1$ represents a radical derived from the coupling components Kk1 to Kk64, DK3, DK4, DK6, DK7, DK11, DK13, DK14, DK15, DK18, DK21 to DK27, DK29, DK30, DK33, DK36, DK38, DK39 or DK42 to DK83, Napht$^1$ represents one of the bivalent radicals II-2, II-4, II-6, II-8, II-10, II-12 and II-14, Tk$^1$ represents a radical derived from a tetrazo component Tk1 to Tk20 and A represents one of the radicals A1 to A6. The coupling of the radical A-N=N— takes place ortho to the hydroxyl group in Napht$^1$. Examples thereof are listed in table 1.

TABLE 1

| Example No. | A | Napht$^1$ | Tk | Kk |
|---|---|---|---|---|
| 1a | A1 | DK44 | Tk18 | Kk15 |
| 1b | A1 | DK44 | Tk18 | Kk5 |

TABLE 1-continued

| Example No. | A | Napht$^1$ | Tk | Kk |
|---|---|---|---|---|
| 1c | A1 | DK44 | Tk18 | Kk2 |
| 1d | A1 | DK44 | Tk18 | Kk3 |
| 1e | A1 | DK44 | Tk18 | Kk6 |
| 1f | A1 | DK44 | Tk18 | Kk1 |
| 1g | A1 | DK44 | Tk18 | Kk4 |
| 1h | A1 | DK44 | Tk18 | Kk7 |
| 1i | A1 | DK44 | Tk18 | Kk9 |
| 1j | A1 | DK44 | Tk18 | Kk10 |
| 1k | A1 | DK44 | Tk18 | Kk14 |
| 1l | A1 | DK44 | Tk18 | Kk16 |
| 1m | A1 | DK44 | Tk18 | Kk26 |
| 1n | A1 | DK44 | Tk18 | Kk27 |
| 1o | A1 | DK44 | Tk18 | Kk40 |
| 1p | A1 | DK44 | Tk18 | Kk46 |
| 1q | A1 | DK44 | Tk18 | Kk48 |
| 1r | A1 | DK44 | Tk18 | Dk4 |
| 1s | A1 | DK44 | Tk18 | Dk11 |
| 1t | A1 | DK44 | Tk18 | Dk18 |
| 1u | A1 | DK44 | Tk18 | Dk29 |
| 1v | A1 | DK44 | Tk18 | Dk30 |
| 1z | A1 | DK44 | Tk18 | Dk39 |
| 1aa | A1 | DK44 | Tk16 | Kk5 |
| 1ab | A1 | DK44 | Tk16 | Kk3 |
| 1ac | A1 | DK44 | Tk16 | Kk4 |
| 1ad | A1 | DK44 | Tk16 | Dk4 |
| 1ae | A1 | DK44 | Tk19 | Kk5 |
| 1af | A1 | DK45 | Tk18 | Kk5 |
| 1ag | A4 | DK44 | Tk18 | Kk5 |
| 1ah | A2 | DK44 | Tk18 | Kk15 |
| 1ai | A3 | DK44 | Tk18 | Kk15 |
| 1aj | A4 | DK45 | Tk18 | Kk10 |
| 1ak | A6 | DK45 | Tk18 | Kk14 |
| 1al | A5 | DK45 | Tk18 | Kk16 |
| 1am | A4 | DK45 | Tk18 | Kk26 |
| 1an | A1 | DK44 | Tk18 | Kk11 |
| 1ao | A1 | DK44 | Tk18 | Kk51 |
| 1ap | A1 | DK44 | Tk18 | Kk52 |
| 1aq | A1 | DK44 | Tk18 | Kk53 |
| 1ar | A1 | DK44 | Tk18 | Kk54 |
| 1as | A1 | DK44 | Tk18 | Kk55 |
| 1at | A1 | DK44 | Tk18 | Kk56 |
| 1au | A1 | DK44 | Tk18 | Kk57 |
| 1av | A1 | DK44 | Tk18 | Kk58 |
| 1aw | A1 | DK44 | Tk18 | Kk59 |
| 1ax | A1 | DK44 | Tk18 | Kk60 |
| 1ay | A1 | DK44 | Tk18 | Kk61 |
| 1az | A1 | DK44 | Tk18 | Kk62 |
| 1ba | A1 | DK44 | Tk18 | Kk63 |
| 1bb | A1 | DK44 | Tk18 | Kk64 |
| 1bc | A1 | DK44 | Tk18 | DK66 |
| 1bd | A1 | DK45 | Tk18 | Kk1 |
| 1be | A1 | DK45 | Tk18 | Kk2 |
| 1bf | A1 | DK45 | Tk18 | Kk3 |
| 1bg | A1 | DK45 | Tk18 | Kk4 |
| 1bh | A1 | DK45 | Tk18 | Kk6 |
| 1bi | A1 | DK45 | Tk18 | Kk7 |
| 1bj | A1 | DK45 | Tk18 | Kk10 |
| 1bk | A1 | DK45 | Tk18 | Kk11 |
| 1bl | A1 | DK45 | Tk18 | Kk14 |
| 1bm | A1 | DK45 | Tk18 | Kk15 |
| 1bn | A1 | DK45 | Tk18 | Kk16 |
| 1bo | A1 | DK45 | Tk18 | Kk51 |
| 1bp | A1 | DK45 | Tk18 | Kk53 |
| 1bq | A1 | DK45 | Tk18 | Kk54 |
| 1br | A1 | DK45 | Tk18 | Kk55 |
| 1bs | A1 | DK45 | Tk18 | Kk56 |
| 1bt | A1 | DK45 | Tk18 | Kk61 |
| 1bu | A1 | DK45 | Tk18 | Kk62 |
| 1bv | A1 | DK45 | Tk18 | Kk63 |
| 1bw | A1 | DK45 | Tk18 | Kk64 |
| 1bx | A1 | DK45 | Tk18 | DK66 |
| 1by | A1 | DK44 | Tk16 | Kk10 |
| 1bz | A1 | DK44 | Tk16 | Kk11 |
| 1ca | A1 | DK44 | Tk16 | Kk14 |
| 1cb | A1 | DK44 | Tk16 | Kk15 |
| 1cc | A1 | DK44 | Tk16 | Kk16 |
| 1cd | A1 | DK44 | Tk16 | Kk51 |
| 1ce | A1 | DK44 | Tk16 | Kk53 |

TABLE 1-continued

| Example No. | A | Napht[1] | Tk | Kk |
|---|---|---|---|---|
| 1cf | A1 | DK44 | Tk16 | Kk54 |
| 1cg | A1 | DK44 | Tk16 | Kk55 |
| 1ch | A1 | DK44 | Tk16 | Kk56 |
| 1ci | A1 | DK44 | Tk16 | Kk61 |
| 1cj | A1 | DK44 | Tk16 | Kk62 |
| 1ck | A1 | DK44 | Tk16 | Kk63 |
| 1cl | A1 | DK44 | Tk16 | Kk64 |
| 1cm | A1 | DK44 | Tk16 | DK66 |
| 1cn | A1 | DK44 | Tk19 | Kk2 |
| 1co | A1 | DK44 | Tk19 | Kk3 |
| 1cp | A1 | DK44 | Tk19 | Kk10 |
| 1cq | A1 | DK44 | Tk19 | Kk11 |
| 1cr | A1 | DK44 | Tk19 | Kk14 |
| 1cs | A1 | DK44 | Tk19 | Kk15 |
| 1ct | A1 | DK44 | Tk19 | Kk16 |
| 1cu | A1 | DK44 | Tk19 | Kk51 |
| 1cv | A1 | DK44 | Tk19 | Kk53 |
| 1cw | A1 | DK44 | Tk19 | Kk54 |
| 1cx | A1 | DK44 | Tk19 | Kk55 |
| 1cy | A1 | DK44 | Tk19 | Kk56 |
| 1cz | A1 | DK44 | Tk19 | Kk61 |
| 1da | A1 | DK44 | Tk19 | Kk62 |
| 1db | A1 | DK44 | Tk19 | Kk63 |
| 1dc | A1 | DK44 | Tk19 | Kk64 |
| 1dd | A1 | DK44 | Tk19 | DK66 |
| 1de | A1 | DK44 | Tk20 | Kk2 |
| 1df | A1 | DK44 | Tk20 | Kk3 |
| 1dg | A1 | DK44 | Tk20 | Kk5 |
| 1dh | A1 | DK44 | Tk20 | Kk10 |
| 1di | A1 | DK44 | Tk20 | Kk11 |
| 1dj | A1 | DK44 | Tk20 | Kk14 |
| 1dk | A1 | DK44 | Tk20 | Kk15 |
| 1dl | A1 | DK44 | Tk20 | Kk16 |
| 1dm | A1 | DK44 | Tk20 | Kk51 |
| 1dn | A1 | DK44 | Tk20 | Kk53 |
| 1do | A1 | DK44 | Tk20 | Kk54 |
| 1dp | A1 | DK44 | Tk20 | Kk55 |
| 1dq | A1 | DK44 | Tk20 | Kk56 |
| 1dr | A1 | DK44 | Tk20 | Kk61 |
| 1ds | A1 | DK44 | Tk20 | Kk62 |
| 1dt | A1 | DK44 | Tk20 | Kk63 |
| 1du | A1 | DK44 | Tk20 | Kk64 |
| 1dv | A1 | DK44 | Tk20 | DK66 |
| 1dw | A1 | DK45 | Tk16 | Kk2 |
| 1dx | A1 | DK45 | Tk16 | Kk3 |
| 1dy | A1 | DK45 | Tk16 | Kk5 |
| 1dz | A1 | DK45 | Tk16 | Kk10 |
| 1ea | A1 | DK45 | Tk16 | Kk11 |
| 1eb | A1 | DK45 | Tk16 | Kk14 |
| 1ec | A1 | DK45 | Tk16 | Kk15 |
| 1ed | A1 | DK45 | Tk16 | Kk16 |
| 1ee | A1 | DK45 | Tk16 | Kk51 |
| 1ef | A1 | DK45 | Tk16 | Kk53 |
| 1eg | A1 | DK45 | Tk16 | Kk54 |
| 1eh | A1 | DK45 | Tk16 | Kk55 |
| 1ei | A1 | DK45 | Tk16 | Kk56 |
| 1ej | A1 | DK45 | Tk16 | Kk61 |
| 1ek | A1 | DK45 | Tk16 | Kk62 |
| 1el | A1 | DK45 | Tk16 | Kk63 |
| 1em | A1 | DK45 | Tk16 | Kk64 |
| 1en | A1 | DK45 | Tk16 | DK66 |
| 1eo | A1 | DK45 | Tk19 | Kk2 |
| 1ep | A1 | DK45 | Tk19 | Kk3 |
| 1eq | A1 | DK45 | Tk19 | Kk5 |
| 1er | A1 | DK45 | Tk19 | Kk10 |
| 1es | A1 | DK45 | Tk19 | Kk11 |
| 1et | A1 | DK45 | Tk19 | Kk14 |
| 1eu | A1 | DK45 | Tk19 | Kk15 |
| 1ev | A1 | DK45 | Tk19 | Kk16 |
| 1ew | A1 | DK45 | Tk19 | Kk51 |
| 1ex | A1 | DK45 | Tk19 | Kk53 |
| 1ey | A1 | DK45 | Tk19 | Kk54 |
| 1ez | A1 | DK45 | Tk19 | Kk55 |
| 1fa | A1 | DK45 | Tk19 | Kk56 |
| 1fb | A1 | DK45 | Tk19 | Kk61 |
| 1fc | A1 | DK45 | Tk19 | Kk62 |
| 1fd | A1 | DK45 | Tk19 | Kk63 |
| 1fe | A1 | DK45 | Tk19 | Kk64 |
| 1ff | A1 | DK45 | Tk19 | DK66 |
| 1fg | A1 | DK45 | Tk20 | Kk2 |
| 1fh | A1 | DK45 | Tk20 | Kk3 |
| 1fi | A1 | DK45 | Tk20 | Kk5 |
| 1fj | A1 | DK45 | Tk20 | Kk10 |
| 1fk | A1 | DK45 | Tk20 | Kk11 |
| 1fl | A1 | DK45 | Tk20 | Kk14 |
| 1fm | A1 | DK45 | Tk20 | Kk15 |
| 1fn | A1 | DK45 | Tk20 | Kk16 |
| 1fo | A1 | DK45 | Tk20 | Kk51 |
| 1fp | A1 | DK45 | Tk20 | Kk53 |
| 1fq | A1 | DK45 | Tk20 | Kk54 |
| 1fr | A1 | DK45 | Tk20 | Kk55 |
| 1fs | A1 | DK45 | Tk20 | Kk56 |
| 1ft | A1 | DK45 | Tk20 | Kk61 |
| 1fu | A1 | DK45 | Tk20 | Kk62 |
| 1fv | A1 | DK45 | Tk20 | Kk63 |
| 1fw | A1 | DK45 | Tk20 | Kk64 |
| 1fx | A1 | DK45 | Tk20 | DK66 |

Example 2a

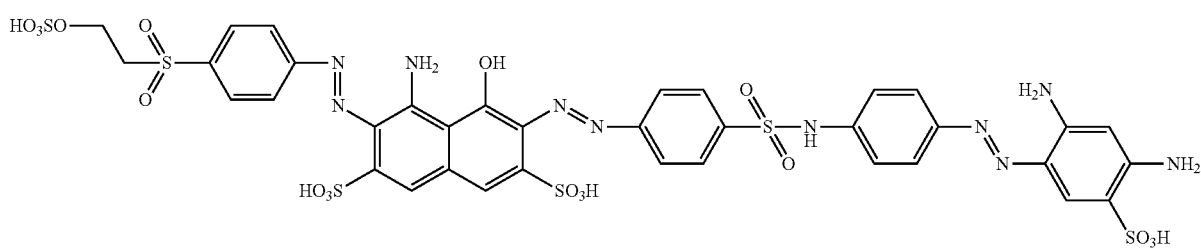

1) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized parabase. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3-8 by addition of 10% by weight aqueous sodium hydroxide solution.

3) 1 mol of metamine acid was added to the reaction mixture obtained in step 2) and the pH was maintained between 3-8 by addition of 10% by weight aqueous sodium hydroxide solution. After the reaction had ended, the dye was precipitated by addition of NaCl and filtered off with suction.

Proceeding in a manner analogous to example 2a it is possible to obtain the dyes of the general formula A-N=N-Napht$^1$-N=N-Tk$^1$-N=N-Kk$^1$ (=dyes of the general formula II where Dk$^1$=A and n=1) wherein Kk$^1$ represents a radical derived from the coupling components Kk1 to Kk64, DK3, DK4, DK6, DK7, DK11, DK13, DK14, DK15, DK18, DK21 to DK27, DK29, DK30, DK33, DK36, DK38, DK39 or DK42 to DK83, Napht represents one of the bivalent radicals II-2, II-4, II-6, II-8, II-10, II-12 and II-14, Tk$^1$ represents a bivalent radical derived from a tetrazo component Tk1 to Tk20 and A represents one of the radicals A1 to A6. The coupling of the radical A-N=N— takes place ortho to the amino group in Napht$^1$. Examples thereof are listed in table 2.

TABLE 2

| Example No. | A | Napht$^1$ | Tk | Kk |
| --- | --- | --- | --- | --- |
| 2a | A1 | DK44 | Tk18 | Kk15 |
| 2b | A1 | DK44 | Tk18 | Kk5 |
| 2c | A1 | DK44 | Tk18 | Kk2 |
| 2d | A1 | DK44 | Tk18 | Kk3 |
| 2e | A1 | DK44 | Tk18 | Kk6 |
| 2f | A1 | DK44 | Tk18 | Kk1 |
| 2g | A1 | DK44 | Tk18 | Kk4 |
| 2h | A1 | DK44 | Tk18 | Kk7 |
| 2i | A1 | DK44 | Tk18 | Kk9 |
| 2j | A1 | DK44 | Tk18 | Kk10 |
| 2k | A1 | DK44 | Tk18 | Kk14 |
| 2l | A1 | DK44 | Tk18 | Kk16 |
| 2m | A1 | DK44 | Tk18 | Kk26 |
| 2n | A1 | DK44 | Tk18 | Kk27 |
| 2o | A1 | DK44 | Tk18 | Kk40 |
| 2p | A1 | DK44 | Tk18 | Kk46 |
| 2q | A1 | DK44 | Tk18 | Kk48 |
| 2r | A1 | DK44 | Tk18 | Dk4 |
| 2s | A1 | DK44 | Tk18 | Dk11 |
| 2t | A1 | DK44 | Tk18 | Dk18 |
| 2u | A1 | DK44 | Tk18 | Dk29 |
| 2v | A1 | DK44 | Tk18 | Dk30 |
| 2z | A1 | DK44 | Tk18 | Dk39 |
| 2aa | A1 | DK44 | Tk16 | Kk5 |
| 2ab | A1 | DK44 | Tk16 | Kk3 |
| 2ac | A1 | DK44 | Tk16 | Kk4 |
| 2ad | A1 | DK44 | Tk16 | Dk4 |
| 2ae | A1 | DK44 | Tk19 | Kk5 |
| 2af | A1 | DK45 | Tk18 | Kk5 |
| 2ag | A2 | DK44 | Tk18 | Kk5 |
| 2ah | A3 | DK44 | Tk18 | Kk15 |
| 2ai | A4 | DK44 | Tk18 | Kk15 |
| 2aj | A1 | DK44 | Tk16 | Kk15 |
| 2ak | A1 | Dk44 | Tk16 | Kk34 |
| 2al | A2 | DK44 | Tk18 | Kk3 |
| 2am | A4 | DK44 | Tk18 | Kk5 |
| 2an | A4 | DK45 | Tk18 | Kk10 |
| 2ao | A5 | DK45 | Tk18 | Kk14 |
| 2ap | A6 | DK45 | Tk18 | Kk16 |
| 2aq | A4 | DK45 | Tk18 | Kk26 |
| 2ar | A1 | DK44 | Tk18 | Kk11 |
| 2as | A1 | DK44 | Tk18 | Kk51 |
| 2at | A1 | DK44 | Tk18 | Kk52 |
| 2au | A1 | DK44 | Tk18 | Kk53 |
| 2av | A1 | DK44 | Tk18 | Kk54 |
| 2aw | A1 | DK44 | Tk18 | Kk55 |
| 2ax | A1 | DK44 | Tk18 | Kk56 |
| 2ay | A1 | DK44 | Tk18 | Kk57 |
| 2az | A1 | DK44 | Tk18 | Kk58 |
| 2ba | A1 | DK44 | Tk18 | Kk59 |
| 2bb | A1 | DK44 | Tk18 | Kk60 |
| 2bc | A1 | DK44 | Tk18 | Kk61 |
| 2bd | A1 | DK44 | Tk18 | Kk62 |
| 2be | A1 | DK44 | Tk18 | Kk63 |
| 2bf | A1 | DK44 | Tk18 | Kk64 |
| 2bg | A1 | DK44 | Tk18 | DK66 |
| 2bh | A1 | DK45 | Tk18 | Kk1 |
| 2bi | A1 | DK45 | Tk18 | Kk2 |
| 2bj | A1 | DK45 | Tk18 | Kk3 |
| 2bk | A1 | Dk45 | Tk18 | Kk4 |
| 2bl | A1 | DK45 | Tk18 | Kk6 |
| 2bm | A1 | DK45 | Tk18 | Kk7 |
| 2bn | A1 | DK45 | Tk18 | Kk10 |
| 2bo | A1 | DK45 | Tk18 | Kk11 |
| 2bp | A1 | DK45 | Tk18 | Kk14 |
| 2bq | A1 | DK45 | Tk18 | Kk15 |
| 2br | A1 | DK45 | Tk18 | Kk16 |
| 2bs | A1 | DK45 | Tk18 | Kk51 |
| 2bt | A1 | DK45 | Tk18 | Kk53 |
| 2bu | A1 | DK45 | Tk18 | Kk54 |
| 2bv | A1 | DK45 | Tk18 | Kk55 |
| 2bw | A1 | DK45 | Tk18 | Kk56 |
| 2bx | A1 | DK45 | Tk18 | Kk61 |
| 2by | A1 | DK45 | Tk18 | Kk62 |
| 2bz | A1 | Dk45 | Tk18 | Kk63 |
| 2ca | A1 | Dk45 | Tk18 | Kk64 |
| 2cb | A1 | DK45 | Tk18 | DK66 |
| 2cc | A1 | DK44 | Tk16 | Kk10 |
| 2cd | A1 | DK44 | Tk16 | Kk11 |
| 2ce | A1 | DK44 | Tk16 | Kk14 |
| 2cf | A1 | DK44 | Tk16 | Kk16 |
| 2cg | A1 | DK44 | Tk16 | Kk51 |
| 2ch | A1 | DK44 | Tk16 | Kk53 |
| 2ci | A1 | DK44 | Tk16 | Kk54 |
| 2cj | A1 | DK44 | Tk16 | Kk55 |
| 2ck | A1 | DK44 | Tk16 | Kk56 |
| 2cl | A1 | DK44 | Tk16 | Kk61 |
| 2cm | A1 | DK44 | Tk16 | Kk62 |
| 2cn | A1 | DK44 | Tk16 | Kk63 |
| 2co | A1 | DK44 | Tk16 | Kk64 |
| 2cp | A1 | DK44 | Tk16 | DK66 |
| 2cq | A1 | DK44 | Tk19 | Kk2 |
| 2cr | A1 | DK44 | Tk19 | Kk3 |
| 2cs | A1 | DK44 | Tk19 | Kk10 |
| 2ct | A1 | DK44 | Tk19 | Kk11 |
| 2cu | A1 | DK44 | Tk19 | Kk14 |
| 2cv | A1 | DK44 | Tk19 | Kk15 |
| 2cw | A1 | DK44 | Tk19 | Kk16 |
| 2cx | A1 | DK44 | Tk19 | Kk51 |
| 2cy | A1 | DK44 | Tk19 | Kk53 |
| 2cz | A1 | DK44 | Tk19 | Kk54 |

TABLE 2-continued

| Example No. | A | Napht[1] | Tk | Kk |
|---|---|---|---|---|
| 2da | A1 | DK44 | Tk19 | Kk55 |
| 2db | A1 | DK44 | Tk19 | Kk56 |
| 2dc | A1 | DK44 | Tk19 | Kk61 |
| 2dd | A1 | DK44 | Tk19 | Kk62 |
| 2de | A1 | DK44 | Tk19 | Kk63 |
| 2df | A1 | DK44 | Tk19 | Kk64 |
| 2dg | A1 | DK44 | Tk19 | DK66 |
| 2dh | A1 | DK44 | Tk20 | Kk2 |
| 2di | A1 | DK44 | Tk20 | Kk3 |
| 2dj | A1 | DK44 | Tk20 | Kk5 |
| 2dk | A1 | Dk44 | Tk20 | Kk10 |
| 2dl | A1 | DK44 | Tk20 | Kk11 |
| 2dm | A1 | DK44 | Tk20 | Kk14 |
| 2dn | A1 | DK44 | Tk20 | Kk15 |
| 2do | A1 | DK44 | Tk20 | Kk16 |
| 2dp | A1 | DK44 | Tk20 | Kk51 |
| 2dq | A1 | DK44 | Tk20 | Kk53 |
| 2dr | A1 | DK44 | Tk20 | Kk54 |
| 2ds | A1 | DK44 | Tk20 | Kk55 |
| 2dt | A1 | DK44 | Tk20 | Kk56 |
| 2du | A1 | DK44 | Tk20 | Kk61 |
| 2dv | A1 | DK44 | Tk20 | Kk62 |
| 2dw | A1 | DK44 | Tk20 | Kk63 |
| 2dx | A1 | DK44 | Tk20 | Kk64 |
| 2dy | A1 | DK44 | Tk20 | DK66 |
| 2dz | A1 | DK45 | Tk16 | Kk2 |
| 2ea | A1 | DK45 | Tk16 | Kk3 |
| 2eb | A1 | DK45 | Tk16 | Kk5 |
| 2ec | A1 | DK45 | Tk16 | Kk10 |
| 2ed | A1 | DK45 | Tk16 | Kk11 |
| 2ee | A1 | Dk45 | Tk16 | Kk14 |
| 2ef | A1 | DK45 | Tk16 | Kk15 |
| 2eg | A1 | DK45 | Tk16 | Kk16 |
| 2eh | A1 | DK45 | Tk16 | Kk51 |
| 2ei | A1 | DK45 | Tk16 | Kk53 |
| 2ej | A1 | DK45 | Tk16 | Kk54 |
| 2ek | A1 | DK45 | Tk16 | Kk55 |
| 2el | A1 | DK45 | Tk16 | Kk56 |
| 2em | A1 | DK45 | Tk16 | Kk61 |
| 2en | A1 | DK45 | Tk16 | Kk62 |
| 2eo | A1 | DK45 | Tk16 | Kk63 |
| 2ep | A1 | DK45 | Tk16 | Kk64 |
| 2eq | A1 | Dk45 | Tk16 | DK66 |
| 2er | A1 | DK45 | Tk19 | Kk2 |
| 2es | A1 | DK45 | Tk19 | Kk3 |
| 2et | A1 | DK45 | Tk19 | Kk5 |
| 2eu | A1 | DK45 | Tk19 | Kk10 |
| 2ev | A1 | DK45 | Tk19 | Kk11 |
| 2ew | A1 | Dk45 | Tk19 | Kk14 |
| 2ex | A1 | DK45 | Tk19 | Kk15 |
| 2ey | A1 | DK45 | Tk19 | Kk16 |
| 2ez | A1 | DK45 | Tk19 | Kk51 |
| 2fa | A1 | Dk45 | Tk19 | Kk53 |
| 2fb | A1 | DK45 | Tk19 | Kk54 |
| 2fc | A1 | DK45 | Tk19 | Kk55 |
| 2fd | A1 | DK45 | Tk19 | Kk56 |
| 2fe | A1 | DK45 | Tk19 | Kk61 |
| 2ff | A1 | DK45 | Tk19 | Kk62 |
| 2fg | A1 | DK45 | Tk19 | Kk63 |
| 2fh | A1 | DK45 | Tk19 | Kk64 |
| 2fi | A1 | DK45 | Tk19 | DK66 |
| 2fj | A1 | DK45 | Tk20 | Kk2 |
| 2fk | A1 | DK45 | Tk20 | Kk3 |
| 2fl | A1 | DK45 | Tk20 | Kk5 |
| 2fm | A1 | DK45 | Tk20 | Kk10 |
| 2fn | A1 | DK45 | Tk20 | Kk11 |
| 2fo | A1 | DK45 | Tk20 | Kk14 |
| 2fp | A1 | DK45 | Tk20 | Kk15 |
| 2fq | A1 | DK45 | Tk20 | Kk16 |
| 2fr | A1 | DK45 | Tk20 | Kk51 |
| 2fs | A1 | DK45 | Tk20 | Kk53 |
| 2ft | A1 | DK45 | Tk20 | Kk54 |
| 2fu | A1 | DK45 | Tk20 | Kk55 |
| 2fv | A1 | DK45 | Tk20 | Kk56 |
| 2fw | A1 | DK45 | Tk20 | Kk61 |
| 2fx | A1 | DK45 | Tk20 | Kk62 |
| 2fy | A1 | DK45 | Tk20 | Kk63 |
| 2fz | A1 | DK45 | Tk20 | Kk64 |
| 2ga | A1 | DK45 | Tk20 | DK66 |

Example 3

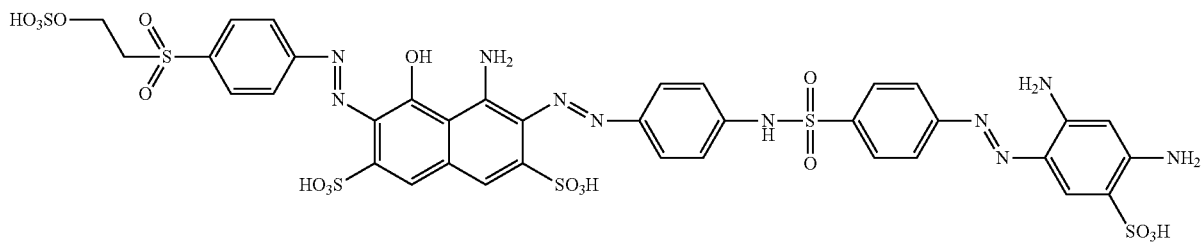

1) 1 mol of 4,4-diaminodiphenylsulfamide was tetrazotized at pH<1 and 0-5° C. with excess sodium nitrite and hydrochloric acid. 1 mol of metamine acid was dissolved in 25% by weight aqueous sodium hydroxide solution and added dropwise to the reaction mixture of the tetrazotized 4,4-diaminodiphenylsulfamide. The pH of the reaction mixture was maintained between 2-3 by addition of 15% by weight sodium carbonate solution.

2) 1 mol of H acid was dissolved in 25% by weight aqueous sodium hydroxide solution and added to the reaction mixture obtained in step 1). The pH of the reaction mixture was maintained between 2-4 by addition of 15% by weight aqueous sodium carbonate solution.

3) 1 mol of parabase was suspended in ice-water and diazotized at pH<1 and 0-5° C. with excess sodium nitrite and hydrochloric acid and subsequently added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Example 4

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was main-

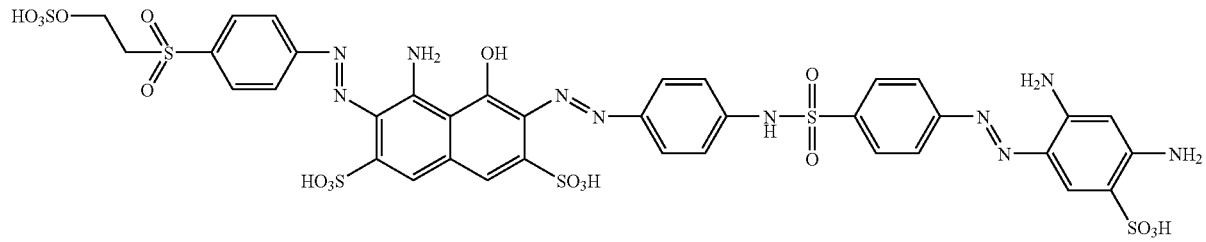

1) 1 mol of 4,4-diaminodiphenylsulfamide was tetrazotized at pH<1 and 0-5° C. with excess sodium nitrite and hydrochloric acid. 1 mol of metamine acid was dissolved in 25% by weight aqueous sodium hydroxide solution and added dropwise to the reaction mixture of the tetrazotized 4,4-diaminodiphenylsulfamide. The pH of the reaction mixture was maintained between 2-3 by addition of 15% by weight sodium carbonate solution.

2) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized parabase. The pH was maintained below 2.

3) The reaction mixture obtained in step 2) was added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Example 5a tained between 2 and 3 by addition of 15% by weight sodium carbonate solution.

2) 1 mol of parabase was suspended in ice-water and diazotized at pH<1 and 0-5° C. with excess sodium nitrite and hydrochloric acid and subsequently added to the reaction mixture obtained in step 1). The pH was maintained between 3 and 8 by addition of 10% by weight aqueous sodium hydroxide solution.

3) 1 mol of resorcinol was added to the reaction mixture obtained in step 2) and the pH was maintained between 3 and 8 by addition of 10% by weight aqueous sodium hydroxide solution.

4) 1 mol of p-nitroaniline was dissolved in 21% by weight hydrochloric acid, then diazotized at pH<1 and 0-5° C. with excess sodium nitrite and subsequently added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

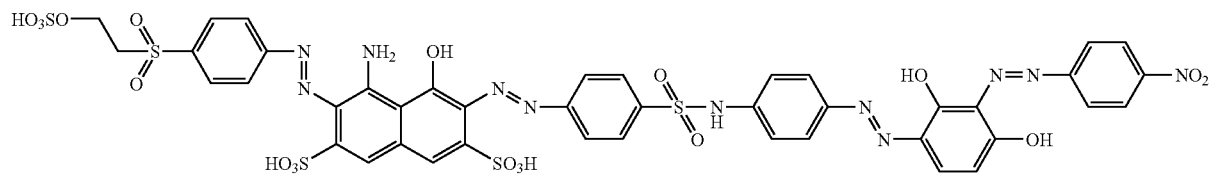

Example 6a

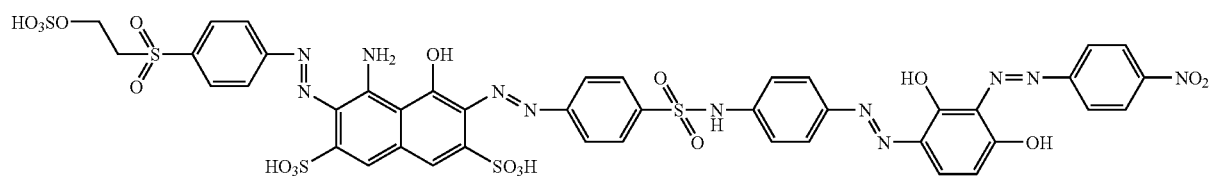

1) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized parabase. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of resorcinol was added to the reaction mixture obtained in step 2) and the pH was maintained between 3 and 8 by addition of 10% by weight aqueous sodium hydroxide solution.

4) 1 mol of p-nitroaniline was dissolved in 21% by weight hydrochloric acid, then diazotized at pH<1 and 0-5° C. with excess sodium nitrite and subsequently added to the reaction mixture obtained in step 3). The pH was maintained between 3 and 8 by addition of 10% by weight aqueous sodium hydroxide solution. After the reaction had ended, the dye was precipitated by addition of NaCl and filtered off with suction.

Example 7

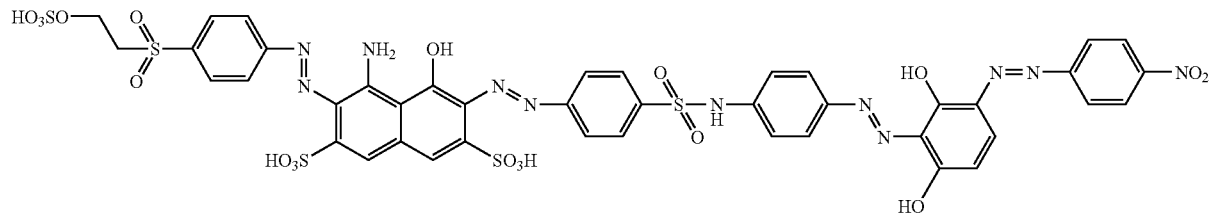

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was maintained between 2 and 3 by addition of 15% by weight sodium carbonate solution.

2) 1 mol of parabase was suspended in ice-water and diazotized at pH<1 and 0-5° C. with excess sodium nitrite and hydrochloric acid and subsequently added to the reaction mixture obtained in step 1). The pH was maintained between 3-8 by addition of 10% by weight aqueous sodium hydroxide solution.

3) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Example 8

1) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized parabase. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

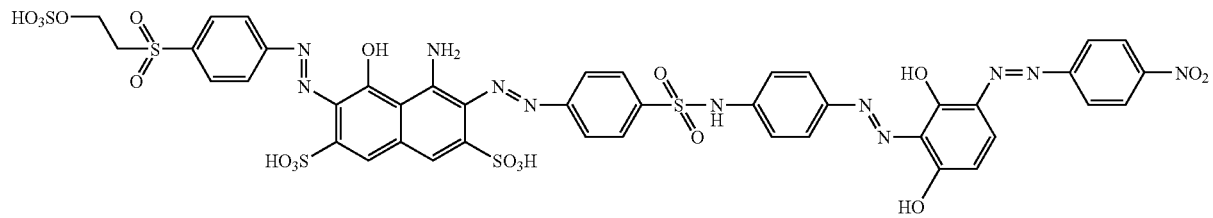

Example 9

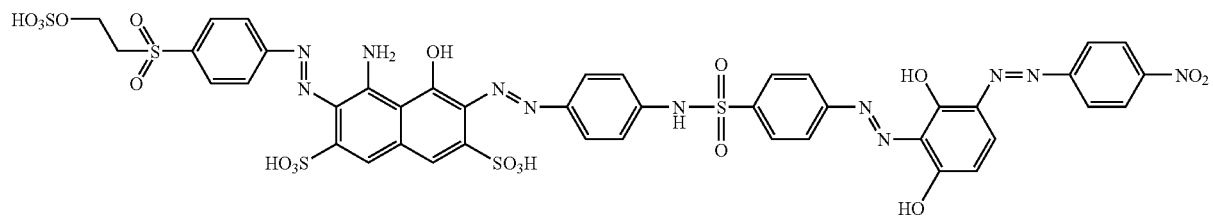

1) 1 mol of p-nitroaniline was dissolved in 21% by weight hydrochloric acid and thereafter diazotized at pH<1 and 0-5° C. with excess sodium nitrite. 1 mol of resorcinol was dissolved in 50% by weight aqueous sodium hydroxide solution at pH>12 and the diazotized p-nitroaniline was then added to this solution dropwise within 30 min at below 10° C., the pH being maintained above 9 by addition of 10% by weight aqueous sodium hydroxide solution.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 5 by addition of 10% by weight aqueous sodium hydroxide solution.

3) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the diazotized parabase. The pH was maintained below 2.

4) The reaction mixture obtained in step 3) was added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to examples 5a and 7 it is possible to obtain the dyes of the general formula $Dk^1$-N=N-$Napht^1$-N=N-$Tk^1$-N=N-$Kk^1$-N=N-$Dk^2$ and their metal complexes (=dyes of the general formula II where n=1) wherein $Dk^1$ and $Dk^2$ each represent a radical derived from the diazo components DK1 to DK83 or from A1 to A6, at least one of $Dk^1$ or $Dk^2$ representing a radical of the formula A, $Kk^1$ represents a bivalent radical derived from the coupling components Kk2, Kk3, Kk5, Kk6, Kk14, Kk15, Kk16, Kk49 or Kk50, $Napht^1$ represents one of the bivalent radicals II-2, II-4, II-6, II-8, II-10, II-12 and II-14, $Tk^1$ represents a bivalent radical derived from a tetrazo component Tk1 to Tk20 and A represents one of the radicals A1 to A6. The coupling of the radical $Dk^1$-N=N— takes place ortho to the hydroxyl group in $Napht^1$. Examples thereof are the dyes and metal complexes reported below in table 3.

TABLE 3

| Example No. | $Dk^1$ | $Napht^1$ | Tk | Kk | $Dk^2$ | Metal |
|---|---|---|---|---|---|---|
| 5a | A1 | DK44 | Tk18 | Kk3 | DK17 | — |
| 5b | A1 | DK44 | Tk18 | Kk3 | DK5 | Fe |
| 5c | A1 | DK44 | Tk18 | Kk3 | DK5 | Cr |
| 5d | A1 | DK44 | Tk18 | Kk3 | DK40 | — |

TABLE 3-continued

| Example No. | $Dk^1$ | $Napht^1$ | Tk | Kk | $Dk^2$ | Metal |
|---|---|---|---|---|---|---|
| 5e | DK17 | DK44 | Tk18 | Kk3 | A1 | — |
| 5f | DK17 | DK44 | Tk18 | Kk3 | A7 | — |
| 5g | DK17 | DK44 | Tk18 | Kk5 | A7 | — |
| 5h | DK5 | DK44 | Tk18 | Kk3 | A1 | Fe |
| 5i | DK5 | DK44 | Tk18 | Kk3 | A1 | Cr |
| 5j | DK5 | DK44 | Tk16 | Kk5 | A12 | — |
| 5k | DK17 | DK45 | Tk16 | Kk3 | A10 | — |

Proceeding in a manner analogous to examples 6a, 8 and 9 it is possible to obtain the dyes of the general formula $Dk^1$-N=N-$Napht^1$-N=N-$Tk^1$-N=N-$Kk^1$-N=N-$Dk^2$ and their metal complexes (=dyes of the general formula II where n=1) wherein $Dk^1$ and $Dk^2$ each represent a radical derived from the diazo components DK1 to DK83 or from A1 to A6, at least one of $Dk^1$ or $Dk^2$ representing a radical of the formula A, $Kk^1$ represents a bivalent radical derived from the coupling components Kk2, Kk3, Kk5, Kk6, Kk14, Kk15, Kk16, Kk49 or Kk50, $Napht^1$ represents one of the bivalent radicals II-2, II-4, II-6, II-8, II-10, II-12 and II-14, $Tk^1$ represents a bivalent radical derived from a tetrazo component Tk1 to Tk20 and A represents one of the radicals A1 to A6. The coupling of the radical $Dk^1$-N=N— takes place ortho to the amino group in $Napht^1$. Examples thereof are the dyes and metal complexes reported below in table 4.

TABLE 4

| Example No. | $Dk^1$ | $Napht^1$ | Tk | Kk | $Dk^2$ | Metal |
|---|---|---|---|---|---|---|
| 6a | A1 | DK44 | Tk18 | Kk3 | DK17 | — |
| 6b | A1 | DK44 | Tk18 | Kk3 | DK5 | Fe |
| 6c | A1 | DK44 | Tk18 | Kk3 | DK5 | Cr |
| 6d | A1 | DK44 | Tk18 | Kk3 | DK40 | — |
| 6e | DK17 | DK44 | Tk18 | Kk3 | A1 | — |
| 6f | DK17 | DK44 | Tk18 | Kk3 | A7 | — |
| 6g | DK17 | DK44 | Tk18 | Kk5 | A1 | — |
| 6h | DK5 | DK44 | Tk18 | Kk3 | A1 | — |
| 6i | DK5 | DK44 | Tk18 | Kk3 | A5 | — |
| 6j | A1 | DK44 | Tk18 | Kk3 | A1 | — |
| 6k | DK5 | DK44 | Tk16 | Kk5 | A9 | — |
| 6l | DK17 | DK45 | Tk16 | Kk3 | A11 | — |

Example 10

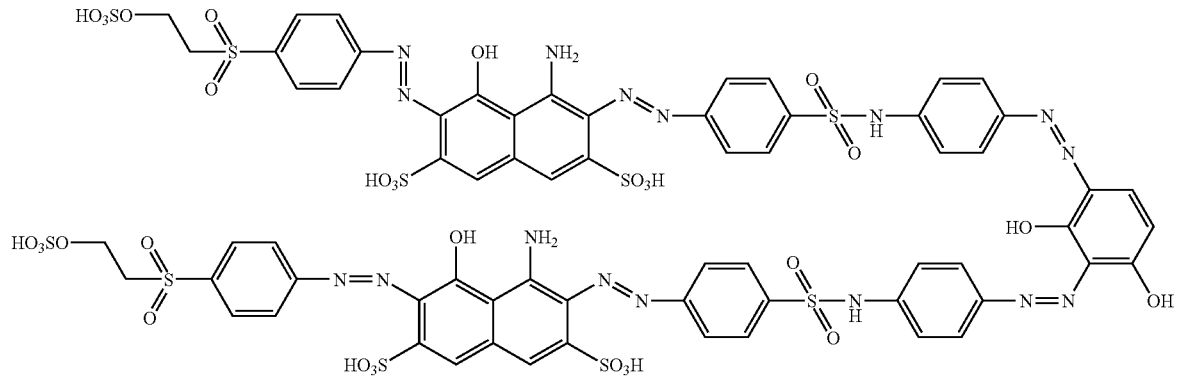 [SMILES: Nc1c(/N=N/c2ccc(S(=O)(=O)Nc3ccc(N=Nc4c(O)ccc(N=Nc5ccc(NS(=O)(=O)c6ccc(/N=N/c7c(S(=O)(=O)O)cc8cc(SOOO)c(/N=N/c9ccc(S(=O)(=O)CCOSOOO)cc9)c(O)c8c7N)cc6)cc5)c4O)cc3)cc2)c(S(=O)(=O)O)cc2cc(SOOO)c(N=Nc3ccc(S(=O)(=O)CCOSOOO)cc3)c(O)c12]

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH of the reaction mixture was maintained between 2 and 3 by addition of 15% by weight sodium carbonate solution.

2) 1 mol of parabase was suspended in ice-water and diazotized at pH<1 and 0-5° C. with excess sodium nitrite and hydrochloric acid and subsequently added to the reaction mixture obtained in step 1). The pH was maintained between 3 and 8 by addition of 10% by weight aqueous sodium hydroxide solution.

3) 0.5 mol of resorcinol was added to the reaction mixture obtained in step 2) and the pH was maintained between 3 and 8 by addition of 10% by weight aqueous sodium hydroxide solution. After the reaction had ended, the dye was precipitated by addition of NaCl and filtered off with suction.

Proceeding in a manner analogous to example 10 it is possible to obtain the dyes of the general formula [A-N=N-Napht$^1$-N=N-Tk$^1$-N=N]$_2$-Kk$^1$ (=dyes of the general formula III where Dk$^1$=Dk$^2$=A, Napht$^1$=Napht$^2$ and Tk$^1$=Tk$^2$) wherein Kk$^1$ represents a bivalent radical derived from the coupling components Kk2, Kk3, Kk5, Kk6, Kk14, Kk15, Kk16, Kk49 or Kk50, Napht$^1$ represents one of the bivalent radicals II-2, II-4, II-6, II-8, II-10, II-12 and II-14, Tk$^1$ represents a bivalent radical derived from a tetrazo component Tk1 to Tk20 and A represents one of the radicals A1 to A6. The coupling of the radical A-N=N— takes place ortho to the hydroxyl group in Napht$^1$.

Example 11

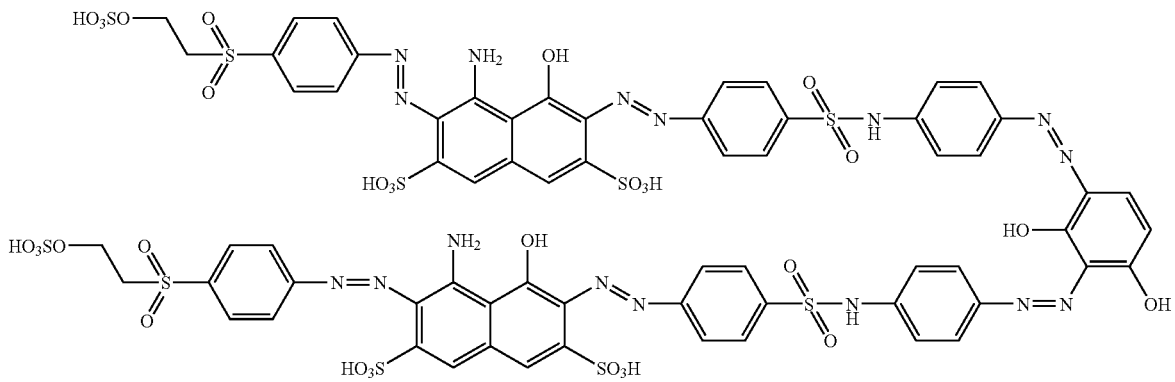 [SMILES: Nc1c(N=Nc2ccc(S(=O)(=O)CCOSOOO)cc2)c(SOOO)cc2cc(S(=O)(=O)O)c(/N=N/c3ccc(S(=O)(=O)Nc4ccc(N=Nc5c(O)ccc(N=Nc6ccc(NS(=O)(=O)c7ccc(/N=N/c8c(S(=O)(=O)O)cc9cc(SOOO)c(/N=N/c%10ccc(S(=O)(=O)CCOSOOO)cc%10)c(N)c9c8O)cc7)cc6)c5O)cc4)cc3)c(O)c12]

1) 1 mol of parabase was suspended in ice-water and diazotized at pH<1 and 0-5° C. with excess sodium nitrite and hydrochloric acid. 1 mol of H acid was dissolved in 25% by weight aqueous sodium hydroxide solution and added to the reaction mixture of the diazotized parabase. The pH was maintained below 2.

2) 1 mol of 4,4-diaminodiphenylsulfamide was tetrazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 0.5 mol of resorcinol was added to the reaction mixture obtained in step 2) and the pH was maintained between 3 and 8 by addition of 10% by weight aqueous sodium hydroxide solution. After the reaction had ended, the dye was precipitated by addition of NaCl and filtered off with suction.

Proceeding in a manner analogous to example 11 it is possible to obtain the dyes of the general formula [A-N=N-Napht$^1$-N=N-Tk$^1$-N=N]$_2$-Kk$^1$ (=dyes of the general formula III where Dk$^1$=Dk$^2$=A, Napht$^1$=Napht$^2$ and Tk$^1$=Tk$^2$) wherein Kk$^1$ represents a bivalent radical derived from the coupling components Kk2, Kk3, Kk5, Kk6, Kk14, Kk15, Kk16, Kk49 or Kk50, Napht$^1$ represents one of the bivalent radicals II-2, II-4, II-6, II-8, II-10, II-12 and II-14, Tk$^1$ represents a bivalent radical derived from a tetrazo component Tk1 to Tk20 and A represents one of the radicals A1 to A6. The coupling of the radical A-N=N— takes place ortho to the amino group in Napht$^1$.

Example 12

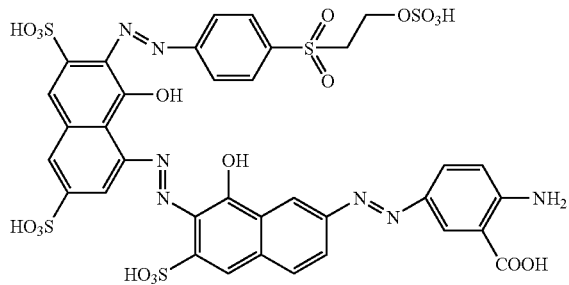

1) 1 mol of gamma acid was dissolved in 25% by weight aqueous sodium hydroxide solution, diazotized at pH<1 and 0-5° C. with excess sodium nitrite and hydrochloric acid and added dropwise to an aqueous solution of 1 mol of anthranilic acid. The pH of the reaction mixture was maintained between 5 and 10 by addition of 10% by weight aqueous sodium hydroxide solution.

2) 1 mol of H acid was dissolved in 25% by weight aqueous sodium hydroxide solution and diazotized at pH<1 and 0-5° C. with excess sodium nitrite and hydrochloric acid. This reaction mixture was admixed with the reaction mixture obtained in step 1). The pH was maintained between 3 and 8 by addition of 10% by weight aqueous sodium hydroxide solution.

3) 1 mol of parabase was suspended in ice-water and diazotized at pH<1 and 0-5° C. with excess sodium nitrite and hydrochloric acid and subsequently added to the reaction mixture obtained in step 2). The pH was maintained between 3 and 8 by addition of 10% by weight aqueous sodium hydroxide solution. After the reaction had ended, the dye was precipitated by addition of NaCl and filtered off with suction.

Proceeding in a manner analogous to example 12 it is possible to obtain the dyes of the general formula A-N=N-Napht$^1$-N=N-Napht$^2$-N=N-Kk$^1$ (=dyes of the general formula V where n=0) wherein Kk$^1$ represents a bivalent radical derived from the coupling components Kk1 to Kk48 or Kk51 to Kk64, Napht$^1$ and Napht$^2$ each represent one of the bivalent radicals II-1, II-3, II-5, II-7, II-9, II-11, II-13 or II-15 and A represents one of the radicals A1 to A6. The coupling of the radical Napht$^1$-N=N— takes place ortho to the hydroxyl group in Napht$^2$.

Example 13

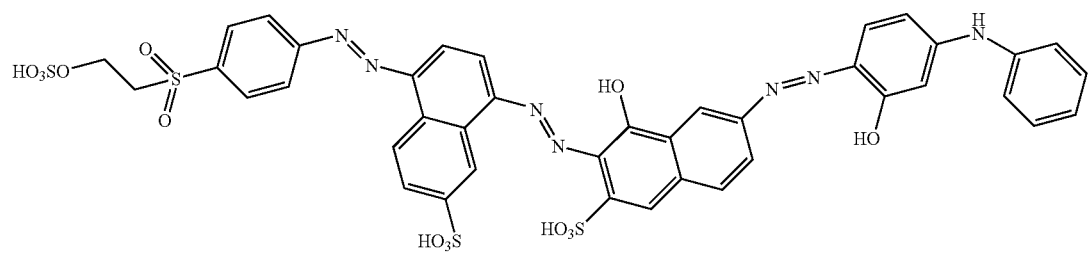

1) 1 mol of gamma acid was dissolved in 25% by weight aqueous sodium hydroxide solution, diazotized at pH<1 and 0-5° C. with excess sodium nitrite and hydrochloric acid and added dropwise to an aqueous solution of 1 mol of 3-phenylaminophenol. The pH of the reaction mixture was maintained between 5 and 10 by addition of 10% by weight aqueous sodium hydroxide solution.

2) 1 mol of Cleve's acid 7 was dissolved in 25% by weight aqueous sodium hydroxide solution. At the same time, 1 mol of parabase was suspended in ice-water and diazotized at pH<1 and 0-5° C. with excess sodium nitrite and hydrochloric acid and subsequently added to the Cleve's acid 7 solution while the pH was maintained below 2.

3) The reaction mixture obtained in step 2) was diazotized at pH<1 and 0-5° C. with excess sodium nitrite and hydrochloric acid. This reaction mixture was admixed with the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to example 13 it is possible to obtain the dyes of the general formula A-N=N-Napht$^1$-N=N-Napht$^2$-N=N-Kk$^1$ (=dyes of the general formula V where n=0) wherein Kk$^1$ represents a bivalent radical derived from the coupling components Kk1 to Kk48 or Kk51 to Kk64, Napht$^1$ and Napht$^2$ each represent one of the bivalent radicals II-1, II-3, II-5, II-7, II-9, II-11, II-13 or II-15 and A represents one of the radicals A1 to A6. The coupling of the radical A-N=N-Napht$^1$-N=N— takes place ortho to the hydroxyl group in Napht$^2$.

Example 14 acid and subsequently added to the Cleve's acid 7 solution while the pH was maintained below 2.

2) 1 mol of H acid was dissolved in 25% by weight aqueous sodium hydroxide solution. At the same time, the reaction mixture obtained in step 1) was suspended in ice-water and diazotized at pH<1 and 0-5° C. with excess sodium nitrite and hydrochloric acid and subsequently added to the H acid solution. The pH was maintained between 1 and 4 by addition of 10% by weight aqueous sodium hydroxide solution 3) 1 mol of 5-nitro-2-aminophenol was diazotized with excess sodium nitrite and hydrochloric acid at pH<1 and 0-5° C. and subsequently added to the reaction mixture obtained in step 2). The pH was maintained between 3-8 by addition of 10% by weight aqueous sodium hydroxide solution. After the reaction had ended, 0.20-0.30 mol of chromium(III) sulfate was added to the reaction mixture and stirred in for 1 hour. The dye was precipitated by addition of NaCl and filtered off with suction.

Example 15

The preparation was carried out analogously to the prescription reported in example 14, although no-metal-complexing reaction was carried out in the last step.

Proceeding in a manner analogous to examples 14 and 15 it is possible to obtain the dyes of the general formula A-N=N-Napht$^1$-N=N-Napht$^2$-N=N-Dk and their metal complexes (=dyes of the general formula V where n=0) wherein Dk represents a radical derived from the diazo components DK1 to DK9, DK13, DK14, DK26, DK27, DK39 to DK41 and DK58, Napht$^1$ represents one of the bivalent radicals II-1, II-3, II-5, II-7, II-9, II-11, II-13, II-15 or II-16,

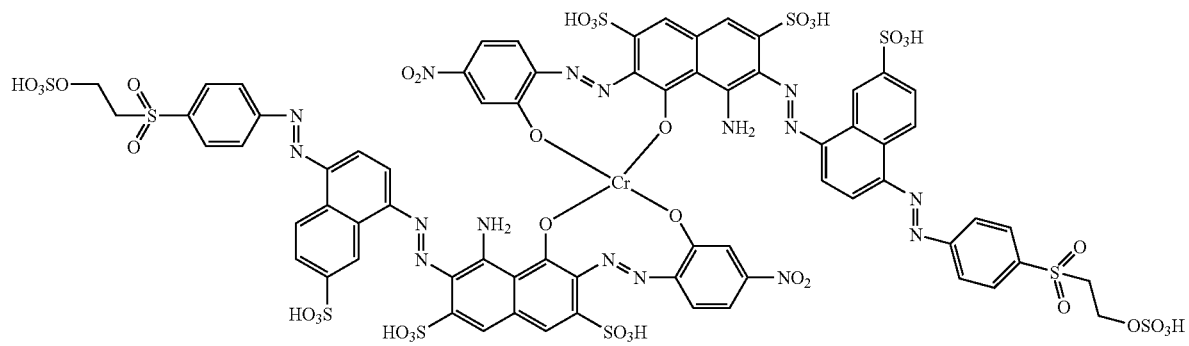

1) 1 mol of Cleve's acid 7 was dissolved in 25% by weight aqueous sodium hydroxide solution. At the same time, 1 mol of parabase was suspended in ice-water and diazotized at pH<1 and 0-5° C. with excess sodium nitrite and hydrochloric Napht$^2$ represents one of the bivalent radicals II-2, II-4, II-6, II-8, II-10, II-12 or II-14 and A represents one of the radicals A1 to A6. The coupling of the radical A-N=N-Napht$^1$-N=N— takes place ortho to the amino group in Napht$^2$.

Example 16

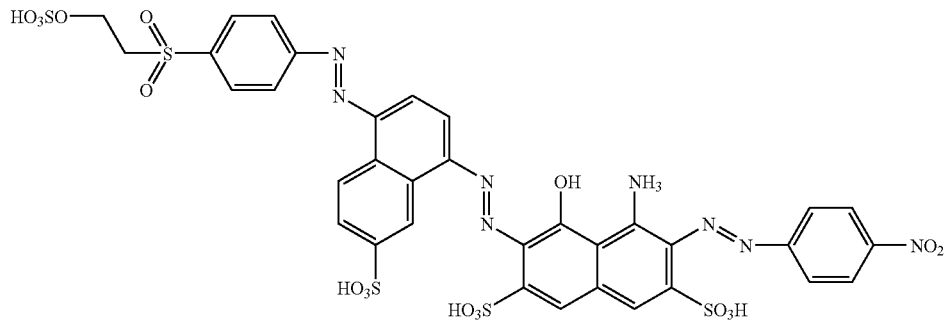

1) 1 mol of p-nitroaniline was dissolved in 21% by weight hydrochloric acid and thereafter diazotized at pH<1 and 0-5° C. with excess sodium nitrite. At the same time, 1 mol of H acid was dissolved in 25% by weight aqueous sodium hydroxide solution and thereafter the H acid was precipitated by addition of 21% by weight hydrochloric acid. The H acid suspension was added to the diazotized p-nitroaniline and the pH was maintained below 2. The reaction ends after 1 hour.

2) 1 mol of Cleve's acid 7 was dissolved in 25% by weight aqueous sodium hydroxide solution. At the same time, 1 mol of parabase was suspended in ice-water and diazotized at pH<1 and 0-5° C. with excess sodium nitrite and hydrochloric acid. The Cleve's acid 7 solution was added while maintaining the pH below 2.

3) The reaction mixture obtained in step 2) diazotized at pH<1 and 0-5° C. with excess sodium nitrite and hydrochloric acid and added to the product obtained in step 1). The pH was maintained between 5 and 8 by addition of 10% by weight aqueous sodium hydroxide solution, which was followed by stirring for 1 hour. The dye was precipitated by addition of NaCl and filtered off with suction.

Proceeding in a manner analogous to example 16 it is possible to obtain the dyes of the general formula A-N=N-Napht[1]-N=N-Napht[2]-N=N-Dk (=dyes of the general formula V where n=0) wherein Dk represents a radical derived from the diazo components DK1 to DK83, Napht[1] represents one of the bivalent radicals II-1, II-3, II-5, II-7, II-9, II-11, II-13, II-15 or II-16, Napht[2] represents one of the bivalent radicals II-2, II-4, II-6, II-8, II-10, II-12 or II-14 and A represents one of the radicals A1 to A6. The coupling of the radical A-N=N-Napht[1]-N=N— takes place ortho to the hydroxyl group in Napht[2].

Example 17a

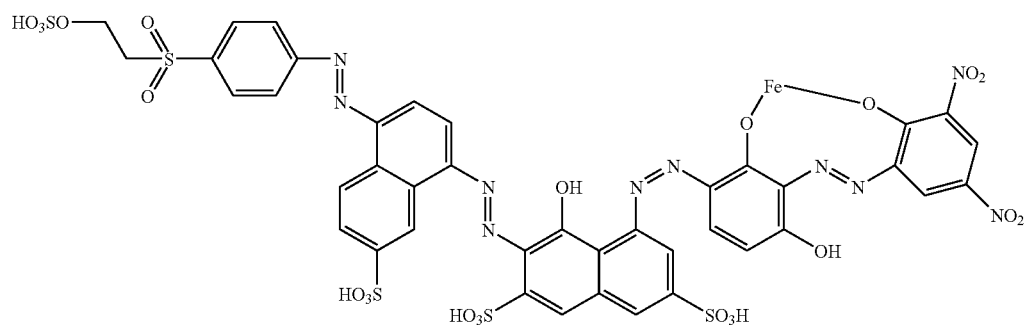

1) 1 mol of H acid was dissolved in 25% by weight aqueous sodium hydroxide solution, diazotized at pH<1 and 0-5° C. with excess sodium nitrite and hydrochloric acid. 1 mol of resorcinol was dissolved in 50% by weight aqueous sodium hydroxide solution at pH>12. This solution was admixed with the diazotized H acid by dropwise addition at below 10° C. within 30 min, while the pH was maintained above 9 by addition of 10% by weight aqueous sodium hydroxide solution.

2) 1 mol of 4,6-dinitro-2-aminophenol was diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of Cleve's acid 7 was dissolved in 25% by weight aqueous sodium hydroxide solution. At the same time, 1 mol of parabase was suspended in ice-water and diazotized at pH<1 and 0-5° C. with excess sodium nitrite and hydrochloric acid and subsequently added to the Cleve's acid 7 solution while maintaining the pH below 2.

4) The reaction mixture obtained in step 3) was diazotized at pH<1 and 0-5° C. with excess sodium nitrite and hydrochloric acid. This reaction mixture was admixed with the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Proceeding in a manner analogous to example 17a it is possible to obtain the metal complexes of dyes of the general formula A-N=N-Napht$^1$-N=N-Napht$^2$-N=N-Kk$^1$-N=N-Dk (=dyes of the general formula V where n=1) wherein Dk represents a radical derived from the diazo components DK1 to DK9, DK13, DK14, DK26, DK27, DK39 to DK41 or DK58, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk$^1$ represents a bivalent radical derived from Kk2, Kk3, Kk49 or Kk50 and A represents one of the radicals A1 to A6. The coupling of the radical A-N=N-Napht$^1$-N=N— takes place ortho to the hydroxyl group in Napht$^2$.

Example 17b

The reaction was carried out in accordance with the method described in example 17a except that there was no subsequent reaction with iron salts.

Proceeding in a manner analogous to example 17a it is possible to obtain the dyes of general formula A-N=N-Napht$^1$-N=N-Napht$^2$-N=N-Kk$^1$-N=N-Dk (=dyes of the general formula V where n=1) wherein Dk represents a radical derived from the diazo components DK1 to DK83 or from A1 to A6, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk$^1$ represents a bivalent radical derived from Kk2, Kk3, Kk5, Kk6, Kk14, Kk15, Kk16, Kk49 or Kk50 and A represents one of the radicals A1 to A6. The coupling of the radical A-N=N-Napht$^1$-N=N— takes place ortho to the hydroxyl group in Napht$^2$.

Example 18a

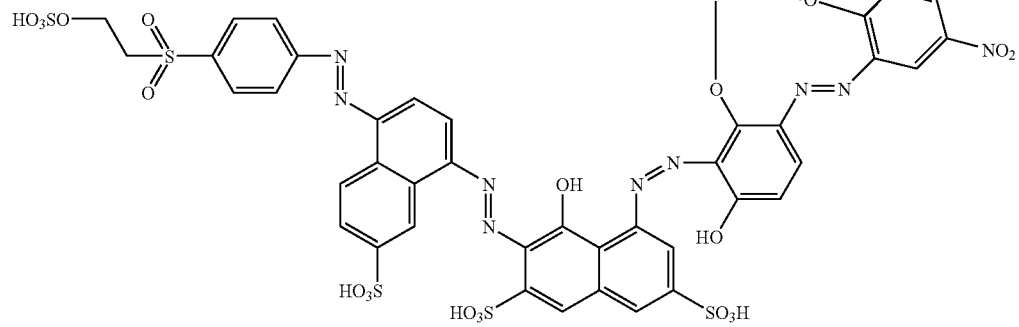

1) 1 mol of 4,6-dinitro-2-aminophenol was diazotized with excess sodium nitrite and hydrochloric acid at pH<1 and 0-5° C. 1 mol of resorcinol was dissolved in 50% by weight aqueous sodium hydroxide solution at pH>12 and this solution was admixed with the diazotized 4,6-dinitro-2-aminophenol added dropwise at below 10° C. in the course of 30 min while the pH was maintained above 9 by addition of a 10% by weight sodium hydroxide solution.

2) 1 mol of H acid was dissolved in 25% by weight aqueous sodium hydroxide solution, diazotized at pH<1 and 0-5° C. with excess sodium nitrite and hydrochloric acid and added to the reaction mixture obtained in step 1). The pH was maintained between 3 and 8 by addition of 10% by weight aqueous sodium hydroxide solution.

3) 1 mol of Cleve's acid 7 was dissolved in 25% by weight aqueous sodium hydroxide solution. At the same time, 1 mol of parabase was suspended in ice-water and diazotized at pH<1 and 0-5° C. with excess sodium nitrite and hydrochloric acid and subsequently added to the Cleve's acid 7 solution while maintaining the pH below 2.

4) The reaction mixture obtained in step 3) was diazotized at pH<1 and 0-5° C. with excess sodium nitrite and hydrochloric acid. This reaction mixture was admixed with the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Proceeding in a manner analogous to example 18a it is possible to obtain the metal complexes of dyes of the general formula A-N=N-Napht$^1$-N=N-Napht$^2$-N=N-Kk$^1$-N=N-Dk (=dyes of the general formula V where n=1) wherein Dk represents a radical derived from the diazo components DK1 to DK9, DK13, DK14, DK26, DK27, DK39 to DK41 or DK58, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk$^1$ represents a bivalent radical derived from Kk2, Kk3, Kk49 or Kk50 and A represents one of the radicals A1 to A6. The coupling of the radical A-N=N-Napht$^1$-N=N— takes place ortho to the hydroxyl group in Napht$^2$.

Example 18b

The reaction was carried out in accordance with the method described in example 18a except that there was no subsequent reaction with iron salts.

Proceeding in a manner analogous to example 18b it is possible to obtain the dyes of the general formula A-N=N-Napht$^1$-N=N-Napht$^2$-N=N-Kk$^1$-N=N-Dk (=dyes of the general formula V where n=1) wherein Dk represents a radical derived from the diazo components DK1 to DK83 or from A1 to A6, Napht$^1$ represents one of the bivalent radicals II-1, II-3, II-5, II-7, II-9, II-11, II-13, II-15 or II-16, Napht$^2$ represents one of the bivalent radicals II-2, II-4, II-6, II-8, II-10, II-12 or II-14, Kk$^1$ represents a bivalent radical derived from Kk2, Kk3, Kk5, Kk6, Kk14, Kk15, Kk16, Kk49 or Kk50 and A represents one of the radicals A1 to A6. The coupling of the radical A-N=N-Napht$^1$-N=N— takes place ortho to the hydroxyl group in Napht$^2$.

Example 19

1) 1 mol of 4,4-diaminodiphenylsulfamide was tetrazotized at pH<1 and 0-5° C. with excess sodium nitrite and hydrochloric acid. 1 mol of H acid was dissolved in 25% by weight aqueous sodium hydroxide solution and added dropwise to the reaction mixture of the tetrazotized 4,4-diaminodiphenylsulfamide. The pH was maintained below 3.

2) 1 mol of p-nitroaniline was dissolved in 21% by weight hydrochloric acid, thereafter diazotized at pH<1 and 0-5° C. with excess sodium nitrite and added to the reaction mixture obtained in step 1). The pH was maintained between 3 and 8 by addition of 10% by weight aqueous sodium hydroxide solution.

3) 1 mol of parabase was suspended in ice-water and diazotized with excess sodium nitrite and hydrochloric acid at pH<1 and 0-5° C. 1 mol of K acid was dissolved in 25% by weight sodium hydroxide solution and added to the diazotized parabase. The pH was maintained below 2.

4) The product obtained in step 3) was added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Proceeding in a manner analogous to example 19 it is possible to obtain the dyes of the general formula Dk$^1$-N=N-Napht$^1$-N=N-Tk$^1$-N=N-Napht$^2$-N=N-Dk$^2$ and their metal complexes (=dyes of the general formula IV where Kk$^1$=Napth$^1$ and Kk$^2$=Napth$^2$) wherein Dk$^1$ and Dk$^2$ each represent a radical derived from the diazo components DK1 to DK83 or from A1 to A6, at least one of the radicals Dk$^1$ or Dk$^2$ representing a radical of the formula A, Napht$^1$ and Napht$^2$ each represent one of the bivalent radicals II-2, II-4, II-6, II-8, II-10, II-12 or II-14 and Tk$^1$ represents a bivalent radical derived from Tk1 to Tk20. The coupling of the radicals Dk$^1$-N=N— takes place ortho to the hydroxyl group in Napht$^1$ and the coupling of the radicals Dk$^2$-N=N— takes place ortho to the amino group in Napht$^2$.

Example 20

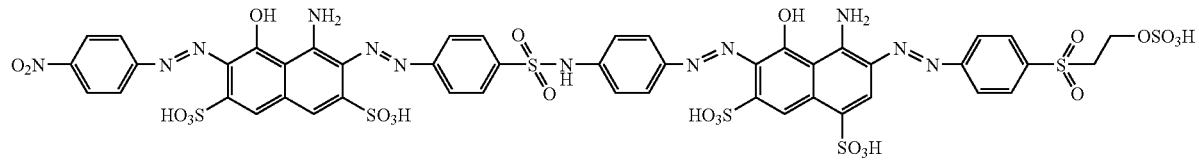

1) 1 mol of p-nitroaniline was dissolved in 21% by weight hydrochloric acid and thereafter diazotized with excess sodium nitrite at pH<1 and 0-5° C. To this was added 1 mol of H acid while the pH was maintained below 2.

2) 1 mol of 4,4-diaminodiphenylsulfamide was tetrazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of parabase was suspended in ice-water and diazotized with excess sodium nitrite and hydrochloric acid at pH<1 and 0-5° C. 1 mol of K acid was dissolved in 25% by weight sodium hydroxide solution and added to the diazotized parabase solution. The pH was maintained below 2.

4) The reaction mixture obtained in step 3) was added to the reaction mixture obtained in step 2). The pH was maintained between 3-8 by addition of 10% by weight aqueous sodium hydroxide solution. After the reaction had ended, the dye was precipitated by addition of NaCl and filtered off with suction.

Proceeding in a manner analogous to example 20 it is possible to obtain the dyes of the general formula $Dk^1$-N=N-$Napht^1$-N=N-$Tk^1$-N=N-$Napht^2$-N=N-$Dk^2$ and their metal complexes (=dyes of the general formula IV where $Kk^1$=$Napht^1$ and $Kk^2$=$Napht^2$) wherein $Dk^1$ and $Dk^2$ each represent a radical derived from the diazo components DK1 to DK83 or from A1 to A6, at least one of the radicals $Dk^1$ or $Dk^2$ representing a radical of the formula A, $Napht^1$ and $Napht^2$ each represent one of the bivalent radicals II-2, II-4, II-6, II-8, II-10, II-12 or II-14 and Tk represents a bivalent radical derived from Tk1 to Tk20. The coupling of the radicals $Dk^1$-N=N— and $Dk^2$-N=N— takes place respectively ortho to the amino group in $Napht^1$ and $Napht^2$.

Example 21a

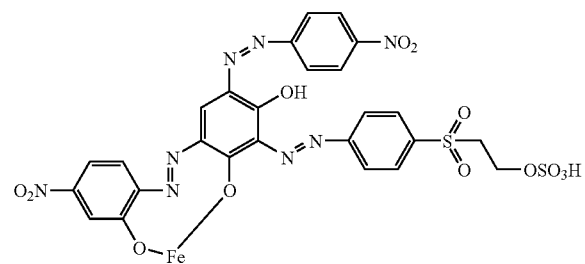

Method A:

1) 1 mol of 4,6-dinitro-2-aminophenol was diazotized at pH<1 and 0-5° C. with excess sodium nitrite and hydrochloric acid. 1 mol of resorcinol was dissolved in 50% by weight aqueous sodium hydroxide solution at pH>12 and this solution was admixed with the diazotized 4,6-dinitro-2-aminophenol added dropwise at >10° C. within 30 min while the pH was maintained above 9 by addition of 10% by weight aqueous sodium hydroxide solution.

2) 1 mol of parabase was suspended in ice-water, diazotized with excess sodium nitrite and hydrochloric acid at pH<1 and 0-5° C. and then added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid, thereafter diazotized with excess sodium nitrite at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Method B:

1) 1 mol of p-nitroaniline was dissolved in 21% by weight hydrochloric acid and thereafter diazotized with excess sodium nitrite at pH<1 and 0-5° C. 1 mol of resorcinol was dissolved in 50% by weight sodium hydroxide solution at pH>12. This solution was admixed with the diazotized p-nitroaniline added dropwise at below 10° C. within 30 min while the pH was maintained above 9 by addition of 10% by weight aqueous sodium hydroxide solution.

2) 1 mol of parabase was suspended in ice-water, diazotized with excess sodium nitrite and hydrochloric acid at pH<1 and 0-5° C. and then added to the reaction mixture obtained in step 1). The pH was maintained between 3-8 by addition of 10% by weight aqueous sodium hydroxide solution.

3) 1 mol of 4,6-dinitro-2-aminophenol was diazotized at pH<1 and 0-5° C. with excess sodium nitrite and hydrochloric acid and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 22a

The reaction was carried out in accordance with the method described in example 21 except that there was no subsequent reaction with iron salts.

Example 23a

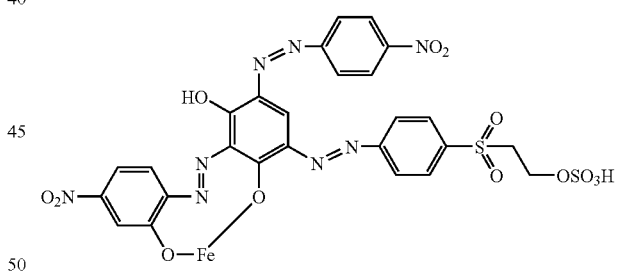

Method A:

1) 1 mol of p-nitroaniline was dissolved in 21% by weight hydrochloric acid, thereafter diazotized with excess sodium nitrite at pH<1 and 0-5° C. 1 mol of resorcinol was dissolved in 50% by weight aqueous sodium hydroxide solution at pH>12. This solution was admixed with the diazotized p-nitroaniline added dropwise at below 10° C. within 30 min while the pH was maintained above 9 by addition of 10% by weight aqueous sodium hydroxide solution.

2) 1 mol of 4,6-dinitro-2-aminophenol was diazotized at pH<1 and 0-5° C. with excess sodium nitrite and hydrochloric acid and then added to the reaction mixture obtained in step 1). The pH was maintained between 3 and 8 by addition of 10% by weight aqueous sodium hydroxide solution.

3) 1 mol of parabase was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Method B:

1) 1 mol of parabase was suspended in ice-water, diazotized with excess sodium nitrite and hydrochloric acid at pH<1 and 0-5° C. 1 mol of resorcinol was dissolved in 50% by weight aqueous sodium hydroxide solution. This solution was admixed with the diazotized parabase added dropwise at below 10° C. within 30 min while the pH was maintained between 6 and 7 by addition of 10% by weight aqueous sodium hydroxide solution.

2) 1 mol of 4,6-dinitro-2-aminophenol was diazotized at pH<1 and 0-5° C. with excess sodium nitrite and hydrochloric acid and then added to the reaction mixture obtained in step 1). The pH was maintained between 3 and 8 by addition of 10% by weight aqueous sodium hydroxide solution.

3) 1 mol of p-nitroaniline was dissolved in 21% by weight hydrochloric acid, thereafter diazotized with excess sodium nitrite at pH<1 and 0-5° C. and added to the reaction mixture obtained in step 2). The pH was maintained between 3-8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 24a

The reaction was carried out in accordance with the methods described in example 23a except there was no subsequent reaction with iron salts.

Proceeding in a manner analogous to examples 21a and 23a it is possible to obtain the metal complexes of dyes of the general formula

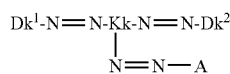

(=dyes of the general formula I where p=0 and m=2) wherein $Dk^1$ and $Dk^2$ each represent a radical derived from the diazo components DK1 to DK83, at least one of the radicals $Dk^1$ or $Dk^2$ representing a radical derived from the diazo components DK1 to DK9, DK13, DK14, DK26, DK27, DK39 to DK41 or DK58, Kk represents a trivalent radical derived from Kk2 or Kk3 and A represents one of the radicals A1 to A6. Examples thereof are reported in table 5.

TABLE 5

| Example No. | $Dk^1$ | Kk | $Dk^2$ | A | Me |
|---|---|---|---|---|---|
| 21a | DK1 | KK3 | DK17 | A1 | Fe |
| 21b | DK1 | KK3 | DK5 | A1 | Fe |
| 21c | DK1 | KK3 | DK10 | A1 | Fe |
| 21d | DK2 | KK3 | DK17 | A1 | Fe |
| 21e | DK4 | KK3 | DK17 | A1 | Cu |
| 21f | DK4 | KK3 | DK12 | A1 | Co |
| 21g | DK4 | KK3 | DK56 | A1 | Cr |
| 21h | DK5 | KK3 | DK9 | A1 | Fe |
| 21i | DK5 | KK3 | DK10 | A1 | Fe |
| 21j | DK5 | KK3 | DK12 | A1 | Fe |
| 21k | DK5 | KK3 | DK17 | A1 | Fe |
| 21l | DK5 | KK3 | DK19 | A1 | Fe |
| 21m | DK5 | KK3 | DK27 | A1 | Fe |
| 21n | DK5 | KK3 | DK28 | A1 | Fe |
| 21o | DK5 | KK3 | DK30 | A1 | Fe |
| 21p | DK5 | KK3 | DK32 | A1 | Fe |
| 21q | DK5 | KK3 | DK35 | A1 | Fe |
| 21r | DK5 | KK3 | DK41 | A1 | Fe |
| 21s | DK5 | KK3 | DK46 | A1 | Fe |
| 21t | DK5 | KK3 | DK47 | A1 | Fe |
| 21u | DK5 | KK3 | DK58 | A1 | Fe |
| 21v | DK5 | KK3 | DK12 | A4 | Fe |
| 21z | DK5 | KK3 | DK17 | A4 | Fe |
| 23a | DK1 | KK3 | DK17 | A1 | Fe |
| 23b | DK1 | KK3 | DK5 | A1 | Fe |
| 23c | DK1 | KK3 | DK10 | A1 | Fe |
| 23d | DK2 | KK3 | DK17 | A1 | Fe |
| 23e | DK4 | KK3 | DK17 | A1 | Cu |
| 23f | DK4 | KK3 | DK12 | A1 | Co |
| 23g | DK4 | KK3 | DK56 | A1 | Cr |
| 23h | DK5 | KK3 | DK9 | A1 | Fe |
| 23i | DK5 | KK3 | DK10 | A1 | Fe |
| 23j | DK5 | KK3 | DK12 | A1 | Fe |
| 23k | DK5 | KK3 | DK17 | A1 | Fe |
| 23l | DK5 | KK3 | DK19 | A1 | Fe |
| 23m | DK5 | KK3 | DK27 | A1 | Fe |
| 23n | DK5 | KK3 | DK28 | A1 | Fe |
| 23o | DK5 | KK3 | DK30 | A1 | Fe |
| 23p | DK5 | KK3 | DK32 | A1 | Fe |
| 23q | DK5 | KK3 | DK35 | A1 | Fe |
| 23r | DK5 | KK3 | DK41 | A1 | Fe |
| 23s | DK5 | KK3 | DK46 | A1 | Fe |
| 23t | DK5 | KK3 | DK47 | A1 | Fe |
| 23u | DK5 | KK3 | DK58 | A1 | Fe |
| 23v | DK5 | KK3 | DK12 | A4 | Fe |
| 23z | DK5 | KK3 | DK17 | A3 | Fe |

Proceeding in a manner analogous to examples 22a and 24a it is possible to obtain the dyes of the general formula

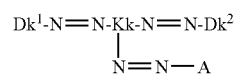

(=dyes of the general formula I where p=0 and m=2) wherein $Dk^1$ and $Dk^2$ each represent a radical derived from the diazo components DK1 to DK83, Kk represents a trivalent radical derived from Kk2, Kk3 or Kk5 and A represents one of the radicals A1 to A6. Examples thereof are reported in table 6.

TABLE 6

| Example No. | $Dk^1$ | Kk | $Dk^2$ | A |
|---|---|---|---|---|
| 22a | DK1 | KK3 | DK17 | A1 |
| 22b | DK1 | KK3 | DK5 | A1 |
| 22c | DK1 | KK3 | DK10 | A1 |
| 22d | DK2 | KK3 | DK17 | A1 |
| 22e | DK4 | KK3 | DK17 | A1 |
| 22f | DK4 | KK3 | DK12 | A1 |
| 22g | DK4 | KK3 | DK56 | A1 |
| 22h | DK5 | KK3 | DK9 | A1 |
| 22i | DK5 | KK3 | DK10 | A1 |
| 22j | DK5 | KK3 | DK12 | A1 |
| 22k | DK5 | KK3 | DK17 | A1 |
| 22l | DK5 | KK3 | DK19 | A1 |
| 22m | DK5 | KK3 | DK27 | A1 |

TABLE 6-continued

| Example No. | Dk¹ | Kk | Dk² | A |
|---|---|---|---|---|
| 22n | DK5 | KK3 | DK28 | A1 |
| 22o | DK5 | KK3 | DK30 | A1 |
| 22p | DK5 | KK3 | DK32 | A1 |
| 22q | DK5 | KK3 | DK35 | A1 |
| 22r | DK5 | KK3 | DK41 | A1 |
| 22s | DK5 | KK3 | DK46 | A1 |
| 22t | DK5 | KK3 | DK47 | A1 |
| 22u | DK5 | KK3 | DK58 | A1 |
| 22v | DK5 | KK3 | DK12 | A2 |
| 22z | DK5 | KK3 | DK17 | A4 |
| 24a | DK1 | KK3 | DK17 | A1 |
| 24b | DK1 | KK3 | DK5 | A1 |
| 24c | DK1 | KK3 | DK10 | A1 |
| 24d | DK2 | KK3 | DK17 | A1 |
| 24e | DK4 | KK3 | DK17 | A1 |
| 24f | DK4 | KK3 | DK12 | A1 |
| 24g | DK4 | KK3 | DK56 | A1 |
| 24h | DK5 | KK3 | DK9 | A1 |
| 24i | DK5 | KK3 | DK10 | A1 |
| 24j | DK5 | KK3 | DK12 | A1 |
| 24k | DK5 | KK3 | DK17 | A1 |
| 24l | DK5 | KK3 | DK19 | A1 |
| 24m | DK5 | KK3 | DK27 | A1 |
| 24n | DK5 | KK3 | DK28 | A1 |
| 24o | DK5 | KK3 | DK30 | A1 |
| 24p | DK5 | KK3 | DK32 | A1 |
| 24q | DK5 | KK3 | DK35 | A1 |
| 24r | DK5 | KK3 | DK41 | A1 |
| 24s | DK5 | KK3 | DK46 | A1 |
| 24t | DK5 | KK3 | DK47 | A1 |
| 24u | DK5 | KK3 | DK58 | A1 |

Example 25a

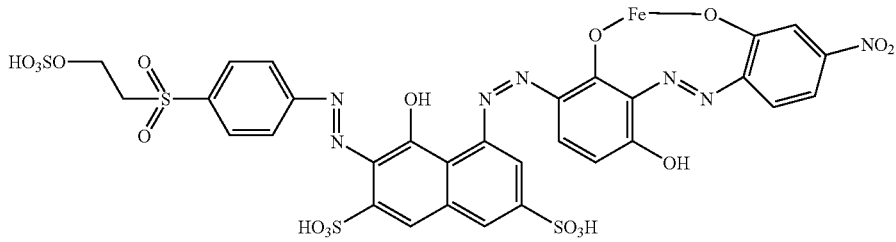

Method A:

1) 1 mol of H acid was dissolved in 25% by weight aqueous sodium hydroxide solution, diazotized at pH<1 and 0-5° C. with excess sodium nitrite and hydrochloric acid. 1 mol of resorcinol was dissolved in 50% by weight aqueous sodium hydroxide solution at pH>12. This solution was admixed with the diazotized H acid added dropwise at below 10° C. within 30 min while the pH was maintained above 9 by addition of 10% by weight aqueous sodium hydroxide solution.

2) 1 mol of 5-nitro-2-aminophenol was suspended in ice-water, thereafter diazotized with excess sodium nitrite at pH<1 and 0-5° C. and then added to the reaction mixture obtained in step 1). The pH was maintained between 3 and 8 by addition of 10% by weight aqueous sodium hydroxide solution.

3) 1 mol of parabase was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Method B:

1) 1 mol of H acid was dissolved in 25% by weight aqueous sodium hydroxide solution and acetylated with 1.1-1.5 mol of acetic anhydride.

2) 1 mol of parabase was suspended in ice-water and diazotized at pH<1 and 0-5° C. with excess sodium nitrite and hydrochloric acid and added to the reaction mixture obtained in step 1). The pH was maintained between 4 and 7 by addition of sodium carbonate. After the coupling had ended, the pH was adjusted to below 1 by addition of 21% by weight hydrochloric acid and the reaction mixture was heated to 85-95° C. This detached the acetyl group.

3) The product obtained in step 2) was diazotized at pH<1 and 0-5° C. with excess sodium nitrite and hydrochloric acid and added to an aqueous solution of 1 mol of resorcinol. The pH was maintained between 3 and 8 by addition of 10% by weight aqueous sodium hydroxide solution.

4) 1 mol of 5-nitro-2-aminophenol was suspended in ice-water, diazotized with excess sodium nitrite and hydrochloric acid at pH<1 and 0-5° C. and added to the reaction mixture obtained in step 3). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 26a

The reaction was carried out in accordance with the methods described in example 25a except that there was no subsequent reaction with iron salts.

Example 27

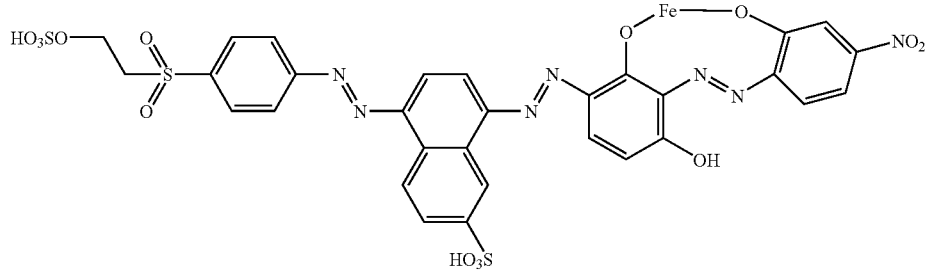

1) 1 mol of Cleve's acid 7 was dissolved in 25% by weight aqueous sodium hydroxide solution. At the same time, 1 mol of parabase was suspended in ice-water and diazotized with excess sodium nitrite and hydrochloric acid at pH<1 and 0-5° C. and subsequently added to the solution of the Cleve's acid 7 while the pH was maintained below 2.

2) The product obtained in step 1) was diazotized at pH<1 and 0-5° C. with excess sodium nitrite and hydrochloric acid. Subsequently, the reaction mixture was added to an aqueous solution of 1 mol of resorcinol. The pH was maintained between 3 and 8 by addition of 10% by weight aqueous sodium hydroxide solution.

3) 1 mol of 5-nitro-2-aminophenol was suspended in ice-water, diazotized with excess sodium nitrite and hydrochloric acid at pH<1 and 0-5° C. and added to the reaction mixture obtained in step 2). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Example 28

The reaction was carried out in accordance with the method described in example 27 except that there was no subsequent reaction with iron salts.

Example 29a by weight aqueous sodium hydroxide solution. This solution was admixed with the diazotized parabase added dropwise at below 10° C. within 30 min while the pH was maintained between 6 and 8 by addition of 10% by weight aqueous sodium hydroxide solution.

2) 1 mol of H acid was dissolved in 25% by weight aqueous sodium hydroxide solution, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution.

3) 1 mol of 5-nitro-2-aminophenol was suspended in ice-water, thereafter diazotized with excess sodium nitrite at pH<1 and 0-5° C. and then added to the reaction mixture obtained in step 3). The pH was maintained between 3 and 8 by addition of 10% by weight aqueous sodium hydroxide solution. After the reaction had ended, 0.40-0.60 mol of iron (III) sulfate was added to the reaction mixture and stirred in for 1 hour. The dye was precipitated by addition of NaCl and filtered off with suction.

Method B:

1) 1 mol of parabase was suspended in ice-water, diazotized at pH<1 and 0-5° C. with excess sodium nitrite and hydrochloric acid. 1 mol of resorcinol was dissolved in 50% by weight aqueous sodium hydroxide solution. This solution was admixed with the diazotized parabase added dropwise at below 10° C. within 30 min while the pH was maintained

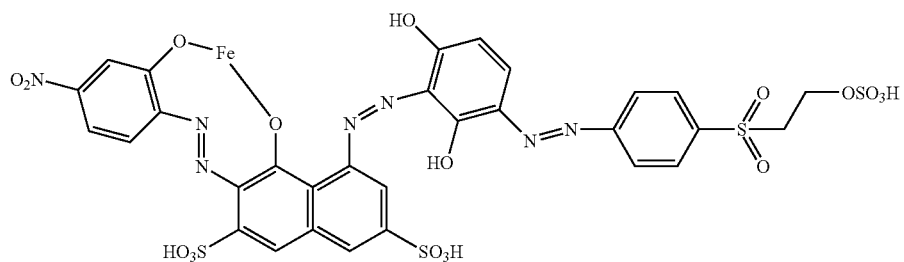

Method A:

1) 1 mol of parabase was suspended in ice-water, diazotized at pH<1 and 0-5° C. with excess sodium nitrite and hydrochloric acid. 1 mol of resorcinol was dissolved in 50% between 6 and 8 by addition of 10% by weight aqueous sodium hydroxide solution.

2) 1 mol of H acid was dissolved in 25% by weight aqueous sodium hydroxide solution and acetylated with 1.1-1.5 mol of acetic anhydride.

3) 1 mol of 5-nitro-2-aminophenol was suspended in ice-water and diazotized at pH<1 and 0-5° C. with excess sodium nitrite and added to the reaction mixture obtained in step 2). The pH was maintained between 4 and 7 by addition of sodium carbonate. After the coupling had ended, the pH was adjusted to below 1 by addition of 21% by weight hydrochloric acid and the reaction mixture was heated to 85-95° C. This detaches the acetyl group.

4) The product obtained in step 3) was diazotized at pH<1 and 0-5° C. with excess sodium nitrite and hydrochloric acid and added to the reaction mixture obtained in step 1). The pH was maintained between 3-8 by addition of 10% by weight sodium hydroxide solution. After the reaction had ended, 0.40-0.60 mol of iron(III) sulfate was added to the reaction mixture and stirred in for 1 hour. The dye was precipitated by addition of NaCl and filtered off with suction.

Example 30a

The reaction was carried out in accordance with the methods described in example 29a except there was no subsequent reaction with iron salts.

Example 31

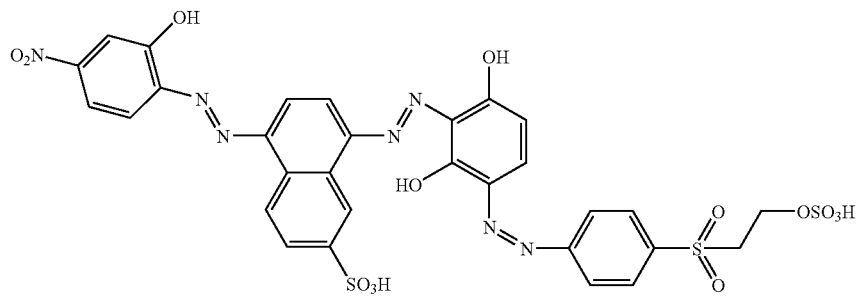

1) 1 mol of parabase was suspended in ice-water diazotized at pH<1 and 0-5° C. with excess sodium nitrite and hydrochloric acid. 1 mol of resorcinol was dissolved in 50% by weight aqueous sodium hydroxide solution. This solution was admixed with the diazotized parabase added dropwise at below 10° C. within 30 min while the pH was maintained between 6 and 8 by addition of 10% by weight aqueous sodium hydroxide solution.

2) 1 mol of 5-nitro-2-aminophenol was suspended in ice-water, diazotized with excess sodium nitrite and hydrochloric acid at pH<1 and 0-5° C. and added to a 25% by weight aqueous sodium hydroxide solution with 1 mol of Cleve's acid 7 while the pH was maintained below 2.

3) The product obtained in step 2) was diazotized with excess sodium nitrite and hydrochloric acid at pH<1 and 0-5° C. and subsequently added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to examples 25a, 27 and 29a it is possible to obtain the metal complexes of dyes of the general formula $Dk^1$-N=N-Napht$^1$-N=N-Kk$^1$-N=N-Dk$^2$ (=dyes of the general formula I where p=1 and m=1) wherein $Dk^1$ and $DK^2$ each represent a radical derived from the diazo components DK1 to DK9, DK13, DK14, DK26, DK27, DK39 to DK41 or DK58 or from A1 to A6, at least one of the radicals $Dk^1$ or $Dk^2$ representing a radical of the formula A, $Kk^1$ represents a bivalent radical derived from Kk2 or Kk3 and Napht$^1$ is a bivalent radical of the formulae II-1, II-3, II-5, II-7, II-9, II-11, II-13, II-15 or II-16. Examples thereof are reported in table 7.

TABLE 7

| Example No. | $Dk^1$ | Napht | Kk | $Dk^2$ | Me |
| --- | --- | --- | --- | --- | --- |
| 25a | A1 | DK44 | Kk3 | DK1 | Fe |
| 25b | A1 | DK44 | Kk3 | DK4 | Cu |
| 25c | A1 | DK44 | Kk3 | DK5 | Fe |
| 25d | A4 | DK44 | Kk3 | DK5 | Fe |
| 25e | A1 | DK44 | Kk3 | DK40 | Fe |
| 25f | A1 | DK44 | Kk3 | DK58 | Cr |
| 25g | A1 | DK57 | Kk3 | DK5 | Fe |
| 25h | DK1 | DK44 | Kk3 | A1 | Fe |
| 25i | DK2 | DK44 | Kk3 | A1 | Fe |
| 25j | DK4 | DK44 | Kk3 | A1 | Fe |
| 25k | DK5 | DK44 | Kk3 | A1 | Fe |
| 25l | DK27 | DK44 | Kk3 | A1 | Fe |
| 25m | DK41 | DK44 | Kk3 | A1 | Fe |
| 25n | A4 | DK44 | Kk3 | DK5 | Fe |
| 25o | A4 | DK44 | Kk3 | DK40 | Fe |
| 29a | DK1 | DK44 | Kk3 | A1 | Fe |
| 29b | DK2 | DK44 | Kk3 | A1 | Fe |
| 29c | DK4 | DK44 | Kk3 | A1 | Fe |
| 29d | DK5 | DK44 | Kk3 | A1 | Fe |
| 29e | DK27 | DK44 | Kk3 | A1 | Fe |
| 29f | DK41 | DK44 | Kk3 | A1 | Fe |
| 29g | A1 | DK44 | Kk3 | DK1 | Fe |
| 29h | A1 | DK44 | Kk3 | DK4 | Cu |
| 29i | A1 | DK44 | Kk3 | DK5 | Fe |
| 29j | A2 | DK44 | Kk3 | DK5 | Fe |
| 29k | A1 | DK44 | Kk3 | DK40 | Fe |
| 29l | A1 | DK44 | Kk3 | DK58 | Cr |
| 29m | A1 | DK57 | Kk3 | DK5 | Fe |

Proceeding in a manner analogous to examples 26a, 28, 30a and 31 it is possible to obtain the dyes of the general formula $Dk^1$-N=N-Napht$^1$-N=N-Kk$^1$-N=N-Dk$^2$ (=dyes of the general formula I where p=1 and m=1) wherein $Dk^1$ and $DK^2$ represent a radical derived from the diazo components DK1 to DK83 or from A1 to A6, at least one of the radicals $Dk^1$ or $Dk^2$ representing a radical of formula A, $Kk^1$ represents a bivalent radical derived from Kk2, Kk3, Kk5, Kk49 or Kk50 and Napht[1] is a bivalent radical of the formulae II-1, II-3, II-5, II-7, II-9, II-11, II-13, II-15 or II-16. Examples thereof are reported in table 8.

TABLE 8

| Example No. | Dk[1] | Napht | Kk | Dk[2] |
|---|---|---|---|---|
| 26a | A1 | DK44 | Kk3 | DK1 |
| 26b | A1 | DK44 | Kk3 | DK4 |
| 26c | A1 | DK44 | Kk3 | DK5 |
| 26d | A4 | DK44 | Kk3 | DK5 |
| 26e | A1 | DK44 | Kk3 | DK9 |
| 26f | A1 | DK44 | Kk3 | DK10 |
| 26g | A1 | DK44 | Kk3 | DK12 |
| 26h | A1 | DK44 | Kk3 | DK28 |
| 26i | A1 | DK44 | Kk3 | DK32 |
| 26j | A1 | DK44 | Kk3 | DK37 |
| 26k | A1 | DK44 | Kk3 | DK40 |
| 26l | A1 | DK44 | Kk3 | DK46 |
| 26m | A1 | DK44 | Kk3 | DK58 |
| 26n | A1 | DK57 | Kk3 | DK5 |
| 26o | DK1 | DK44 | Kk3 | A1 |
| 26p | DK2 | DK44 | Kk3 | A1 |
| 26q | DK4 | DK44 | Kk3 | A1 |
| 26r | DK5 | DK44 | Kk3 | A1 |
| 26s | DK8 | DK44 | Kk3 | A1 |
| 26t | DK10 | DK44 | Kk3 | A1 |
| 26u | DK12 | DK44 | Kk3 | A1 |
| 26v | DK17 | DK44 | Kk3 | A1 |
| 26z | DK27 | DK44 | Kk3 | A1 |
| 26aa | DK28 | DK44 | Kk3 | A1 |
| 26ab | DK32 | DK44 | Kk3 | A1 |
| 26ac | DK41 | DK44 | Kk3 | A1 |
| 26ad | DK46 | DK44 | Kk3 | A1 |
| 26ae | DK47 | DK44 | Kk3 | A1 |
| 26af | DK28 | DK44 | Kk3 | A4 |
| 26ag | DK32 | DK45 | Kk3 | A2 |
| 26ah | DK41 | DK45 | Kk3 | A4 |
| 26ai | DK46 | DK45 | Kk3 | A5 |
| 30a | DK1 | DK44 | Kk3 | A1 |
| 30b | A1 | DK44 | Kk3 | DK4 |
| 30c | A1 | DK44 | Kk3 | DK5 |
| 30d | A4 | DK44 | Kk3 | DK5 |
| 30e | A1 | DK44 | Kk3 | DK9 |
| 30f | A1 | DK44 | Kk3 | DK10 |
| 30g | A1 | DK44 | Kk3 | DK12 |
| 30h | A1 | DK44 | Kk3 | DK28 |
| 30i | A1 | DK44 | Kk3 | DK32 |
| 30j | A1 | DK44 | Kk3 | DK37 |
| 30k | A1 | DK44 | Kk3 | DK40 |
| 30l | A1 | DK44 | Kk3 | DK46 |
| 30m | A1 | DK44 | Kk3 | DK58 |
| 30n | A1 | DK57 | Kk3 | DK5 |
| 30o | A1 | DK44 | Kk3 | DK1 |
| 30p | DK2 | DK44 | Kk3 | A1 |
| 30q | DK4 | DK44 | Kk3 | A1 |
| 30r | DK5 | DK44 | Kk3 | A1 |
| 30s | DK8 | DK44 | Kk3 | A1 |
| 30t | DK10 | DK44 | Kk3 | A1 |
| 30u | DK12 | DK44 | Kk3 | A1 |
| 30v | DK17 | DK44 | Kk3 | A1 |
| 30z | DK27 | DK44 | Kk3 | A1 |
| 30aa | DK28 | DK44 | Kk3 | A1 |
| 30ab | DK32 | DK44 | Kk3 | A1 |
| 30ac | DK41 | DK44 | Kk3 | A1 |
| 30ad | DK46 | DK44 | Kk3 | A1 |
| 30ae | DK47 | DK44 | Kk3 | A1 |
| 30af | DK28 | DK44 | Kk3 | A2 |
| 30ag | DK32 | DK45 | Kk3 | A4 |
| 30ah | DK41 | DK45 | Kk3 | A4 |
| 30ai | DK46 | DK45 | Kk3 | A4 |

Example 32a

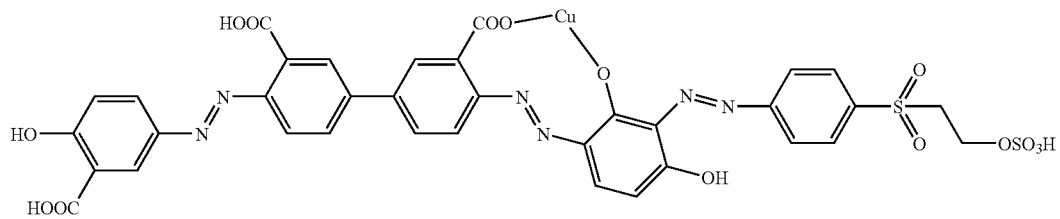

1) 1 mol of 4,4'-diaminobiphenyl-3,3'-dicarboxylic acid was tetrazotized with excess sodium nitrite and hydrochloric acid at pH<1 and 0-5° C. and reacted with 1 mol of salicylic acid at a pH from 5 to 11.

2) 1 mol of resorcinol was dissolved in 50% by weight aqueous sodium hydroxide solution at pH>12. This solution was admixed with the reaction product obtained in step 1) added dropwise at below 10° C. in the course of 30 min during which the pH was maintained above 9 by addition of 10% by weight aqueous sodium hydroxide solution.

3) 1 mol of parabase was suspended in ice-water, diazotized with excess sodium nitrite and hydrochloric acid at pH<1 and 0-5° C. Subsequently, the diazotized parabase was added to the reaction mixture obtained in step 2) while the pH was maintained between 5 and 8 by addition of 10% by weight aqueous sodium hydroxide solution. After the reaction has ended, 1 mol of copper(II) sulfate was added to the reaction mixture and stirred in at 70° C. for 1 hour. The dye was precipitated by addition of NaCl and filtered off with suction.

Example 33a

The reaction was carried out in accordance with the method described in example 32a except that there was no subsequent reaction with copper salts.

Example 34

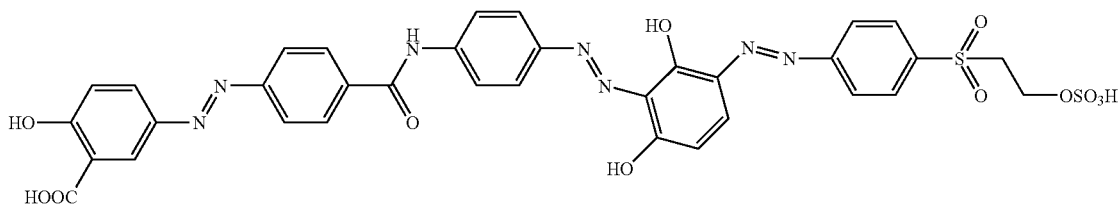

1) 1 mol of 4,4-diaminobenzanilide was tetrazotized with excess sodium nitrite and hydrochloric acid at pH<1 and 0-5° C. and reacted with 1 mol of salicylic acid at pH 5-11.

2) 1 mol of parabase was suspended in ice-water, diazotized with excess sodium nitrite and hydrochloric acid at pH<1 and 0-5° C. 1 mol of resorcinol was dissolved in 50% by weight aqueous sodium hydroxide solution. The diazotized parabase was added dropwise to this within 30 min at below 10° C. while the pH was held between 6 and 8 by addition of 10% by weight aqueous sodium hydroxide solution.

3) The product obtained in step 2) was added to the reaction mixture obtained in step 1) while the pH was maintained between 5 and 8 by addition of 10% by weight aqueous sodium hydroxide solution. After the reaction had ended, the dye was precipitated by addition of NaCl and filtered off with suction.

Proceeding in a manner analogous to examples 32a, 33a and 34 it is possible to obtain the dyes of the general formula $Kk^3$-N=N-$Tk^1$-N=N-$Kk^1$-N=N-A and their metal complexes (=dyes of the general formula VI) wherein $Kk^3$ represents a radical derived from coupling components Kk1 to Kk48 or Kk51 to Kk64 or represents Dk42 to Dk83, $Tk^1$ represents a bivalent radical derived from TK1 to Tk20, $Kk^1$ represents a bivalent radical derived from Kk2, Kk3, Kk5, Kk49 or Kk50 and A represents one of the radicals A1 to A6. Examples thereof are reported in table 9.

TABLE 9

| Example No. | $Kk^3$ | Tk | $Kk^1$ | A | Me |
|---|---|---|---|---|---|
| 32a | Kk1 | Tk11 | Kk3 | A1 | Cu |
| 32b | Kk40 | Tk11 | Kk3 | A1 | Cu |
| 32c | Dk46 | Tk8 | Kk3 | A1 | Cu |
| 33a | DK44 | Tk16 | Kk3 | A1 | |
| 33b | DK44 | Tk18 | Kk3 | A1 | |
| 33c | Kk39 | Tk18 | Kk3 | A1 | |

Example 35a

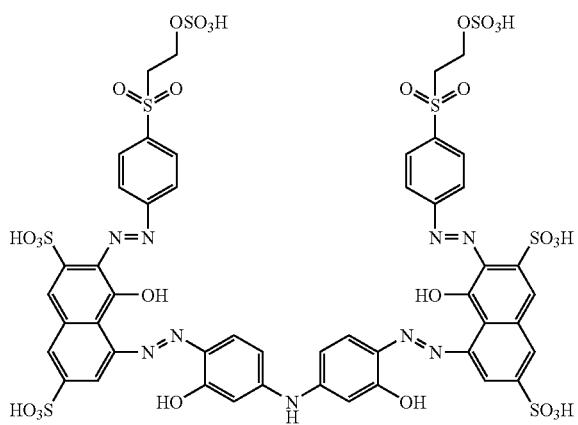

1) 2 mol of H acid was dissolved in 25% by weight aqueous sodium hydroxide solution, diazotized with excess sodium nitrite and hydrochloric acid at pH<1 and 0-5° C. and added to an aqueous solution of 1 mol of 3,3'-dihydroxydiphenylamine. The pH was maintained between 3 and 10 by addition of 10% by weight aqueous sodium hydroxide solution.

2) 2 mol of parabase was suspended in ice-water, diazotized with excess sodium nitrite and hydrochloric acid at pH<1 and 0-5° C. and added to the reaction mixture obtained in step 1). The pH was maintained between 3-8 by addition of 10% by weight aqueous sodium hydroxide solution. After the reaction had ended, the dye was precipitated by addition of NaCl and filtered off with suction.

Proceeding in a manner analogous to example 35a it is possible to obtain the dyes of the general formula $Dk^1$-N=N—P—N=N-$Kk^1$-N=N—R'—N=N-$Dk^2$ and their metal complexes (dyes of the general formula VII) wherein $Dk^1$ and $DK^2$ represent a radical derived from the diazo components DK1 to DK83 or from A1 to A6, at least one of the radicals $Dk^1$ or $Dk^2$ representing a radical of formula A, $Kk^1$ represents a bivalent radical derived from Kk2, Kk3, Kk5, Kk49 or Kk50 and P and R' each represent a bivalent radical of the formulae II-1, II-3, II-5, II-7, II-9, II-11 and II-13 derived divalent radical. Examples thereof are reported in table 10.

TABLE 10

| Example No. | $Dk^1$ | P | $Kk^1$ | R' | $Dk^2$ | Metal |
|---|---|---|---|---|---|---|
| 35a | A1 | DK44 | Kk50 | DK44 | A1 | |
| 35b | A1 | DK44 | Kk50 | DK44 | A1 | Cu |

TABLE 10-continued

| Example No. | Dk¹ | P | Kk¹ | R' | Dk² | Metal |
|---|---|---|---|---|---|---|
| 35c | A1 | DK44 | Kk50 | DK44 | A1 | Co |
| 35d | A1 | DK44 | Kk49 | DK44 | A1 | Cu |
| 35e | A1 | DK44 | Kk49 | DK44 | A1 | Co |

Example 36a

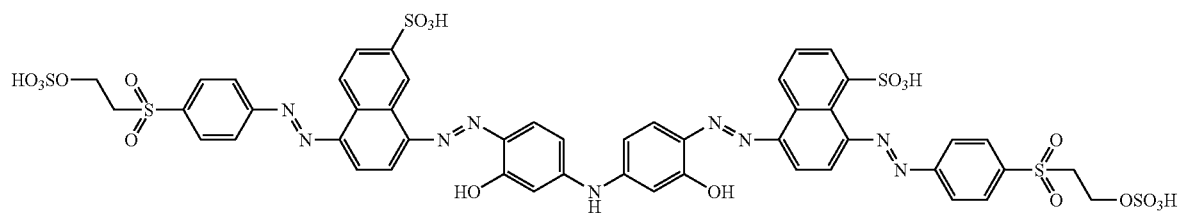

1) 1 mol of parabase was suspended in ice-water, diazotized with excess sodium nitrite and hydrochloric acid at pH<1 and 0-5° C. and added to an alkaline solution of 1 mol of Cleve's acid 7. The pH was maintained between 3 and 8 by addition of 10% by weight aqueous sodium hydroxide solution.

2) 1 mol of parabase was suspended in ice-water, diazotized with excess sodium nitrite and hydrochloric acid at pH<1 and 0-5° C. and added to an alkaline solution of 1 mol of 8-aminonaphthalene-1-sulfonic acid (Dk56). The pH was maintained between 3 and 8 by addition of 10% by weight aqueous sodium hydroxide solution.

3) The product obtained in step 1) was diazotized at pH<1 and 0-5° C. with excess sodium nitrite and hydrochloric acid and added in the course of 30 min to an alkaline solution of 1 mol of 3,3'-dihydroxydiphenylamines. The pH was maintained between 3 and 8 by addition of 10% by weight aqueous sodium hydroxide solution.

4) The product obtained in step 2) was diazotized at pH<1 and 0-5° C. with excess sodium nitrite and hydrochloric acid and added to the reaction mixture obtained in step 3) while the pH was maintained between 5 and 8 by addition of 10% by weight aqueous sodium hydroxide solution. After the reaction had ended, the dye was precipitated by addition of NaCl and filtered off with suction.

Proceeding in a manner analogous to example 36a it is possible to obtain the dyes of the general formula Dk¹-N=N—P—N=N-Kk¹-N=N—R'—N=N-Dk² and their metal complexes (dyes of the general formula VII) wherein Dk¹ and DK² represent a radical derived from the diazo components DK1 to DK83 or from A1 to A6, at least one of the radicals Dk¹ or Dk² representing a radical of formula A, Kk represents a bivalent radical derived from Kk2, Kk3, Kk5, Kk49 or Kk50 and P and R' each represent a bivalent radical of the formulae II-15 or II-16 or a divalent radical derived from the diazo components DK3, DK4, DK6, DK7, DK11, DK13, DK14, DK15, DK18, DK22 to DK27, DK29, DK30, DK33, DK36, DK38, or DK39. Examples thereof are reported in table 10.

TABLE 11

| Example No. | Dk¹ | P | Kk¹ | R' | Dk² | Metal |
|---|---|---|---|---|---|---|
| 36a | A1 | DK46 | Kk50 | DK56 | A1 | |
| 36b | A1 | DK4 | Kk49 | DK46 | A1 | Cu |
| 36c | A1 | DK4 | Kk49 | DK46 | A1 | Co |
| 36d | A1 | DK4 | Kk50 | DK46 | A1 | Cu |

Example 37

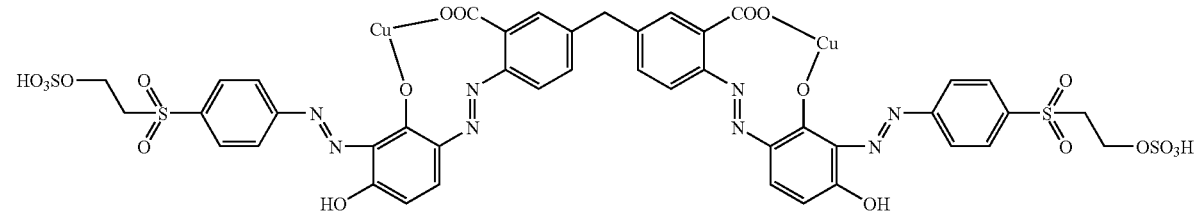

1) 2 mol of anthranilic acid was dissolved in sulfuric acid (96%) at 70-80° C. and reacted with 0.5-0.6 mol of formaldehyde. After 2 hours at 70-80° C. the reaction mixture was cooled to about 0° C. by addition of ice and the product obtained was tetrazotized with excess sodium nitrite and hydrochloric acid at pH<1 and 0-5° C. 1.8-2.2 mol of resorcinol was dissolved in 50% by weight aqueous sodium hydroxide solution at pH>12 and this solution was admixed with the tetrazotized compound added dropwise at below 5° C. in the course of 30 min during which the pH was maintained above 8 by addition of 10% by weight aqueous sodium hydroxide solution.

2) 2 mol of parabase was suspended in ice-water, diazotized with excess sodium nitrite and hydrochloric acid at pH<1 and 0-5° C. and added to the reaction mixture obtained in step 1). The pH was maintained between 3 and 8 by addition of 10% by weight aqueous sodium hydroxide solution. After the reaction had ended, the reaction solution was heated to 80° C. and 2 mol of CuSO₄ were added. Subsequently, the reaction mixture obtained was evaporated to obtain the complexed dye.

Example 38

The reaction was carried out in accordance with the method described in example 37 except that there was no subsequent reaction with copper salts.

Example 39

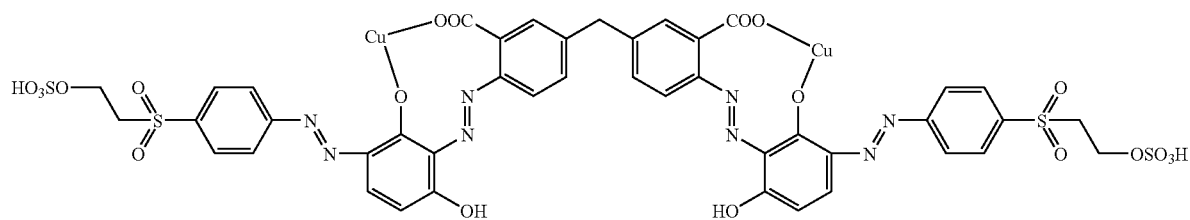

1) 2 mol of anthranilic acid was dissolved in sulfuric acid (96%) at 70-80° C. and reacted with 0.5-0.6 mol of formaldehyde. After 2 hours at 70-80° C. the reaction mixture was cooled to about 0° C. by addition of ice and the product obtained was tetrazotized with excess sodium nitrite and hydrochloric acid at pH<1 and 0-5° C.

2) 2 mol of parabase was suspended in ice-water, diazotized with excess sodium nitrite and hydrochloric acid at pH<1 and 0-5° C. 2 mol of resorcinol was dissolved in 50% by weight aqueous sodium hydroxide solution. The diazotized parabase was added dropwise to this at below 10° C. within 30 min during which the pH was maintained between 6 and 8 by addition of 10% by weight aqueous sodium hydroxide solution.

3) The reaction mixture obtained in step 1) was added to the reaction mixture obtained in step 2). The pH was maintained between 3 and 8 by addition of 10% by weight aqueous sodium hydroxide solution. After the reaction had ended, the reaction solution was heated to 80° C. and 2 mol of CuSO₄ were added. Subsequently, the reaction mixture obtained was evaporated to dryness to obtain the complexed dye.

Example 40

The reaction was carried out in accordance with the method described in example 39 except that there was no subsequent reaction with copper salts.

Proceeding in a manner analogous to examples 37 and 39 it is possible to obtain the metal complexes of the dyes of the general formula $Dk^1$-N=N-$Kk^1$-N=N-$Tk^1$-N=N-$Kk^2$-N=N-$Dk^2$ (dyes of the general formula IV) wherein $Dk^1$ and $Dk^2$ represent a radical derived from the diazo components DK1 to DK83 or from A1 to A6, at least one of the radicals $Dk^1$ or $Dk^2$ representing a radical of formula A, $Tk^1$ represents a bivalent radical derived from Tk3, Tk4, Tk8 to Tk11, Tk14, Tk16 or Tk19 and $Kk^1$ and also $Kk^2$ independently represent a bivalent radical derived from Kk2, Kk3, Kk5, Kk49 or Kk50 or a bivalent radical of the formulae II-2, II-4, II-6, II-8, II-10, II-12 or II-14.

Proceeding in a manner analogous to examples 38 and 40 it is possible to obtain the dyes of the general formula $Dk^1$-N=N-$Kk^1$-N=N-$Tk^1$-N=N-$Kk^2$-N=N-$Dk^2$ (dyes of the general formula IV) wherein $Dk^1$ and $Dk^2$ represent a radical derived from the diazo components DK1 to DK83 or from A1 to A6, at least one of the radicals $Dk^1$ or $Dk^2$ representing a radical of formula A, $Tk^1$ represents a bivalent radical derived from Tk1 to Tk20, and $Kk^1$ and also $Kk^2$ independently represent a bivalent radical derived from Kk2, Kk3, Kk5, Kk49 or Kk50 or a bivalent radical of the formulae II-2, II-4, II-6, II-8, II-10, II-12 or II-14.

Dyeing Prescriptions:
Parts are by weight.

The fixation yield was determined qualitatively by HPLC analysis and quantitatively by UV-VIS spectroscopy of the dyeing float. To this end, 5 ml samples were taken after the dyeing (pH<7), after 60 min, 120 min, 180 min of fixation (pH>7) and of every wash liquor float and adjusted to pH 3-4 with 1 ml of formic acid solution. The samples were analyzed for dye and its hydrolysis products by HPLC. The HPLC columns used were Nucleodur C18 Gravity 3μ, CC70/2 and Hypersil 120-5 ODS, CC100/2 from Macherey-Nagel. The eluent used was acetonitrile/buffer (1.6 g of tetrabutylammonium hydrogensulfate, 6 g of dipotassium hydrogenphosphate trihydrate in 1 L of water).

Fastnesses were determined according to the following, internationally recognized standards:
Perspirationfastness: on the lines of Veslic C4260
Washfastness: on the lines of DIN EN ISO 15703
Migrationfastness: on the lines of DIN EN ISO 15701 and also by 16 h storage at 85° C. in a humidity of 95% under otherwise analogous conditions to DIN EN ISO 15701
Rubfastness: on the lines of DIN EN ISO 105-X12 (Crockmeter, rubbing with woven cotton) and also on the lines of DIN EN ISO 11640 (Veslic, Rubbing with Felt)

Dyeing Prescription 1:
a) A piece of 100 parts by weight of a conventionally organic-tanned cattlehides leather 1.1 mm in shaved thickness washed at 30° C. for 20 minutes in a drum filled with 200 parts of water. This was followed by dyeing using 150 parts of water, 2 parts of a dispersant and 5 parts of dye from example 2d at pH 4.4 and 30° C. for 60 minutes. The pH was maintained between 10.0 and 10.2 at 40° C. by portionwise addition of 100 parts of 15% sodium carbonate solution to fix the dye in the course of 60 minutes of drumming. This was followed by 6 10 minute washes in 200 parts of water at 40° C. A pH of 4.7 was set by adding 200 parts of water and 0.7 part of formic acid.

b) The leather thus dyed was retanned in a freshly set float composed of 100 parts of water, 2 parts of polymeric tanning material and 2 parts of a naturally based fatliquor at 35° C. for 30 minutes. The float was then admixed with 15 parts of a liquid synthetic tanning material, 6 parts of polymeric tanning material, 10 parts of Tara vegetable tanning material and drummed for 20 minutes. The leather was subsequently fatliquored in the same float with 8 parts of a fishoil-based fatliquor and 2 parts of a lecithin-based fatliquor at 35° C. by drumming for 2 hours. Finally, the leather was acidified to pH 3.6 with 2 parts of concentrated formic acid and drummed twice for 10 minutes and once for 30 minutes. The dyed, retanned and fatliquored leather was additionally rinsed with cold water at 15° C. for 10 minutes and subsequently set out, suspension dried at room temperature overnight, conditioned, staked and strained.

The leather obtained had a deep dark green color having excellent wash-, perspiration-, rub- and migrationfastness.

Dyeing Prescription 2:

a) A piece of 100 parts by weight of a conventionally organic-tanned cattlehide leather 1.1 mm in shaved thickness washed at 30° C. for 20 minutes in a drum filled with 200 parts of water. This was followed by dyeing using 150 parts of water, 2 parts of a dispersant and 5 parts of dye from example 2a at pH 4.4 and 30° C. for 60 minutes. The pH was maintained at 10.0 at 40° C. by portionwise addition of 15 parts of solid sodium carbonate to fix the dye in the course of 60 minutes of drumming. This was followed by 4 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep black color having excellent wash-,perspiration-,rub- and migrationfastness.

Dyeing Prescription 3:

a) A piece of 100 parts by weight of a conventionally organic-tanned cattlehide leather 1.1 mm in shaved thickness washed at 30° C. for 20 minutes in a drum filled with 200 parts of water. This was followed by dyeing using 150 parts of water, 2 parts of a dispersant and 5 parts of dye from example 13 at pH 4.4 and 30° C. for 60 minutes. The pH was maintained at 10.0 at 50° C. by portionwise addition of 100 parts of 15% sodium carbonate solution to fix the dye in the course of 60 minutes of drumming. This was followed by 4 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep red color having excellent wash-, perspiration-, rub- and migrationfastness.

Dyeing Prescription 4:

A piece of 100 parts by weight of a conventionally organic-tanned cattlehide leather 1.1 mm in shaved thickness washed at 30° C. for 20 minutes in a drum filled with 200 parts of water. This was followed by dyeing using 150 parts of water, 2 parts of a dispersant and 5 parts of dye from example 6g at pH 4.4 and 30° C. for 60 minutes. The pH was maintained at 10.0 at 40° C. by portionwise addition of 100 parts of 15% sodium carbonate solution to fix the dye in the course of 90 minutes of drumming. This was followed by 3 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep black color having excellent wash-, perspiration-, rub- and migrationfastness.

Dyeing Prescription 5:

A piece of 100 parts by weight of a conventionally organic-tanned cattlehide leather 1.1 mm in shaved thickness washed at 30° C. for 20 minutes in a drum filled with 200 parts of water. This was followed by dyeing using 150 parts of water, 2 parts of a dispersant and 5 parts of dye from example 2bg at pH 4.4 and 30° C. for 60 minutes. The pH was maintained at 10.0 at 40° C. by portionwise addition of 100 parts of 15% sodium carbonate solution to fix the dye in the course of 60 minutes of drumming. Concurrently with the addition of sodium carbonate solution, a total of 15 parts of Glauber salt was added in 3 portions. This was followed by 5 10 minute washes in 200 parts of water at 40° C. A pH of 4.7 was set by adding 200 parts of water and 0.7 part of formic acid. This was followed by treatment as described in part b) of dyeing prescription 1.

The leather obtained had a brilliant deep black color having excellent wash-, perspiration-, rub- and migrationfastness.

Dyeing Prescription 6:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 2m at pH 4.1 and 30° C. for 60 minutes. The pH was maintained between 7.9 and 9.0 at 40° C. by portionwise addition of 100 parts of a borax buffer to fix the dye in the course of 180 minutes of drumming. This was followed by 5 10 minute washes in 200 parts of water at 40° C. A pH of 4.3 was set by adding 200 parts of water and 0.6 part of formic acid. This was followed by treatment as described in part b) of dyeing prescription 1.

The leather obtained had a brilliant deep black color having excellent wash-, perspiration-, rub- and migrationfastness.

Dyeing Prescription 7:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 2n at pH 4.1 and 30° C. for 60 minutes. The pH was maintained between 9.4-9.9 at 40° C. by single addition of 30 parts of 15% sodium carbonate solution to fix the dye in the course of 180 minutes of drumming. This was followed by 3 10 minute washes in 200 parts of water at 40° C. A pH of 4.5 was set by adding 200 parts of water and 0.7 part of formic acid. This was followed by treatment as described in part b) of dyeing prescription 1.

The leather obtained had a brilliant deep black color having excellent wash-, perspiration-, rub- and migrationfastness.

Dyeing Prescription 8:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 2b at pH 4.1 and 30° C. for 60 minutes. The pH was maintained between 8.0 and 9.0 at 40° C. by portionwise addition of 100 parts of a borax buffer to fix the dye in the course of 180 minutes of drumming. This was followed by 3 10 minute washes in 200 parts of water at 40° C. A pH of 4.5 was set by adding 200 parts of water and 0.7 part of formic acid. This was followed by treatment as described in part b) of dyeing prescription 1.

The leather obtained had a deep black color having excellent wash-, perspiration-, rub- and migrationfastness.

Dyeing Prescription 9:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 2k at pH 4.2 and 30° C. for 60 minutes. The pH was maintained between 9.4-9.9 at 40° C. by single addition of 30 parts of 15% sodium carbonate solution to fix the dye in the course of 180 minutes of drumming. This was followed by 3 10 minute washes in 200 parts of water at 40° C. A pH of 4.8 was set by adding 200 parts of water and 0.7 part of formic acid. This was followed by treatment as described in part b) of dyeing prescription 1.

The leather obtained had a deep black color having excellent wash-, perspiration-, rub- and migrationfastness.

Dyeing Prescription 10:

A piece of 100 parts by weight of a conventionally organic-tanned cattlehide leather 1.0 mm in shaved thickness washed at 30° C. for 20 minutes in a drum filled with 200 parts of water. This was followed by dyeing using 100 parts of water, 2 parts of a dispersant and 5 parts of dye from example 2ae at pH 4.2 and 30° C. for 30 minutes. The pH was maintained between 8.6-9.3 at 40° C. by portionwise addition of 20 parts of 15% sodium carbonate solution to fix the dye in the course of 180 minutes of drumming. This was followed by 3 10 minute washes in 200 parts of water at 40° C. A pH of 4.8 was set by adding 200 parts of water and 0.7 part of formic acid. This was followed by treatment as described in part b) of dyeing prescription 1.

The leather obtained had a deep blue color having excellent wash-, perspiration-, rub- and migrationfastness.

Dyeing Prescription 11:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 1ae at pH 4.3 and 30° C. for 45 minutes.

The pH was maintained between 7.3-8.2 at 40° C. by portionwise addition of 40 parts of 7% sodium bicarbonate solution to fix the dye in the course of 240 minutes of drumming. This was followed by 6 10 minute washes in 200 parts of water at 40° C. A pH of 3.9 was set by adding 200 parts of water and 1.2 parts of formic acid. This was followed by treatment as described in part b) of dyeing prescription 1.

The leather obtained had a brilliant deep blue color having excellent wash-, perspiration-, rub- and migrationfastness.

Dyeing Prescription 12:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 2c at pH 4.1 and 30° C. for 30 minutes. The pH was adjusted to between 7.9-8.1 by portionwise addition of 40 parts of 7% sodium bicarbonate solution to fix the dye and drumming was carried out for 60 minutes, then 15 parts of Glauber salt were added in three portions and drumming was continued at pH 8.1-9.0 for a further 120 minutes. This was followed by 3 10 minute washes in 200 parts of water at 40° C. A pH of 3.8 was set by adding 200 parts of water and 1.0 part of formic acid. This was followed by treatment as described in part b) of dyeing prescription 1.

The leather obtained had a dark green color having excellent wash-, perspiration-, rub- and migrationfastness.

Dyeing prescription 13:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 1n at pH 4.2 and 30° C. for 45 minutes. The pH was adjusted to between 8.4-9.2 by portionwise addition of 20 parts of 15% sodium carbonate solution to fix the dye and drumming was carried out for 120 minutes. This was followed by 2 10 minute washes in 200 parts of water at 40° C. A pH of 3.9 was set by adding 200 parts of water and 1.1 parts of formic acid. This was followed by treatment as described in part b) of dyeing prescription 1.

The leather obtained had a black color having excellent wash-, perspiration- and migrationfastness.

Dyeing Prescription 14:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 5 parts of dye from example 21 at pH 4.2 and 30° C. for 60 minutes. The pH was adjusted to between 8.8-9.3 by portionwise addition of 21 parts of 15% sodium carbonate solution to fix the dye and drumming was carried out for 180 minutes. This was followed by 6 10 minute washes in 200 parts of water at 40° C. A pH of 4.5 was set by adding 200 parts of water and 0.7 part of formic acid. This was followed by treatment as described in part b) of dyeing prescription 1.

The leather obtained had a dark green color having excellent wash-, perspiration-, rub- and migrationfastness.

Dyeing Prescription 15:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water and 5 parts of dye from example 18b at pH 4.1 and 30° C. for 60 minutes. The pH was adjusted to between 8.8-9.3 by portionwise addition of 21 parts of 15% sodium carbonate solution to fix the dye and drumming was carried out for 180 minutes. This was followed by 6 10 minute washes in 200 parts of water at 40° C. A pH of 4.5 was set by adding 200 parts of water and 0.7 part of formic acid. This was followed by treatment as described in part b) of dyeing prescription 1.

The leather obtained had a brilliant deep brown color having excellent wash-, perspiration-, rub- and migrationfastness.

Dyeing Prescription 16:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 0.5 part of sodium bicarbonate and 1 part of a dispersant. The deacidifying float then had a pH of 5.0. The leather was then washed with 200 parts of water at 35° C. for 10 minutes. The leather thus neutralized was retanned in a freshly set float composed of 30 parts of water and 2 parts of a polymeric tanning material at 30° C. for 30 minutes. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.0 with 0.5% formic acid and drummed once for 10 minutes and once for 30 minutes.

The leather was dyed for 90 minutes at pH 4.8 and 35° C. in a freshly set float composed of 150 parts of water, 2 parts of a dispersant, 5 parts of dye from example 2r and 0.2 part of sodium bicarbonate. The pH was adjusted to between 9.0-9.3 by portionwise addition of 40 parts of 15% sodium carbonate solution to fix the dye and drumming was carried out at 40° C. for 180 minutes. This was followed by 6 10 minute washes in 200 parts of water at 40° C. A pH of 4.5 was set by adding 200 parts of water and 0.7 part of formic acid.

The leather was fatliquored by drumming for 40 minutes at 55° C. in a new float consisting of 100 parts of water, 4.5 parts of a mixed fatliquor based on sulfited fishoil and synthetic oil, 0.5 part of a lanolin-based fatliquor. This was followed by acidification to pH 3.5 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a deep black color having excellent wash-, perspiration-, rub- and migrationfastness.

Dyeing Prescription 17:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.3. The leather was then washed with 200 parts of water at 35° C. for 10 minutes.

The leather was dyed for 60 minutes at pH 5.6 and 30° C. in a freshly set float composed of 150 parts of water and 5 parts of dye from example 24c. The pH of the float was adjusted to between 8.5-9.1 by portionwise addition of 13 parts of 15% sodium carbonate solution, which was followed by drumming at 40° C. for 180 minutes. This was followed by 3 10 minute washes in 200 parts of water at 40° C. A pH of 4.8 was set by adding 200 parts of water and 1.5 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.4 with 0.5 part of formic acid and drummed once for 10 minutes and once for 30 minutes. Following a 10 minute wash with 100 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.5 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a deep brown color having excellent wash-, perspiration-, rub- and migrationfastness.

Dyeing Prescription 18:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.5. The leather was then washed with 200 parts of water at 35° C. for 10 minutes.

The leather was dyed for 45 minutes at pH 5.9 and 30° C. in a freshly set float composed of 150 parts of water and 5 parts of dye from example 24 h. The pH of the float was adjusted to between 8.8-9.6 by portionwise addition of 15 parts of 15% sodium carbonate solution, which was followed by drumming at 50° C. for 120 minutes. This was followed by 3 10 minute washes in 200 parts of water at 40° C. A pH of 5.1 was set by adding 200 parts of water and 0.5 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.1 with 1.0 part of formic acid and drummed once for 10 minutes and once for 30 minutes. Following a 10 minute wash with 200 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a dark brown color having excellent wash-, perspiration-, rub- and migrationfastness.

Dyeing Prescription 19:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.6. The leather was then washed with 200 parts of water at 35° C. for 10 minutes.

The leather was dyed for 60 minutes at pH 6.0 and 30° C. in a freshly set float composed of 150 parts of water and 5 parts of dye from example 1a. The pH of the float was adjusted to between 8.8-9.8 by portionwise addition of 18 parts of 15% sodium carbonate solution. This was followed by drumming at 50° C. for 120 minutes. This was followed by 2 10 minute washes in 200 parts of water at 40° C. A pH of 5.0 was set by adding 200 parts of water and 0.5 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.1 with 1.0 part of formic acid and drummed once for 10 minutes, once for 30 and twice for 20 minutes. Following a 10 minute wash with 200 parts of water the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.4 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a black color having excellent wash-, perspiration-, rub- and migrationfastness.

Dyeing Prescription 20:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 90 minutes at pH 5.7 and 30° C. in a freshly set float composed of 150 parts of water and 4.25 parts of dye from example 6 h. The pH of the float was adjusted to between 8.6-9.3 by portionwise addition of 16 parts of 15% sodium carbonate solution, which was followed by drumming at 50° C. for 180 minutes. This was followed by 3 10 minute washes in 200 parts of water at 40° C. A pH of 4.7 was set by adding 200 parts of water and 0.7 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.7 with 0.5 part of formic acid and drummed once for 10 minutes and once for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.7 with 1.5 parts of concentrated formic acid and drumming for 40 minutes. The dyed and fatliquored leather was additionally rinsed for 10 minutes with cold water at 15° C. and then set out, suspension dried at room temperature overnight, conditioned, staked and strained.

The leather obtained had a black color having excellent wash-, perspiration-, rub- and migrationfastness.

Dyeing Prescription 21:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 45 minutes at pH 5.4 and 30° C. in a freshly set float composed of 150 parts of water and 10 parts of dye from example 14. The pH of the float was adjusted to between 8.4-9.1 by portionwise addition of 20 parts of 15% sodium carbonate solution, which was followed by drumming at 50° C. for 120 minutes. This was followed by 2 10 minute washes in 200 parts of water at 40° C. A pH of 4.6 was set by adding 200 parts of water and 0.7 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.7 with 0.5 part of formic acid and drummed once for 10 minutes and once for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.7 with 1.5 parts of concentrated formic acid and drumming for 40 minutes. The dyed and fatliquored leather was additionally rinsed for 15 minutes with cold water at 15° C. and then set out, suspension dried at room temperature overnight, conditioned, staked and strained.

The leather obtained had a deep black color having excellent wash-, perspiration-, rub- and migrationfastness.

Dyeing Prescription 22:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water, 2 parts of a dispersant and 10 parts of dye from example 21n at pH 4.3 and 30° C. for 60 minutes. A pH between 8.7 and 9.3 was then set in the float at 40° C. by portionwise addition of 27 parts of 15% sodium carbonate solution and maintained in the course of 180 minutes of drumming. This was followed by 3 10 minute washes in 200 parts of water at 40° C. A pH of 4.2 was set by adding 200 parts of water and 0.7 part of formic acid. The retanning/fatliquoring/mechanical operations were carried out as described in part b) of dyeing prescription 1.

The leather obtained had a deep dark brown color having excellent wash-, perspiration-, rub- and migrationfastness.

Dyeing Prescription 23:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water and 10 parts of dye from example 23b at pH 4.3 and 30° C. for 60 minutes. A pH between 8.7 and 9.3 was set in the float at 40° C. by portionwise addition of 27 parts of 15% sodium carbonate solution to fix the dye and maintained in the course of 180 minutes of drumming. This was followed by 3 10 minute washes in 200 parts of water at 40° C. A pH of 4.3 was set by adding 200 parts of water and 0.7 part of formic acid. The retanning/fatliquoring/mechanical operations were carried out as described in part b) of dyeing prescription 1.

The leather obtained had a deep brown color having excellent wash-, perspiration-, rub- and migrationfastness.

Dyeing Prescription 24:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 60 minutes at pH 6.1 and 30° C. in a freshly set float composed of 150 parts of water and 4.25 parts of dye from example 25 g. The pH of the float was adjusted to between 8.7-9.5 by portionwise addition of 23 parts of 15% sodium carbonate solution, which was followed by drumming at 50° C. for 180 minutes. This was followed by 4 10 minute washes in 200 parts of water at 40° C. A pH of 4.3 was set by adding 200 parts of water and 1.0 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep brown color having excellent wash-, perspiration-, rub- and migrationfastness.

Dyeing Prescription 25:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water and 4.25 parts of dye from example 4 at pH 4.2 and 30° C. for 60 minutes. A pH between 8.5 and 9.4 was set in the float at 40° C. by portionwise addition of 30 parts of 15% sodium carbonate solution and maintained in the course of 180 minutes of drumming. This was followed by 2 10 minute washes in 200 parts of water at 40° C. A pH of 4.0 was set by adding 200 parts of water and 1.4 parts of formic acid. The retanning/fatliquoring/mechanical operations were carried out as described in part b) of dyeing prescription 1.

The leather obtained had a deep black color having excellent wash-, perspiration-, rub- and migrationfastness.

Dyeing Prescription 26:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.2. The leather was then washed with 200 parts of water at 35° C. for 10 minutes.

The leather was dyed for 60 minutes at pH 5.3 and 30° C. in a freshly set float composed of 150 parts of water and 11.5 parts of dye from example 1c. The pH of the float was adjusted to between 8.8-9.3 by portionwise addition of 28 parts of 15% sodium carbonate solution, which was followed by drumming at 50° C. for 180 minutes. This was followed by 3 10 minute washes in 200 parts of water at 40° C. A pH of 4.5 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 4.0 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 27:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.2. The leather was then washed with 200 parts of water at 35° C. for 10 minutes.

The leather was dyed for 60 minutes at pH 5.3 and 30° C. in a freshly set float composed of 150 parts of water and 14.3 parts of dye from example 6c. The pH of the float was adjusted to between 8.7-9.3 by portionwise addition of 28 parts of 15% sodium carbonate solution, which was followed by drumming at 50° C. for 180 minutes. This was followed by 3 10 minute washes in 200 parts of water at 40° C. A pH of 4.6 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 4.0 with 1.8 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 28:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water, 2 parts of a dispersant and 11.5 parts of dye from example 6d at pH 4.3 and 30° C. for 60 minutes. The pH was maintained between 8.8 and 9.2 at 40° C. in the course of 180 minutes of drumming by portionwise addition of 30 parts of 15% sodium carbonate solution. This was followed by 3 10 minute washes in 200 parts of water at 40° C. A pH of 4.4 was set by adding 200 parts of water and 1.0 part of formic acid.

The retanning/fatliquoring/mechanical operations were carried out as described in part b) of dyeing prescription 1.

The leather obtained had a deep dark green color having excellent wash-perspiration-, rub- and migrationfastness.

Dyeing Prescription 29:

A piece of 100 parts by weight of a conventionally organic-tanned cattlehide leather 1.0 mm in shaved thickness washed at 30° C. for 20 minutes in a drum filled with 200 parts of water. This was followed by dyeing using 150 parts of water, 2 parts of a dispersant and 14.3 parts of dye from example 9 at pH 4.3 and 30° C. for 60 minutes. The pH of the float was maintained between 8.7 and 9.2 at 40° C. in the course of 180 minutes of drumming by portionwise addition of 30 parts of 15% sodium carbonate solution. This was followed by 3 10 minute washes in 200 parts of water at 40° C. A pH of 4.5 was set by adding 200 parts of water and 1.0 part of formic acid.

The retanning/fatliquoring/mechanical operations were carried out as described in part b) of dyeing prescription 1.

The leather obtained had a deep dark green color having excellent wash-,perspiration-, rub- and migrationfastness.

Dyeing Prescription 30:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water and 11.5 parts of dye from example 1fc at pH 4.3 and 30° C. for 60 minutes. The pH of the float was maintained between 8.8 and 9.4 at 40° C. by portionwise addition of 30 parts of 15% sodium carbonate solution to fix the dye in the course of 180 minutes of drumming. This was followed by 3 10 minute washes in 200 parts of water at 40° C. A pH of 4.6 was set by adding 200 parts of water and 1.0 part of formic acid.

The retanning/fatliquoring/mechanical operations were carried out as described in part b) of dyeing prescription 1.

The leather obtained had a deep blue color having excellent wash-, perspiration-, rub- and migrationfastness.

Dyeing Prescription 31:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water and 14.3 parts of dye from example 1q at pH 4.3 and 30° C. for 60 minutes. The pH of the float was maintained between 8.6 and 9.3 at 40° C. by portionwise addition of 30 parts of 15% sodium carbonate solution to fix the dye in the course of 180 minutes of drumming. This was followed by 3 10 minute washes in 200 parts of water at 40° C. A pH of 4.6 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 32:

A piece of 100 parts by weight of a conventionally organic-tanned cattlehide leather 1.0 mm in shaved thickness washed at 30° C. for 20 minutes in a drum filled with 200 parts of water. This was followed by immediately adjusting the pH of the new float consisting of 150 parts of water, 2 parts of a dispersant and 8 parts of dye from example 1s to >8.5 by portionwise addition of 30 parts of 15% sodium carbonate solution and maintaining the pH between 8.7 and 9.2 at 40° C. to fix the dye in the course of 220 minutes of drumming. This was followed by 3 10 minute washes in 200 parts of water at 40° C. A pH of 4.5 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 33:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The pH was immediately adjusted to >8.5 in a freshly set float composed of 150 parts of water and 8 parts of dye from example 1t by portionwise addition of 23 parts of 15% sodium carbonate solution and maintained between 8.7-9.5 at 50° C. to fix the dye in the course of 240 minutes of drumming. This was followed by 4 10 minute washes in 200 parts of water at 40° C. A pH of 4.2 was set by adding 200 parts of water and 1.1 parts of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastness.

Dyeing Prescription 34:

A piece of 100 parts by weight of a conventionally organic-tanned cattlehide leather 1.0 mm in shaved thickness washed at 30° C. for 20 minutes in a drum filled with 200 parts of water. This was followed by dyeing using a float consisting of 150 parts of water, 2 parts of a dispersant and 7 parts of dye from example 1u at pH 4.3 and 30° C. for 60 minutes. The pH of the float was maintained between 8.7 and 9.2 at 40° C. by portionwise addition of 30 parts of 15% sodium carbonate solution to fix the dye in the course of 200 minutes of drumming. After changing the float a pH of 4.5 was set by adding 200 parts of water and 1.0 part of formic acid.

The retanning/fatliquoring/mechanical operations were carried out as described in part b) of dyeing prescription 1.

The leather obtained had a deep black color having excellent wash-, perspiration-, rub- and migrationfastness.

Dyeing Prescription 35:

A piece of 100 parts by weight of a conventional chrome-tanned cattlehide leather 1.8 mm in shaved thickness washed at 35° C. for 10 minutes in a drum filled with 200 parts of water and 0.1 part of formic acid and subsequently neutralized at 35° C. for 120 minutes in a float consisting of 100 parts of water, 2 parts of sodium formate, 1 part of sodium acetate, 1.5 parts of sodium bicarbonate and 1 part of a dispersant. The deacidifying float then had a pH of 6.4. The leather was then washed with 200 parts of water at 35° C. for 10 minutes.

The leather was dyed for 60 minutes at pH 6.3 and 30° C. in a freshly set float composed of 150 parts of water and 7 parts of dye from example 2n. The pH of the float was adjusted to between 8.7-9.5 by portionwise addition of 23 parts of 15% sodium carbonate solution to fix the dye, which is followed by drumming at 50° C. for 210 minutes. After changing the float a pH of 4.3 was set by adding 200 parts of water and 1.0 part of formic acid.

The leather thus dyed was retanned for 30 minutes at 30° C. in a freshly set float composed of 30 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. Finally, the leather was acidified to pH 3.8 with 2.0 parts of formic acid and drummed once for 10 minutes and three times for 30 minutes. Following a 10 minute wash with 200 parts of water at 40° C. the leather was fatliquored in a new float consisting of 100 parts of water, 4.5 parts of a mixed fatliquor based on sulfited fishoil and synthetic oil, 0.5 part of a lanolin-based fatliquor by drumming at 55° C. for 40 minutes. This was followed by acidification to pH 3.3 with 1.5 parts of concentrated formic acid and drumming for 40 minutes. The dyed and fatliquored leather was additionally rinsed for 15 minutes with cold water at 15° C. and then set out, subjected to reduced pressure, suspension dried at room temperature overnight, conditioned, staked and strained.

The leather obtained had a deep black color having excellent wash-, perspiration-, rub- and migrationfastnesses.

Dyeing Prescription 36

A piece of 100 parts by weight of a conventionally chrome-tanned cattlehide leather 1.8 mm in shaved thickness washed at 35° C. for 10 minutes in a drum filled with 300 parts of water and subsequently neutralized at 40° C. for 120 minutes in a float consisting of 100 parts of water, 2 parts of sodium formate, 1 part of sodium acetate and 2.2 parts of sodium bicarbonate. The deacidifying float then had a pH of 7.2. The deacidifying float was then admixed with 10.5 parts of dye 1bj for dyeing at pH 6.9 at 40° C. for 30 minutes. The pH of the float was set between 9.2-9.7 by portionwise addition of 8 parts of sodium carbonate before drumming at 40° C. for 75 minutes. This was followed by 2 times a 20 minute washing operation in 300 parts of water at 40° C. A pH of 3.9 was set by adding 200 parts of water and 1.2 parts of formic acid.

The leather thus dyed was retanned for 30 minutes at 30° C. in a freshly set float composed of 100 parts of water and 2 parts of a polymeric tanning material. The float was subsequently admixed with 2 parts of a hydrophobicizing fatliquor. Following a drumming time of a further 30 minutes 5 parts of a sulfone type tanning material and 4 parts of a resin type tanning material were added before drumming for a further 60 minutes. The retanning float was admixed with 4.5 parts of a mixed fatliquor based on sulfited fishoil and synthetic oil and 0.5 part of a lanolin-based fat liquor and the leather was subsequently fatliquored by drumming at 55° C. for 40 minutes. This was followed by acidification to pH 3.6 with 1.6 parts of concentrated formic acid and drumming for 45 minutes. The dyed and fatliquored leather was additionally washed for 10 minutes with 300 parts of cold water at 20° C. and subsequently set out, subjected to reduced pressure at 70° C. for 1.5 minutes, suspension dried at room temperature overnight, conditioned, staked and strained.

The leather obtained had a deep black color having excellent wash-, perspiration-, rub- and migrationfastnesses.

The dyeings reported in table 12 were carried out in an analogous manner:

TABLE 12

| Dye example No. | Dyeing prescription | Parts by weight (%) | Color of leather |
|---|---|---|---|
| 1a | 3 | 2.3 | black |
| | 28 | 8.4 | black |
| | 34 | 17.9 | black |
| | 21 | 10.0 | black |
| 1b | 5 | 2.4 | black |
| | 23 | 8.4 | black |
| | 32 | 16.9 | black |
| | 18 | 4.7 | black |
| | 27 | 10.5 | black |
| | 33 | 18.7 | black |
| 1c | 6 | 9.8 | dark green |
| | 16 | 9.8 | dark green |
| 1d | 1 | 18.1 | dark green |
| | 29 | 4.6 | dark green |
| 1e | 20 | 3.3 | dark green |
| 1f | 35 | 11.7 | dark green |
| 1g | 7 | 15.4 | dark green |
| 1h | 8 | 5.0 | green |
| | 24 | 5.2 | green |
| 1i | 7 | 2.7 | dark green |
| | 7 | 15.4 | dark green |
| | 17 | 5.1 | dark green |
| 1j | 4 | 2.7 | black |
| | 10 | 15.4 | black |
| | 31 | 5.1 | black |
| 1k | 12 | 10.0 | black |
| | 19 | 10.0 | black |
| 1l | 15 | 15.1 | green |
| 1m | 26 | 8.8 | black |
| 1n | 15 | 15.1 | black |
| 1o | 26 | 8.8 | dark green |
| 1p | 13 | 6.5 | black |
| 1q | 14 | 8.3 | black |
| 1r | 22 | 15.1 | black |
| 1s | 1 | 8.3 | black |
| 1t | 3 | 12.0 | black |
| 1u | 11 | 3.8 | black |
| 1v | 22 | 4.7 | black |
| 1z | 33 | 9.0 | dark green |
| 1aa | 13 | 7.6 | dark blue |
| 1ab | 6 | 6.2 | dark blue |
| 1ac | 2 | 7.9 | dark blue |
| 1ad | 7 | 5.3 | dark blue |
| 1ae | 9 | 8.8 | blue |
| 1af | 8 | 7.4 | black |
| 1ag | 4 | 7.9 | black |
| 1ah | 14 | 8.8 | black |
| 1ai | 5 | 10.1 | black |
| 1aj | 23 | 5.9 | black |
| 1ak | 17 | 14.3 | black |
| 1al | 31 | 13.2 | black |
| 1am | 1 | 19.3 | black |
| 1an | 4 | 1.8 | black |
| 1ao | 11 | 5.7 | green |
| 1ap | 28 | 3.8 | green |
| 1aq | 20 | 6.4 | green |
| 1ar | 13 | 12.5 | black |
| 1as | 26 | 10.5 | black |
| 1at | 35 | 7.7 | black |
| 1au | 15 | 4.6 | black |
| 1av | 16 | 2.3 | black |
| 1aw | 6 | 3.1 | green |
| 1ax | 34 | 8.6 | black |
| 1ay | 18 | 17.3 | black |
| 1az | 31 | 2.8 | black |
| 1ba | 8 | 5.1 | black |
| 1bb | 10 | 6.2 | black |
| 1bc | 33 | 11.3 | black |
| 1bd | 1 | 7.1 | dark green |
| 1be | 25 | 13.7 | dark green |
| 1bf | 29 | 18.1 | dark green |
| 1bg | 21 | 4.4 | dark green |
| 1bh | 12 | 3.5 | dark green |
| 1bi | 17 | 6.2 | green |
| 1bj | 2 | 2.1 | black |
| 1bk | 23 | 3.6 | green |
| 1bl | 30 | 5.2 | black |

TABLE 12-continued

| Dye example No. | Dyeing prescription | Parts by weight (%) | Color of leather |
|---|---|---|---|
| 1bm | 27 | 8.9 | black |
| 1bn | 14 | 5.6 | green |
| 1bo | 32 | 3.1 | green |
| 1bp | 22 | 14.5 | green |
| 1bq | 24 | 9.6 | black |
| 1br | 9 | 5.4 | black |
| 1bs | 7 | 7.5 | black |
| 1bt | 5 | 2.9 | black |
| 1bu | 3 | 9.8 | black |
| 1bv | 19 | 4.9 | black |
| 1bw | 8 | 1.8 | black |
| 1bx | 10 | 5.7 | black |
| 1by | 33 | 3.8 | blue |
| 1bz | 1 | 6.4 | blue |
| 1ca | 25 | 12.5 | blue |
| 1cb | 29 | 10.5 | blue |
| 1cc | 21 | 7.7 | blue |
| 1cd | 12 | 4.6 | blue |
| 1ce | 17 | 2.3 | blue |
| 1cf | 2 | 3.1 | blue |
| 1cg | 23 | 8.6 | blue |
| 1ch | 30 | 17.3 | blue |
| 1ci | 27 | 2.8 | blue |
| 1cj | 14 | 5.1 | blue |
| 1ck | 32 | 6.2 | blue |
| 1cl | 22 | 12.5 | blue |
| 1cm | 24 | 10.5 | blue |
| 1cn | 9 | 7.7 | blue |
| 1co | 7 | 4.6 | blue |
| 1cp | 5 | 2.3 | blue |
| 1cq | 3 | 3.1 | blue |
| 1cr | 19 | 8.6 | blue |
| 1cs | 35 | 17.3 | blue |
| 1ct | 15 | 2.8 | blue |
| 1cu | 16 | 5.1 | blue |
| 1cv | 6 | 6.2 | blue |
| 1cw | 34 | 11.3 | blue |
| 1cx | 18 | 7.1 | blue |
| 1cy | 31 | 13.7 | blue |
| 1cz | 4 | 18.1 | blue |
| 1da | 11 | 4.4 | blue |
| 1db | 28 | 3.5 | blue |
| 1dc | 20 | 6.2 | blue |
| 1dd | 13 | 2.1 | blue |
| 1de | 26 | 3.6 | green |
| 1df | 35 | 5.2 | green |
| 1dg | 15 | 8.9 | black |
| 1dh | 16 | 5.6 | black |
| 1di | 6 | 3.1 | black |
| 1dj | 25 | 14.5 | black |
| 1dk | 29 | 9.6 | black |
| 1dl | 21 | 5.4 | green |
| 1dm | 12 | 7.5 | green |
| 1dn | 17 | 2.9 | green |
| 1do | 2 | 9.8 | black |
| 1dp | 23 | 4.9 | black |
| 1dq | 30 | 1.8 | black |
| 1dr | 27 | 5.7 | black |
| 1ds | 14 | 3.8 | black |
| 1dt | 32 | 6.4 | black |
| 1du | 22 | 12.5 | black |
| 1dv | 24 | 10.5 | black |
| 1dw | 9 | 7.7 | blue |
| 1dx | 7 | 4.6 | blue |
| 1dy | 5 | 2.3 | blue |
| 1dz | 3 | 3.1 | blue |
| 1ea | 19 | 8.6 | blue |
| 1eb | 35 | 17.3 | blue |
| 1ec | 15 | 2.8 | blue |
| 1ed | 16 | 5.1 | blue |
| 1ee | 6 | 6.2 | blue |
| 1ef | 14 | 5.6 | blue |
| 1eg | 32 | 3.1 | blue |
| 1eh | 22 | 14.5 | blue |
| 1ei | 24 | 9.6 | blue |
| 1ej | 9 | 5.4 | blue |
| 1ek | 7 | 7.5 | blue |
| 1el | 5 | 2.9 | blue |
| 1em | 3 | 1.8 | blue |
| 1en | 19 | 5.7 | blue |
| 1eo | 35 | 3.8 | blue |
| 1ep | 15 | 6.4 | blue |
| 1eq | 16 | 12.5 | blue |
| 1er | 6 | 10.5 | blue |
| 1es | 34 | 7.7 | blue |
| 1et | 18 | 4.6 | blue |
| 1eu | 31 | 2.3 | blue |
| 1ev | 4 | 3.1 | blue |
| 1ew | 11 | 8.6 | blue |
| 1ex | 28 | 17.3 | blue |
| 1ey | 20 | 2.8 | blue |
| 1ez | 13 | 5.1 | blue |
| 1fa | 15 | 6.2 | blue |
| 1fb | 16 | 11.3 | blue |
| 1fc | 6 | 7.1 | blue |
| 1fd | 14 | 13.7 | blue |
| 1fe | 32 | 18.1 | blue |
| 1ff | 22 | 7.7 | blue |
| 1fg | 24 | 4.6 | green |
| 1fh | 9 | 2.3 | green |
| 1fi | 7 | 3.1 | black |
| 1fj | 5 | 8.6 | black |
| 1fk | 3 | 17.3 | black |
| 1fl | 19 | 2.8 | black |
| 1fm | 34 | 5.1 | black |
| 1fn | 18 | 6.2 | green |
| 1fo | 31 | 5.6 | green |
| 1fp | 4 | 3.1 | green |
| 1fq | 11 | 14.5 | black |
| 1fr | 28 | 9.6 | black |
| 1fs | 20 | 5.4 | black |
| 1ft | 13 | 8.2 | black |
| 1fu | 15 | 1.9 | black |
| 1fv | 16 | 2.6 | black |
| 1fw | 6 | 14.3 | black |
| 1fx | 5 | 6.7 | black |
| 2a | 2 | 2.3 | black |
|  | 6 | 8.4 | black |
|  | 11 | 17.9 | black |
|  | 17 | 10.0 | black |
| 2b | 9 | 2.4 | black |
|  | 25 | 8.4 | black |
|  | 21 | 4.7 | black |
|  | 21 | 10.5 | black |
|  | 21 | 18.7 | black |
| 2c | 25 | 11.0 | dark green |
| 2d | 17 | 10.8 | dark green |
| 2e | 30 | 17.0 | dark green |
| 2f | 34 | 11.5 | dark green |
| 2g | 7 | 11.2 | dark green |
| 2h | 3 | 8.4 | black |
|  | 24 | 8.4 | black |
| 2i | 16 | 8.4 | dark green |
| 2j | 27 | 11.4 | black |
| 2k | 10 | 6.6 | black |
|  | 10 | 13.2 | black |
| 2l | 12 | 15.1 | green |
| 2m | 15 | 8.8 | black |
| 2n | 15 | 8.8 | black |
| 2o | 1 | 8.2 | dark green |
| 2p | 19 | 2.9 | black |
| 2q | 21 | 4.5 | black |
| 2r | 4 | 6.7 | black |
| 2s | 20 | 15.0 | black |
| 2t | 5 | 4.6 | black |
| 2u | 17 | 6.7 | black |
| 2v | 19 | 8.2 | black |
| 2z | 8 | 2.9 | dark green |
| 2aa | 9 | 4.5 | dark blue |
| 2ab | 10 | 6.7 | dark blue |
| 2ac | 11 | 7.7 | dark blue |
| 2ad | 18 | 9.1 | dark blue |
| 2ae | 16 | 8.3 | blue |
| 2af | 14 | 5.9 | black |

TABLE 12-continued

| Dye example No. | Dyeing prescription | Parts by weight (%) | Color of leather |
| --- | --- | --- | --- |
| 2ag | 15 | 11.0 | black |
| 2ah | 14 | 8.8 | black |
| 2ai | 6 | 10.9 | black |
| 2aj | 7 | 11.1 | dark blue |
| 2ak | 15 | 9.7 | dark blue |
| 2al | 12 | 8.4 | dark green |
| 2am | 13 | 7.6 | black |
| 2an | 23 | 5.9 | black |
| 2ao | 17 | 14.3 | black |
| 2ap | 31 | 13.2 | black |
| 2aq | 1 | 19.3 | black |
| 2ar | 4 | 1.8 | black |
| 2as | 11 | 5.7 | green |
| 2at | 28 | 3.8 | green |
| 2au | 20 | 6.4 | green |
| 2av | 13 | 12.5 | black |
| 2aw | 26 | 10.5 | black |
| 2ax | 35 | 7.7 | black |
| 2ay | 15 | 4.6 | black |
| 2az | 16 | 2.3 | black |
| 2ba | 6 | 3.1 | black |
| 2bb | 34 | 8.6 | black |
| 2bc | 18 | 17.3 | black |
| 2bd | 31 | 2.8 | black |
| 2be | 8 | 5.1 | black |
| 2bf | 10 | 6.2 | black |
| 2bg | 33 | 11.3 | black |
| 2bh | 1 | 7.1 | dark green |
| 2bi | 25 | 13.7 | dark green |
| 2bj | 29 | 18.1 | dark green |
| 2bk | 21 | 4.4 | dark green |
| 2bl | 12 | 3.5 | dark green |
| 2bm | 17 | 6.2 | dark green |
| 2bn | 2 | 2.1 | black |
| 2bo | 23 | 3.6 | dark green |
| 2bp | 30 | 5.2 | green |
| 2bq | 27 | 8.9 | black |
| 2br | 14 | 5.6 | green |
| 2bs | 32 | 3.1 | green |
| 2bt | 22 | 14.5 | green |
| 2bu | 24 | 9.6 | black |
| 2bv | 9 | 5.4 | black |
| 2bw | 7 | 7.5 | black |
| 2bx | 5 | 2.9 | black |
| 2by | 3 | 9.8 | black |
| 2bz | 19 | 4.9 | black |
| 2ca | 8 | 1.8 | black |
| 2cb | 10 | 5.7 | black |
| 2cc | 33 | 3.8 | blue |
| 2cd | 1 | 6.4 | blue |
| 2ce | 25 | 12.5 | blue |
| 2cf | 29 | 10.5 | blue |
| 2cg | 21 | 7.7 | blue |
| 2ch | 12 | 4.6 | blue |
| 2ci | 17 | 2.3 | blue |
| 2cj | 2 | 3.1 | blue |
| 2ck | 23 | 8.6 | blue |
| 2cl | 30 | 17.3 | blue |
| 2cm | 27 | 2.8 | blue |
| 2cn | 14 | 5.1 | blue |
| 2co | 32 | 6.2 | blue |
| 2cp | 22 | 12.5 | blue |
| 2cq | 24 | 10.5 | blue |
| 2cr | 9 | 7.7 | blue |
| 2cs | 7 | 4.6 | blue |
| 2ct | 5 | 2.3 | blue |
| 2cu | 3 | 3.1 | blue |
| 2cv | 19 | 8.6 | blue |
| 2cw | 35 | 17.3 | blue |
| 2cx | 15 | 2.8 | blue |
| 2cy | 16 | 5.1 | blue |
| 2cz | 6 | 6.2 | blue |
| 2da | 34 | 11.3 | blue |
| 2db | 18 | 7.1 | blue |
| 2dc | 31 | 13.7 | blue |
| 2dd | 4 | 18.1 | blue |
| 2de | 11 | 4.4 | blue |
| 2df | 28 | 3.5 | blue |
| 2dg | 20 | 6.2 | blue |
| 2dh | 13 | 2.1 | green |
| 2di | 26 | 3.6 | green |
| 2dj | 35 | 5.2 | black |
| 2dk | 15 | 8.9 | black |
| 2dl | 16 | 5.6 | black |
| 2dm | 6 | 3.1 | black |
| 2dn | 25 | 14.5 | black |
| 2do | 29 | 9.6 | green |
| 2dp | 21 | 5.4 | green |
| 2dq | 12 | 7.5 | green |
| 2dr | 17 | 2.9 | black |
| 2ds | 2 | 9.8 | black |
| 2dt | 23 | 4.9 | black |
| 2du | 30 | 1.8 | black |
| 2dv | 27 | 5.7 | black |
| 2dw | 14 | 3.8 | black |
| 2dx | 32 | 6.4 | black |
| 2dy | 22 | 12.5 | black |
| 2dz | 24 | 10.5 | blue |
| 2ea | 9 | 7.7 | blue |
| 2eb | 7 | 4.6 | blue |
| 2ec | 5 | 2.3 | blue |
| 2ed | 3 | 3.1 | blue |
| 2ee | 19 | 8.6 | blue |
| 2ef | 35 | 17.3 | blue |
| 2eg | 15 | 2.8 | blue |
| 2eh | 16 | 5.1 | blue |
| 2ei | 6 | 6.2 | blue |
| 2ej | 14 | 5.6 | blue |
| 2ek | 32 | 3.1 | blue |
| 2el | 22 | 14.5 | blue |
| 2em | 24 | 9.6 | blue |
| 2en | 9 | 5.4 | blue |
| 2eo | 7 | 7.5 | blue |
| 2ep | 5 | 2.9 | blue |
| 2eq | 3 | 1.8 | blue |
| 2er | 19 | 5.7 | blue |
| 2es | 35 | 3.8 | blue |
| 2et | 15 | 6.4 | blue |
| 2eu | 16 | 12.5 | blue |
| 2ev | 6 | 10.5 | blue |
| 2ew | 34 | 7.7 | blue |
| 2ex | 18 | 4.6 | blue |
| 2ey | 31 | 2.3 | blue |
| 2ez | 4 | 3.1 | blue |
| 2fa | 11 | 8.6 | blue |
| 2fb | 28 | 17.3 | blue |
| 2fc | 20 | 2.8 | blue |
| 2fd | 13 | 5.1 | blue |
| 2fe | 15 | 6.2 | blue |
| 2ff | 16 | 11.3 | blue |
| 2fg | 6 | 7.1 | blue |
| 2fh | 14 | 13.7 | blue |
| 2fi | 32 | 18.1 | blue |
| 2fj | 22 | 7.7 | green |
| 2fk | 24 | 4.6 | green |
| 2fl | 9 | 2.3 | black |
| 2fm | 7 | 3.1 | black |
| 2fn | 5 | 8.6 | black |
| 2fo | 3 | 17.3 | black |
| 2fp | 19 | 2.8 | black |
| 2fq | 34 | 5.1 | green |
| 2fr | 18 | 6.2 | green |
| 2fs | 31 | 5.6 | green |
| 2ft | 4 | 3.1 | black |
| 2fu | 11 | 14.5 | black |
| 2fv | 28 | 9.6 | black |
| 2fw | 20 | 5.4 | black |
| 2fx | 13 | 8.2 | black |
| 2fy | 11 | 8.6 | black |
| 2fz | 28 | 17.3 | black |
| 2ga | 20 | 2.8 | black |
| 3 | 2 | 6.9 | black |
| 4 | 3 | 3.9 | black |
| 5a | 8 | 10.0 | green |

TABLE 12-continued

| Dye example No. | Dyeing prescription | Parts by weight (%) | Color of leather |
|---|---|---|---|
| 5b | 22 | 7.3 | black |
| 5c | 16 | 10.0 | black |
| 5d | 24 | 10.9 | dark green |
| 5e | 30 | 11.1 | dark green |
| 5f | 28 | 11.1 | green |
| 5g | 23 | 12.4 | black |
| 5h | 31 | 12.4 | black |
| 5i | 26 | 12.4 | black |
| 5j | 15 | 3.6 | dark blue |
| 5k | 27 | 12.3 | dark blue |
| 6a | 13 | 8.4 | green |
| 6b | 28 | 14.4 | black |
| 6c | 32 | 14.4 | black |
| 6d | 35 | 12.4 | dark green |
| 6e | 34 | 8.4 | dark green |
| 6f | 33 | 14.4 | green |
| 6g | 4 | 3.4 | black |
|  | 4 | 13.6 | black |
|  | 19 | 3.4 | black |
|  | 19 | 13.6 | black |
| 6h | 18 | 5.8 | black |
| 6i | 35 | 19.8 | black |
| 6j | 17 | 9.7 | green |
| 6k | 14 | 7.6 | dark blue |
| 6l | 26 | 17.3 | dark blue |
| 7 | 16 | 8.6 | dark green |
| 8 | 15 | 6.8 | dark green |
| 9 | 31 | 5.9 | dark green |
| 10 | 29 | 3.9 | dark green |
| 11 | 30 | 10.0 | dark green |
| 12 | 22 | 7.3 | blue |
| 13 | 21 | 10.0 | red |
| 14 | 18 | 7.3 | black |
| 15 | 13 | 8.2 | brown |
| 16 | 34 | 11.1 | brown |
| 17a | 33 | 8.4 | brown |
| 17b | 32 | 7.6 | brown |
| 18a | 11 | 6.9 | brown |
| 18b | 2 | 10.9 | brown |
| 19 | 1 | 11.1 | blue |
| 20 | 5 | 8.8 | blue |
| 21a | 20 | 7.4 | brown |
| 21b | 3 | 8.8 | brown |
| 21c | 9 | 16.6 | brown |
| 21d | 7 | 15.4 | brown |
| 21e | 6 | 5.6 | yellowish brown |
| 21f | 4 | 5.2 | light brown |
| 21g | 12 | 13.3 | dark brown |
| 21h | 10 | 5.6 | brown |
|  | 35 | 5.6 | brown |
| 21i | 25 | 16.6 | brown |
| 21j | 33 | 15.4 | brown |
| 21k | 34 | 4.9 | brown |
| 21l | 24 | 7.9 | brown |
| 21m | 27 | 12.0 | brown |
| 21n | 31 | 10.0 | brown |
| 21o | 26 | 7.7 | brown |
| 21p | 31 | 9.2 | brown |
| 21q | 34 | 4.9 | brown |
| 21r | 15 | 7.0 | brown |
| 21s | 27 | 12.4 | brown |
| 21t | 22 | 9.4 | brown |
| 21u | 18 | 7.9 | brown |
| 21v | 17 | 11.3 | brown |
| 21z | 3 | 18.2 | brown |
| 22a | 12 | 8.8 | brown |
| 22b | 26 | 6.3 | brown |
| 22c | 23 | 5.6 | brown |
| 22d | 3 | 8.8 | brown |
| 22e | 34 | 6.4 | brown |
| 22f | 12 | 6.4 | brown |
| 22g | 4 | 5.6 | brown |
| 22h | 7 | 4.4 | brown |
| 22i | 8 | 13.3 | brown |
| 22j | 5 | 10.6 | brown |
|  | 20 | 10.6 | brown |
| 22k | 14 | 10.2 | brown |
| 22l | 17 | 10.2 | brown |
| 22m | 34 | 14.6 | brown |
| 22n | 15 | 7.3 | brown |
| 22o | 19 | 7.3 | brown |
| 22p | 17 | 11.0 | brown |
| 22q | 11 | 9.2 | brown |
| 22r | 15 | 4.9 | brown |
| 22s | 9 | 7.0 | brown |
| 22t | 8 | 6.3 | brown |
| 22u | 32 | 11.1 | brown |
| 22v | 18 | 7.4 | brown |
| 22z | 16 | 11.0 | brown |
| 23a | 10 | 7.4 | brown |
| 23b | 20 | 7.4 | brown |
| 23c | 13 | 8.8 | brown |
| 23d | 16 | 8.4 | brown |
| 23e | 17 | 8.0 | yellowish brown |
| 23f | 21 | 8.8 | light brown |
| 23g | 25 | 8.9 | dark brown |
| 23h | 24 | 4.7 | brown |
| 23i | 11 | 7.3 | brown |
| 23j | 12 | 4.7 | brown |
| 23k | 24 | 4.2 | brown |
|  | 24 | 8.4 | brown |
|  | 24 | 16.8 | brown |
| 23l | 29 | 16.8 | brown |
| 23m | 25 | 12.4 | brown |
| 23n | 16 | 14.1 | brown |
| 23o | 34 | 8.6 | brown |
| 23p | 1 | 12.0 | brown |
| 23q | 28 | 4.2 | brown |
| 23r | 22 | 8.6 | brown |
| 23s | 24 | 9.0 | brown |
| 23t | 27 | 9.0 | brown |
| 23u | 11 | 5.9 | brown |
| 23v | 2 | 12.7 | brown |
| 23z | 21 | 4.5 | brown |
| 24a | 13 | 8.8 | brown |
| 24b | 9 | 8.6 | brown |
| 24c | 21 | 9.0 | brown |
| 24d | 32 | 8.8 | brown |
| 24e | 30 | 6.2 | brown |
| 24f | 33 | 8.6 | brown |
| 24g | 24 | 9.0 | brown |
| 24h | 29 | 7.4 | brown |
| 24i | 9 | 4.2 | brown |
|  | 9 | 8.4 | brown |
|  | 9 | 16.8 | brown |
| 24j | 30 | 16.8 | brown |
| 24k | 15 | 12.4 | brown |
| 24l | 14 | 12.4 | brown |
| 24m | 17 | 14.0 | brown |
| 24n | 18 | 9.8 | brown |
| 24o | 27 | 4.2 | brown |
| 24p | 24 | 12.1 | brown |
| 24q | 27 | 12.4 | brown |
| 24r | 11 | 12.4 | brown |
| 24s | 13 | 11.8 | brown |
| 24t | 9 | 14.2 | brown |
| 24u | 10 | 14.0 | brown |
| 25a | 12 | 2.4 | brown |
| 25b | 25 | 4.6 | brown |
| 25c | 16 | 6.8 | dark brown |
| 25d | 31 | 8.7 | brown |
| 25e | 17 | 8.8 | brown |
|  | 19 | 8.8 | brown |
| 25f | 32 | 8.6 | dark brown |
| 25g | 25 | 9.0 | brown |
| 25h | 14 | 11.0 | brown |
| 25i | 33 | 8.6 | brown |
| 25j | 24 | 9.0 | brown |
| 25k | 16 | 8.8 | brown |
|  | 16 | 16.8 | brown |
| 25l | 10 | 14.0 | brown |
| 25m | 12 | 2.4 | brown |
| 25n | 4 | 15.0 | brown |
| 25o | 23 | 18.6 | brown |

TABLE 12-continued

| Dye example No. | Dyeing prescription | Parts by weight (%) | Color of leather |
|---|---|---|---|
| 26a | 25 | 4.6 | brown |
| 26b | 16 | 6.8 | brown |
| 26c | 31 | 8.7 | brown |
| 26d | 8 | 4.4 | brown |
| 26e | 5 | 4.6 | brown |
| 26f | 29 | 5.4 | brown |
| 26g | 32 | 10.8 | brown |
| 26h | 11 | 14.1 | brown |
|  | 33 | 14.4 | brown |
| 26i | 17 | 12.2 | brown |
| 26j | 19 | 12.2 | brown |
| 26k | 7 | 11.0 | brown |
| 26l | 9 | 12.2 | brown |
| 26m | 5 | 11.0 | brown |
| 26n | 22 | 8.8 | brown |
|  | 22 | 16.8 | brown |
| 26o | 28 | 2.4 | green |
| 26p | 34 | 4.6 | green |
| 26q | 21 | 4.8 | green |
| 26r | 20 | 8.7 | green |
| 26s | 18 | 6.9 | green |
|  | 18 | 15.1 | green |
| 26t | 15 | 12.2 | greenish brown |
| 26u | 25 | 8.7 | green |
| 26v | 1 | 11.0 | brown |
| 26z | 26 | 5.4 | green |
| 26aa | 14 | 5.4 | green |
| 26ab | 2 | 11.1 | green |
| 26ac | 13 | 10.0 | green |
| 26ad | 27 | 12.7 | brown |
| 26ae | 30 | 16.8 | brown |
| 26af | 11 | 5.4 | green |
| 26ag | 24 | 11.9 | green |
| 26ah | 23 | 10.5 | green |
| 26ai | 29 | 2.7 | brown |
| 27 | 15 | 12.4 | brown |
| 28 | 14 | 12.4 | brown |
| 29a | 17 | 14.0 | olive green |
| 29b | 18 | 9.8 | green |
| 29c | 10 | 8.8 | green |
| 29d | 21 | 7.4 | green |
| 29e | 32 | 7.4 | green |
| 29f | 13 | 8.2 | green |
| 29g | 4 | 7.4 | brown |
| 29h | 15 | 5.6 | light brown |
| 29i | 21 | 7.4 | brown |
| 29j | 32 | 7.4 | brown |
| 29k | 26 | 5.6 | brown |
| 29l | 23 | 12.1 | dark brown |
| 29m | 12 | 14.6 | brown |
| 30a | 6 | 6.8 | green |
| 30b | 24 | 8.7 | brown |
| 30c | 11 | 8.7 | brown |
| 30d | 28 | 2.4 | brown |
| 30e | 34 | 4.6 | brown |
| 30f | 16 | 10.6 | brown |
| 30g | 24 | 10.6 | brown |
| 30h | 34 | 4.8 | brown |
| 30i | 33 | 4.8 | brown |
| 30j | 18 | 4.2 | brown |
| 30k | 29 | 17.9 | brown |
| 30l | 1 | 11.0 | brown |
| 30m | 10 | 8.8 | brown |
| 30n | 1 | 11.0 | brown |
| 30o | 16 | 10.6 | brown |
| 30p | 24 | 10.6 | green |
| 30q | 2 | 11.1 | green |
| 30r | 19 | 10.1 | green |
| 30s | 10 | 8.8 | green |
| 30t | 20 | 8.8 | green |
| 30u | 16 | 10.6 | green |
| 30v | 24 | 10.6 | green |
| 30z | 10 | 8.8 | green |
| 30aa | 28 | 2.4 | green |
| 30ab | 34 | 4.6 | green |
| 30ac | 10 | 8.8 | green |
| 30ad | 28 | 2.4 | green |
| 30ae | 34 | 4.6 | green |
| 30af | 9 | 4.8 | green |
| 30ag | 32 | 12.6 | green |
| 30ah | 7 | 11.6 | green |
| 30ai | 20 | 7.8 | green |
| 31 | 23 | 12.0 | brown |
| 32a | 16 | 10.6 | brown |
| 32b | 24 | 10.6 | brown |
| 32c | 28 | 10.4 | brown |
| 33a | 33 | 4.8 | redbrown |
| 33b | 31 | 16.4 | rusty red |
| 33c | 29 | 17.9 | reddish brown |
| 34 | 30 | 12.0 | yellowish brown |
| 35a | 23 | 7.8 | brown |
| 35b | 23 | 7.8 | brown |
| 35c | 30 | 14.4 | brown |
| 35d | 19 | 7.8 | brown |
| 35e | 22 | 7.8 | brown |
| 36a | 27 | 7.8 | brown |
| 36b | 9 | 6.6 | brown |
| 36c | 21 | 6.6 | brown |
| 36d | 14 | 10.2 | brown |
| 37 | 17 | 10.2 | brown |
| 38 | 34 | 14.6 | brown |
| 39 | 15 | 7.3 | brown |
| 40 | 19 | 7.3 | brown |

We claim:

1. A process comprising treating leather with at least one anionic polyazo dye F, or a metal complex thereof, which has at least 3 diazo groups and at least one alkaline-activatable group of the formula A;

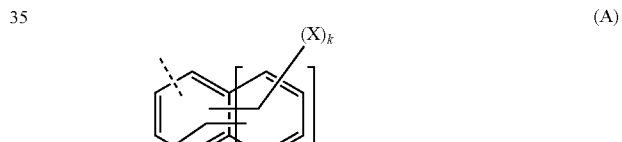

wherein
- - - - denotes the bond to the dye or metal complex thereof;
X is $C_1$-$C_4$-alkyl or $C_1$-$C_4$-alkoxy,
k is 0, 1, 2 or 3,
n is 0 or 1 and
B is a $CH=CH_2$ group or a $CH_2-CH_2$-Q group, wherein Q is halogen, $-O-SO_3H$, $-S-SO_3H$, a quaternary ammonium radical, $R^a S(O)_2-$, $R^b S(O)_2-O-$, or $R^c C(O)-O-$, wherein $R^a$ and $R^b$ are independently alkyl, haloalkyl or optionally substituted phenyl and $R^c$ is hydrogen, alkyl, haloalkyl or optionally substituted phenyl, at a pH of not less than 8 and at most 11,
wherein the dye F, or metal complex thereof, is selected from the dyes of the general formulae I to VII:

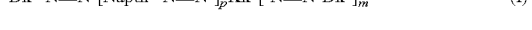

$Dk^1-N=N-[Napth^1-N=N-]_p Kk^1[-N=N-Dk^2]_m$ (I)

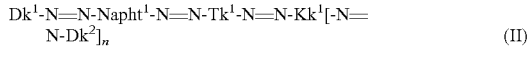

$Dk^1-N=N-Napht^1-N=N-Tk^1-N=N-Kk^1[-N=N-Dk^2]_n$ (II)

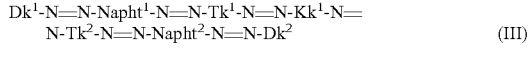

$Dk^1-N=N-Napht^1-N=N-Tk^1-N=N-Kk^1-N=N-Tk^2-N=N-Napht^2-N=N-Dk^2$ (III)

$Dk^1-N=N-Kk^1-N=N-Tk^1-N=N-Kk^2-N=N-Dk^2$ (IV)

$$Dk^1\text{—}N\!=\!N\text{-}Napht^1\text{-}N\!=\!N\text{-}Napht^2\text{-}N\!=\!N\text{-}Kk^1[-N\!=\!N\text{-}Dk^2]_n \quad (V)$$

$$Kk^3\text{-}N\!=\!N\text{-}Tk^1\text{-}N\!=\!N\text{-}Kk^1\text{-}N\!=\!N\text{-}A \quad (VI)$$

$$Dk^1\text{-}N\!=\!N\text{—}P\text{—}N\!=\!N\text{-}Kk^1\text{-}N\!=\!N\text{—}R'\text{—}N\!=\!N\text{-}Dk^2 \quad (VII)$$

wherein n and p are independently 0 or 1;

m is 0, 1 or 2 subject to the condition that m+p=2 or 3 in the formula I;

$Dk^1$, $Dk^2$ independently represent an aromatic amine radical or denote a group of the formula A subject to the condition that in each of the formulae I - V and VII at least one of $Dk^1$ and $Dk^2$ represents a radical of the formula A $Kk^1$, $Kk^2$ independently represent a mono-, di- or trivalent aromatic radical of benzene, naphthalene, pyrazole, quinoline, diphenylamine, diphenylmethane, pyridine, pyrimidine or diphenyl ether and which may optionally comprise one or more of the following radicals as substituents: $SO_3H$, COOH, OH, $NH_2$, $NO_2$, CN, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$alkylcarbonylamino, N-($C_1$-$C_4$-alkylcarbonyl)-N-($C_1$-$C_4$-alkylcarbonyl) amino, $C_1$-$C_4$-hydroxy-$C_1$-$C_4$-alkylamino, carboxy-$C_1$-$C_4$-alkylamino, phenylcarbonylamino, $C_1$-$C_4$ -alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1 to 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

$Kk^3$ is a monovalent radical of benzene, pyridine, pyrimidine or naphthalene and which optionally comprises 1 or 2 hydroxysulfonyl groups and optionally 1 to 3 further substituents selected from $SO_3H$, COOH, OH, $NH_2$, $NO_2$, CN, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$ dialkylaminocarbonyl, $C_1$-$C_4$-alkylcarbonylamino, N-($C_1$-$C_4$- alkylcarbonyl)-N-($C_1$-$C_4$-alkylcarbonyl) amino, $C_1$-$C_4$-hydroxy-$C_1$-$C_4$-alkylamino, carboxy-$C_1$-$C_4$-alkylamino, phenylcarbonylamino, $C_1$-$C_4$- alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1 to 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

$Tk^1$, $Tk^2$ independently represent a divalent aromatic radical of benzene, phenyl benzenesulfonate, phenylaminosulfinylbenzene, pyridine, pyrimidine, diphenylamine, biphenyl, diphenylmethane, 2-phenylbenzimidazole, phenylsulfonylbenzene, phenylaminosulfonylbenzene, stilbene or phenylaminocarbonylbenzene which may each optionally comprise one or more of the following radicals as substituents: $SO_3H$, COOH, OH, $NH_2$, $NO_2$, halogen, $C_1$-$C_4$-alkyl;

P and R' independently represent a divalent aromatic radical of benzene or naphthalene which may each optionally comprise one or more of the following radicals as substituents: $SO_3H$, COOH, OH, $NH_2$, $NO_2$, halogen, $C_1$-$C_4$-alkyl, $C_1$-$C_4$-hydroxyalkyl, carboxy-$C_1$-$C_4$-alkyl, $C_1$-$C_4$-alkoxy, $C_1$-$C_4$-alkylamino, $C_1$-$C_4$-dialkylamino, $C_1$-$C_4$-alkylaminocarbonyl, $C_1$-$C_4$-dialkylaminocarbonyl, $C_1$-$C_4$alkylcarbonylamino, N-($C_1$-$C_4$-alkylcarbonyl)-N-($C_1$-$C_4$-alkylcarbonyl) amino, $C_1$-$C_4$-hydroxy-$C_1$-$C_4$-alkylamino, carboxy-$C_1$-$C_4$-alkylamino, phenylcarbonylamino, $C_1$-$C_4$alkylsulfonyl, $C_1$-$C_4$-alkylaminosulfonyl, $C_1$-$C_4$-alkylsulfonylamino, phenylsulfonyl, phenylsulfonylamino, formamide or 5- or 6-membered heterocyclyl, which is optionally substituted by 1 to 3 of the following radicals: OH, halogen, $C_1$-$C_4$-alkyl or phenyl, 5-membered aromatic heterocyclyl optionally bearing on the nitrogen a phenyl or naphthyl group which can optionally comprise one or two of the following radicals: OH, $SO_3H$, $C_1$-$C_4$-alkyl, and/or $C_1$-$C_4$-alkoxy;

$Napht^1$, $Napht^2$ independently represent a divalent radical of naphthalene and which comprises 1 or 2 hydroxysulfonyl groups and may optionally comprise 1 to 3 further substituents selected from OH, $NH_2$, $C_1$-$C_4$-alkylamino, $C_1$-$C_4$-dialkylamino, $C_1$-$C_4$-alkylsulfonylamino, phenylsulfonylamino, 4-methylphenylsulfonylamino, $C_1$-$C_4$-alkylaminosulfonyl, di-$C_1$-$C_4$-alkylaminosulfonyl, phenylaminosulfonyl, 4-methylphenylaminosulfonyl and $NHC(O)R^x$ radicals, where $R^x$ hydrogen, $C_1$-$C_4$-alkyl, maleinyl or phenyl;

and metal complexes of these dyes, wherein the process obtains a fixation rate of 85% or more.

2. The process according to claim 1, wherein k in the formula A is 0.

3. The process according to claim 1, wherein B in the formula A is $CH\!=\!CH_2$, a $CH_2\!-\!CH_2\!-\!O\!-\!SO_3H$ group or a $CH_2\!-\!CH_2\!-\!O\!-\!C(O)CH_3$ group.

4. The process according to claim 1, wherein the group A is attached to the dye molecule via an —NH— or —N=N— group.

5. The process according to claim 1, wherein n=0.

6. The process according to claim 5, wherein the radical A is selected from the following radicals A1 to A6:

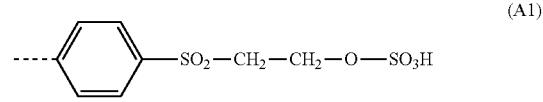

(A1)

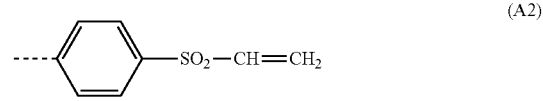

(A2)

(A3)

-continued

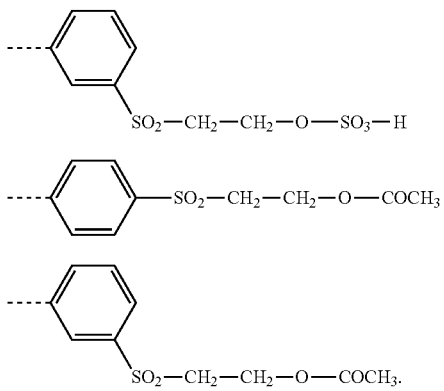

(A4)

(A5)

(A6)

7. The process according to claim 1, wherein the dye F, or metal complex thereof, comprises one of the general formula II, III, or IV, and wherein Tk$^1$ and/or Tk$^2$ in the formulae II, III or IV represents a radical of the general formula VIII

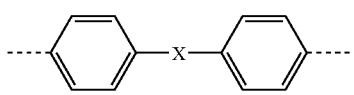

(VIII)

wherein - - - - represent bonds to the azo groups, X represents a chemical bond or a bivalent radical selected from —CH=CH—, —SO$_2$—NR—, —SO$_2$—O—, —NR—, —SO$_2$—, —SO—NR— and —CO—NR—, wherein R represents hydrogen or C$_1$-C$_4$-alkyl.

8. The process according to claim 1, wherein Napht$^1$ and/or Napht$^2$ represent a bivalent radical of the general formula

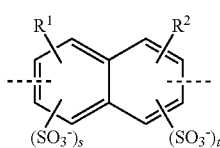

(IX)

wherein R$^1$ and R$^2$ are independently hydrogen, OH, NH$_2$ or NHC(O)R$^3$, wherein R$^3$ represents hydrogen, C$_1$-C$_4$-alkyl, maleinyl or phenyl and at least one of R$^1$ and R$^2$ is other than hydrogen, - - - - represent bonds to the azo groups, s and t represent 0 or 1 and the s+t sum is 1 or 2.

9. The process according to claim 1 wherein the dye F is selected from dyes of the general formula IIa

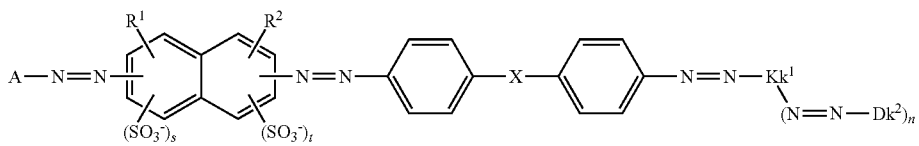

(IIa)

wherein R$^1$ and R$^2$ independently represent hydrogen, OH, NH$_2$ or NHC(O)R$^3$, wherein R$^3$ represents hydrogen, C$_1$-C$_4$-alkyl, maleinyl or phenyl, and at least one of R$^1$ and R$^2$ is other than hydrogen, s and t represent 0 or 1 and the sum total s+t has the value 1 or 2, and X represents a chemical bond or a bivalent radical selected from —CH=CH—, —SO$_2$—NR—, —SO$_2$—O—, —NR—, —SO$_2$—, —SO—NR— and —CO—NR—, wherein R represents hydrogen or C$_1$-C$_4$-alkyl.

10. The process according to claim 1, further comprising, before the treating, initially treating the leather with an aqueous float comprising the at least one dye F, or a metal complex thereof, at a pH in the range from 3 to 6.5.

11. The process according to claim 1, wherein the dyeing is carried out as a one-stage process.

12. The process of claim 1, further comprising retanning the leather.

13. The process according to claim 1, wherein the dyeing is effected at temperatures in the range from 10 to 60° C.

14. The process of claim 1, wherein in the process the dye F or metal complex thereof comprises the dye of the general formula (I) or a metal complex thereof.

15. The process of claim 1, wherein in the process the dye F or metal complex thereof comprises the dye of the general formula (II) or a metal complex thereof.

16. The process of claim 1, wherein in the process the dye F or metal complex thereof comprises the dye of the general formula (III) or a metal complex thereof.

17. The process of claim 1, wherein in the process the dye F or metal complex thereof comprises the dye of the general formula (IV) or a metal complex thereof.

18. The process of claim 1, wherein in the process the dye F or metal complex thereof comprises the dye of the general formula (V) or a metal complex thereof.

19. The process of claim 1, wherein in the process the dye F or metal complex thereof comprises the dye of the general formula (VI) or a metal complex thereof.

20. The process of claim 1, wherein in the process the dye F or metal complex thereof comprises the dye of the general formula (VII) or a metal complex thereof.

21. The process of claim 1, wherein the pH of the aqueous float ranges from 8.5 to 11.

22. The process of claim 1, wherein the pH of the aqueous float ranges from 8.5 to 10.5.

23. The process of claim 1, wherein the pH of the aqueous float ranges from 9.5 to 10.5.

* * * * *